(12) United States Patent
Morinaga et al.

(10) Patent No.: US 6,898,927 B2
(45) Date of Patent: May 31, 2005

(54) EMISSION CONTROL SYSTEM WITH CATALYST WARM-UP SPEEDING CONTROL

(75) Inventors: Syujiro Morinaga, Takahama (JP); Hisashi Iida, Kariya (JP); Yoshihiro Majima, Inuyama (JP); Tatsuya Oka, Chiryu (JP); Akira Ichikawa, Chiryu (JP); Keiji Wakahara, Inazawa (JP); Masayuki Tsutsumi, Obu (JP); Hideyuki Maeji, Okazaki (JP); Masakazu Yamada, Nagoya (JP); Takanori Takahashi, Kariya (JP); Yukihiro Yamashita, Takahama (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/270,270

(22) Filed: Oct. 15, 2002

(65) Prior Publication Data

US 2003/0070423 A1 Apr. 17, 2003

(30) Foreign Application Priority Data

| Oct. 16, 2001 | (JP) | 2001-317588 |
| Oct. 16, 2001 | (JP) | 2001-318240 |
| Nov. 5, 2001 | (JP) | 2001-338970 |
| Nov. 5, 2001 | (JP) | 2001-338971 |
| Nov. 5, 2001 | (JP) | 2001-338972 |
| Nov. 5, 2001 | (JP) | 2001-338973 |
| Jul. 31, 2002 | (JP) | 2002-223337 |

(51) Int. Cl.$^7$ .............................. F01N 3/00
(52) U.S. Cl. .............. 60/284; 60/276; 60/277; 60/285; 123/688
(58) Field of Search .............. 60/274, 276, 285, 60/286, 284, 277, 289, 293, 292; 123/688, 689, 690

(56) References Cited

U.S. PATENT DOCUMENTS

| 5,279,114 A | | 1/1994 | Kurita et al. |
| 5,390,491 A | | 2/1995 | Suzumura et al. |
| 5,727,383 A | * | 3/1998 | Yamashita et al. ............ 60/276 |
| 5,740,675 A | * | 4/1998 | Shimasaki et al. ............ 60/274 |
| 5,852,228 A | | 12/1998 | Yamashita et al. |
| 5,950,419 A | * | 9/1999 | Nishimura et al. ............ 60/274 |
| 6,073,440 A | * | 6/2000 | Douta et al. ................... 60/277 |
| 6,304,813 B1 | * | 10/2001 | Ikeda et al. ................. 701/109 |
| 6,343,467 B1 | * | 2/2002 | Muto et al. .................... 60/285 |

FOREIGN PATENT DOCUMENTS

| JP | 9-228824 | 9/1997 |
| JP | 2001-132438 | 5/2001 |
| JP | 2001-132526 | 5/2001 |

* cited by examiner

Primary Examiner—Binh Q. Tran
(74) Attorney, Agent, or Firm—Nixon & Vanderhye P.C.

(57) ABSTRACT

An emission control system has a catalyst and a sensor responding to a component of exhaust gas. In order to speed warming up the catalyst, the emission control system increases the amount of heat dissipated by exhaust gas. A diagnosis of the emission control system is carried out by determining whether the amount of heat dissipated by exhaust gas is sufficient or insufficient. The amount of heat dissipated by exhaust gas is represented by the length of time to an activated state of the sensor. In the diagnosis, the amount of heat generated by a heater provided in the sensor is taken into consideration.

17 Claims, 50 Drawing Sheets

FIG. 35

| MODE | EXHAUST GAS TEMP. CONTROL SYSTEM | SECONDARY AIR CONTROL SYSTEM | EXHAUST GAS TEMPERATURE | ACTIVATING SPEED | A/F |
|---|---|---|---|---|---|
| A | NORMAL | NORMAL | ← HIGH | ← FAST | SLIGHT LEAN |
| B | NORMAL | ABNORMAL SHORTAGE | | K1 | STOICHIOMETRIC |
| (C) | (NORMAL) | (ABNORMAL OVER SUPPLY) | | K3 | LEAN |
| D | ABNORMAL | ABNORMAL SHORTAGE | | K2 | STOICHIOMETRIC |
| E | ABNORMAL | NORMAL | | | SLIGHT LEAN |
| F | ABNORMAL | ABNORMAL OVER SUPPLY | LOW → | SLOW → | LEAN |

EMISSION CONTROL SYSTEM WITH CATALYST WARM-UP SPEEDING CONTROL

CROSS REFERENCE TO RELATED APPLICATION

This application is based on Japanese Patent Applications No. 2001-317588 filed on Oct. 16, 2001, No. 2001-318240 filed on Oct. 16, 2001, No. 2001-338970 filed on Nov. 5, 2001, No. 2001-338971 filed on Nov. 5, 2001, No. 2001-338972 filed on Nov. 5, 2001, No. 2001-338973 filed on Nov. 5, 2001, and No. 2002-223337 filed on Jul. 31, 2002 the contents of which are incorporated herein by reference.

BACKGROUND OF THE INVENTION

1. Field of the Invention

The present invention relates to an emission control system that has at least one catalyst disposed in an exhaust passage for purifying exhaust gas, specifically the system speeds catalyst warm-up and diagnoses the catalyst warm-up speeding function.

2. Related Art

As an apparatus for purifying exhaust gas discharged by an internal combustion engine (referred to hereafter simply as an engine), there has been known an emission control system having a three way catalyst converter (referred to hereafter simply as a converter). When the catalyst is warmed up to an activation temperature, the catalyst exhibits an exhaust gas purifying effect. Thus, the exhaust gas purification rate of the catalyst is low right after a start of the engine. In order to obtain a high exhaust gas purification rate at an early time after a start of the engine, there has been provided control to speed the operation to warm up the catalyst.

Japanese patent JP-P2001-132438A discloses control to speed the operation to warm up a catalyst and a diagnosis of a function to speed the operation to warm up the catalyst. In accordance with the control to speed the operation to warm up the catalyst, an intake air volume is increased and an ignition timing is delayed to increase the temperature of exhaust gas. The diagnosis determines whether the control to speed the operation to warm up the catalyst is functioning normally or abnormally on the basis of an estimated temperature of the catalyst and an actually detected temperature of the catalyst. Estimation of the temperature of the catalyst is based on a cumulative value of the intake air volume or the lapse of time since a start of the engine. However, an accurate diagnosis is hard to carry out. In addition, a sensor for detecting an actual temperature of the catalyst is also required.

Japanese patent JP-P2001-132526A also discloses control to speed the operation to warm up a catalyst and a diagnosis of a function to speed the operation to warm up the catalyst as well. The diagnosis disclosed here determines whether the control to speed the operation to warm up the catalyst is functioning normally or abnormally on the basis of at least one of an engine revolution speed and an ignition timing. By basing the determination on only one of the engine revolution speed and the ignition timing, however, the determination may produce an incorrect result. With only one of the engine revolution speed and the ignition timing, for example, the amount of heat added to the catalyst cannot be estimated precisely.

In addition, neither Japanese patent JP-P2001-132438A nor Japanese patent JP-P2001-132526A discloses backup processing, which is to be carried out in case the control to speed the operation to warm up the catalyst is not functioning normally. Thus, even if an abnormality is determined to exist, the engine is operated in an abnormal state caused by a late operation to warm up the catalyst.

Furthermore, the control techniques to speed the operation to warm up the catalyst and the diagnoses of a function to speed the operation to warm up the catalyst, which are disclosed in Japanese patent JP-P2001-132438A and Japanese patent JP-P2001-132526A, have a problem of an inability to reveal a cause of a detected abnormality.

Moreover, from another aspect, the disclosed art is considered to raise a problem that the catalyst may return back to an inactive state after being activated in some cases. If an idling operation or a fuel-cut operation has been continuing for a long time at a low ambient temperature, for example, the catalyst may return back to an inactive state in some cases.

SUMMARY OF THE INVENTION

It is thus an object of the present invention to provide an improved emission control system.

It is another object of the present invention to provide a new emission control system capable of determining existence of an abnormality of a catalyst warming up speeding control.

It is a further object of the present invention to provide a new emission control system capable of determining existence of an abnormality of a catalyst warming up speeding control with a high degree of accuracy.

It is a still further object of the present invention to provide a new emission control system capable of identifying a cause of an abnormality of an operation to warm up the catalyst control.

It is a still further object of the present invention to provide a new emission control system capable of reducing the delay of an operation to warm up the catalyst.

It is a still further object of the present invention to provide a new emission control system capable of speeding an operation to re-warm up the catalyst.

In accordance with an aspect of the present invention, there is provided a diagnosis apparatus of an emission control system wherein the diagnosis apparatus has an exhaust gas sensor for detecting one of a concentration of an exhaust gas component such as oxygen contained in exhaust gas and an air-fuel ratio of the exhaust gas as well as determining whether a detected air-fuel ratio is on a lean or rich side, a sensor activation determination means is used for determining whether the state of progress of activation of the exhaust gas sensor after a start of the engine is late or normal and a diagnosis means is used for determining whether the activation of the exhaust gas sensor is abnormal on the basis of a determination result output by the sensor activation determination means in a diagnosis of the emission control system in order to determine whether or not an abnormality exists in the emission control system.

As the exhaust gas sensor for making a diagnosis of the emission control system, an exhaust gas sensor provided for air-fuel ratio control can be used. Thus, without the need to install a new sensor such as a catalyst-temperature sensor, it is possible to realize a function to make a diagnosis of the emission control system while satisfying a demand for reduction of the cost.

In accordance with another aspect of the present invention, there is provided an emission control system wherein there are provided: a catalyst warming up speeding control means for speeding an operation to warm up a catalyst for purifying exhaust gas; a diagnosis means for making a diagnosis of the catalyst warming up speeding control means in order to determine whether the catalyst warming up speeding control means is functioning normally or abnormally; and an exhaust gas component detection means for detecting a component of exhaust gas on the downstream side of the catalyst, wherein the diagnosis means makes a diagnosis of the catalyst warming up speeding control means in order to determine whether or not an abnormality exists in the catalyst warming up speeding control means on the basis of an exhaust gas component detected by the exhaust gas component detection means.

Since a purification rate of exhaust gas passing through the catalyst changes in accordance with the state of progress of an operation to warm up the catalyst (that is, the state of activation of the catalyst), an exhaust gas component flowing through a periphery surrounding the exhaust gas component detection means on the downstream side of the catalyst also varies so that a detection value of the exhaust gas component detection means provided on the downstream side of the catalyst also changes as well. The exhaust gas component flowing through the periphery surrounding the exhaust gas component detection means is indicated by typically the concentration of oxygen and the air-fuel ratio. From these relations among changes in purification rate, changes in exhaust gas component and changes in detection value, in the course of the control to speed an operation to warm up the catalyst, it is possible to determine whether the state of progress of an operation to warm up the catalyst is late or normal on the basis of an exhaust gas component detected by the exhaust gas component detection means provided on the downstream side of the catalyst. If the state of progress of an operation to warm up the catalyst is determined to be late, the diagnosis outputs a result indicating that the catalyst warming up speeding control means is not functioning normally. In this emission control system, a sensor provided for the purpose of controlling the air-fuel ratio can be used as the exhaust gas component detection means provided on the downstream side of the catalyst. Thus, without the need to install a new sensor such as a catalyst-temperature sensor, it is possible to automatically make a diagnosis of the catalyst warming up speeding control means of the emission control system during an operation of the engine while satisfying a demand for reduction of the cost.

In accordance with a further aspect of the present invention, there is provided an emission control system wherein: an exhaust gas sensor is installed on an exhaust system to be used as a sensor for detecting one of a concentration of an exhaust gas component such as oxygen contained in exhaust gas and an air-fuel ratio of the exhaust gas as well as determining whether a detected air-fuel ratio is on a lean or rich side; a heater is embedded in the exhaust gas sensor to be used as a means for heating a sensor element of the exhaust gas sensor; a sensor activation determination means is used for determining whether a state of progress of activation of the exhaust gas sensor is late or normal with no heat generated by the heater or at a reduced amount of heat generated by the heater in a diagnosis made in the course of control to speed an operation to warm up a catalyst; and a diagnosis means is used for determining whether or not the activation of the exhaust gas sensor is abnormally late on the basis of a determination result output by the sensor activation determination means in a diagnosis of the emission control system in order to determine whether or not an abnormality exists in the emission control system.

With the emission control system having the configuration described above, the effect of heat generated by the heater on the activation of the exhaust gas sensor is eliminated or reduced so that it is possible to determine whether a state of progress of activation of the exhaust gas sensor, which is caused by heat generated by exhaust gas in the course of control to speed an operation to warm up a catalyst, is late or normal with a high degree of precision. Thus, a diagnosis of the emission control system can also be made with a high degree of precision. In addition, a means such as an air-fuel ratio sensor or an oxygen sensor, either of which is provided for the purpose of controlling the air-fuel ratio, can be utilized as the exhaust gas sensor. Thus, since it is not necessary to install a new sensor such as a catalyst-temperature sensor, a demand for reduction of the cost can be met.

In accordance with a still further aspect of the present invention, there is provided an emission control system wherein: a first sensor activation determination means is used for determining whether a state of progress of activation of an exhaust gas sensor with heat generated by a heater in the course of control to speed an operation to warm up a catalyst is late or normal; a first diagnosis means is used for determining whether the activation of the exhaust gas sensor is slow or normal on the basis of a determination result output by the first sensor activation determination means in a diagnosis of the emission control system in order to determine whether or not possibility of (or a doubt as to) an abnormality exists in the emission control system; a second sensor activation determination means is used for determining whether a state of progress of activation of the exhaust gas sensor with no heat generated by the heater or at a reduced amount of heat generated by the heater after the next start of the engine in a diagnosis made in the course of control to speed an operation to warm up a catalyst is late or normal in case a determination result output by the first diagnosis means indicates that possibility of (or a doubt as to) an abnormality exists in the emission control system; and a second diagnosis means is used for determining whether or not the activation of the exhaust gas sensor is abnormally late on the basis of a determination result output by the second sensor activation determination means in a diagnosis of the emission control system in order to confirm the existence of the abnormality in the emission control system.

The emission control system diagnosis made by the first diagnosis means is referred to hereafter as a preliminary diagnosis.

In this configuration, a preliminary diagnosis is made with the heater of the exhaust gas sensor generating heat. Only if a result of the preliminary diagnosis indicates that possibility of (or a doubt as to) an abnormality exists, is a confirmation diagnosis made after the next start of the engine with the heater turned of f or at a reduced amount of heat generated by the heater. Thus, it is not necessary to turn off the heater or reduce the amount of heat generated by the heater in a diagnosis if the preliminary diagnosis outputs a determination result of normalcy indicating that the emission control system is clearly functioning in a normal manner. It is therefore possible to substantially lower a frequency at which the heater is turned off or the amount of heat generated by the heater is reduced in the diagnosis. As a result, it is also possible to considerably decrease the number of times exhaust emission (or air-fuel ratio control) is affected by late activation of the exhaust gas sensor, which is caused by termination of the operation of the heater or reduction of the amount of heat generated by the heater during the diagnosis. In addition, since a confirmation diagnosis is made with the heater turned off or at a reduced amount of heat generated by the heater if possibility of (or a doubt as to) an abnormality is determined to exist, the emission control system can be subjected to a diagnosis to determine whether or not an abnormality exists in the emission control system with a high degree of precision.

In accordance with a still further aspect of the present invention, there is provided an emission control system wherein: at least a particular one of a plurality of exhaust gas sensors includes no embedded heater for heating a sensor element of the particular exhaust gas sensor; and in the course of control to speed an operation to warm up a catalyst, a state of progress of activation of the particular exhaust gas sensor including no embedded heater is recognized to determine whether or not the activation of the particular exhaust gas sensor is abnormally late on the basis of a recognition result in a diagnosis of the emission control system in order to determine whether or not an abnormality exists in the emission control system.

In this configuration, the progress of the activation of the particular exhaust gas sensor including no embedded heater is determined only by the flow rate of exhaust gas. Thus, by determining whether a state of progress of activation of the particular exhaust gas sensor including no embedded heater is late or normal, it is possible to precisely recognize a state of progress of the catalyst warm up determined by the flow rate of exhaust gas. As a result, the emission control system can be subjected to a diagnosis with a high degree of precision to determine whether or not an abnormality exists in the emission control system.

In accordance with a still further aspect of the present invention, there is provided an emission control system wherein there are provided: an exhaust gas temperature control system for increasing the temperature of recombustible exhaust gas; and a catalyst warming up speeding means including a secondary air control system for introducing secondary air to be used in an after burn of exhaust gas.

At a location in close proximity to a secondary air control device or on an exhaust passage on a downstream side with respect to the secondary air control device, an exhaust gas sensor is provided for detecting either a concentration of an exhaust gas component such as oxygen contained in exhaust gas or an air-fuel ratio of the exhaust gas as well as determining whether a detected air-fuel ratio is on a lean or rich side. A sensor activation determination means is used for determining whether the state of progress of activation of the exhaust gas sensor after a start of the engine is late or normal. In addition, a diagnosis means is used for making a diagnosis of the catalyst warming up speeding means in order to determine whether or not an abnormality exists in the catalyst warming up speeding means by determining whether the activation of the exhaust gas sensor is abnormal on the basis of a determination result output by the sensor activation determination means.

If the exhaust gas temperature control system and the secondary air control system are both functioning normally, part of oxygen included in secondary air introduced into the exhaust passage is not burned in the after burn. The unburned oxygen remains, putting the air-fuel ratio of the exhaust gas in a weak-lean state, which is a state of being slightly leaner than a target air-fuel ratio after completion of an operation to warm up the catalyst. If the exhaust gas temperature control system is functioning normally but the secondary air control system is not functioning normally, resulting in an insufficient volume of introduced secondary air, however, the air-fuel ratio of the exhaust gas is still shifted into the lean region, but the magnitude of the shift becomes small in comparison with the case in which the secondary air control system is functioning normally, keeping the air-fuel ratio of the exhaust gas at a value close the stoichiometric one, that is, a value close to the target air-fuel ratio after completion of an operation to warm up the catalyst. If the secondary air control system is functioning normally but the exhaust gas temperature control system is not functioning normally, resulting in exhaust gas with a temperature lower than the normal one, on the other hand, the after burn becomes incomplete so that much oxygen of the secondary air is not burned by the after burn. As a result, the air-fuel ratio of the exhaust gas is shifted into the lean region. The changes in exhaust gas air-fuel ratio appear as changes in exhaust gas sensor output.

An abnormality determined to exist in the emission control system can be an abnormality of the exhaust gas temperature control system or an abnormality of the secondary air control system. An abnormality of the exhaust gas temperature control system can be distinguished from an abnormality of the secondary air control system by using the state of progress of the activation of the exhaust gas sensor and the output of the exhaust gas sensor or a parameter having a correlation with the output of the exhaust gas sensor. Assume for example that the state of progress of the activation of the exhaust gas sensor is later than a normal condition, leading to a determination result indicating existence of an abnormality in the emission control system. In this case, by determining an air-fuel ratio from the output of the exhaust gas sensor, the abnormality existing in the emission control system can be determined to be an abnormality of the exhaust gas temperature control system or an abnormality of the secondary air control system with a high degree of precision so that work as repair in the event of an abnormality or replacement of a part can be done with ease. In addition, in a control system wherein there are two possible kinds of abnormality existing in the secondary air control system, namely, an insufficient flow rate of secondary air and an excessive flow rate of secondary air, an insufficient flow rate of secondary air can be distinguished from an excessive flow rate of secondary air from a combination of a state of progress of activation of the exhaust gas sensor and an output of the exhaust gas sensor.

In accordance with a still further aspect of the present invention, there is provided an emission control system wherein there are provided: a detection means for detecting a warmed-up state of a catalyst; a first control means for comparing a warmed-up state detected by the detection means with a predetermined target warmed-up state in a process of speeding an operation to warm up the catalyst; and a second control means, which is used for controlling at least one of control parameters related to control to speed an operation to warm up the catalyst in a direction to speed an operation to warm up the catalyst in case a comparison result output by the first control means indicates that a warmed-up state detected by the detection means has not reached the target warmed-up state at a predetermined point of time.

In the above configuration, the amount of heat exhausted by the engine can be further increased in the course of the control to speed an operation to warm up the catalyst so that the catalyst can be warmed up with a high degree of reliability. As a result, the catalyst can always be warmed up or activated without being affected by a temperature condition at a start of the engine and the like so that the quantity of each exhausted emission after the start of the engine can be reduced.

In accordance with a still further aspect of the present invention, there is provided an emission control system wherein at least one of control parameters related to control to speed an operation to warm up a catalyst are controlled in a direction to speed an operation to warm up the catalyst if the catalyst actual warm up state detected by a detection means degrades to a state worse than a target state of warming up the catalyst in an operation of the engine even after completion of the operation to warm up the catalyst by execution of the control to speed the operation to warm up the catalyst at a start of the engine. By controlling such parameters in this way, each time the detection means detects an actual incomplete warmed-up state of the catalyst even after completion of the operation to warm up the catalyst by execution of the control to speed the operation to warm up the catalyst at a start of the engine, the control to speed the operation to warm up the catalyst is again executed to warm up the catalyst quickly so that an activated state of the catalyst can be restored. As a result, the state of worsened exhaust emission can be prevented from continuing for a long time.

In accordance with a still further aspect of the present invention, an emission control system is provided with a diagnosis apparatus having a diagnosis means for making a diagnosis of the emission control system in the course of control to speed an operation to warm up a catalyst in order to determine whether or not an abnormality exists in the emission control system on the basis of at least one of an intake air volume or an intake airflow rate parameter having a correlation with the intake air volume and an air-fuel ratio or an air-fuel ratio parameter having a correlation with the air-fuel ratio.

The intake air volume and the air-fuel ratio themselves are each a parameter for changing the amount of heat exhausted by the engine or the amount of heat supplied to the catalyst. It is thus possible to determine whether the amount of heat exhausted by the engine during the control to speed an operation to warm up the catalyst is sufficient or insufficient for speeding an operation to warm up the catalyst, that is, whether the emission control system is functioning normally or abnormally, by using the intake airflow rate parameter and the air-fuel ratio parameter. Thus, it is possible to make a diagnosis of the emission control system in order to determine whether or not an abnormality exists in the emission control system with a high degree of precision. In addition, since it is not necessary to install a new sensor for detecting a temperature of the catalyst, a demand for reduction of the cost can be met.

In addition, as an alternative, an exhausted-heat-amount computation means is used for estimating an amount of heat exhausted by the engine or an amount of heat supplied to the catalyst on the basis of the operating state of the engine in the course of the control to speed an operation to warm up the catalyst, and the estimated amount of heat is used as a basis for making a diagnosis of the emission control system in order to determine whether or not an abnormality exists in the emission control system. In this way, it is possible to determine whether the amount of heat exhausted by the engine during the control to speed an operation to warm up the catalyst is insufficient or sufficient for speeding the operation to warm up the catalyst with a high degree of precision.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIG. 35 shows a table showing normal and abnormal modes of the seventh embodiment of the present invention;

PREFERRED EMBODIMENTS OF THE INVENTION

First Embodiment

Figure 1:
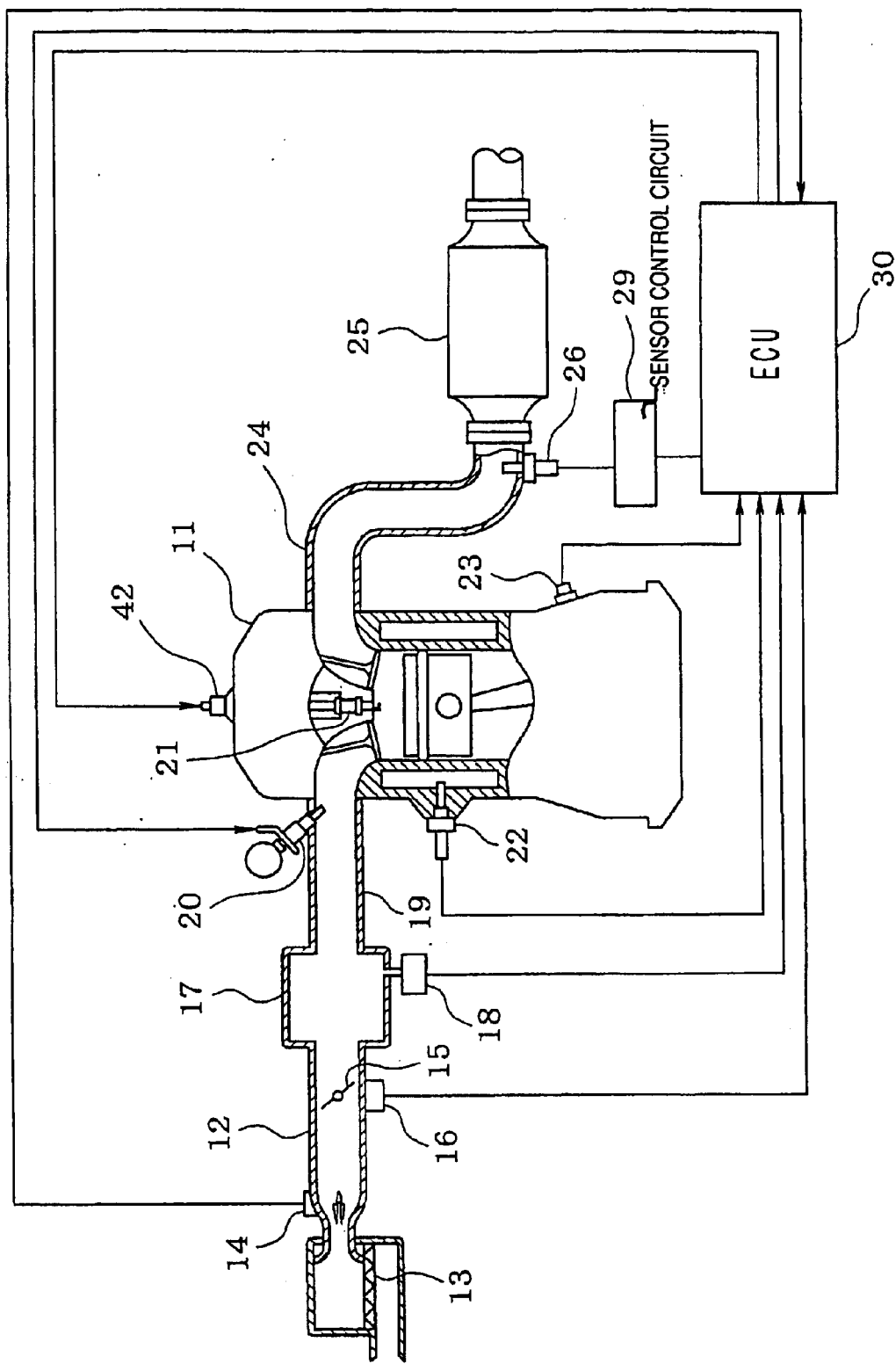
FIG. 1 is a diagram showing the configuration of an emission control system implemented by a first embodiment of the present invention.

Some preferred embodiments of the present invention are explained by referring to diagrams as follows. First of all, a simple and plain configuration of an engine control system is described by referring to FIG. 1. At the start end of the upstream portion of an intake pipe 12 employed in an engine 11 serving as an internal combustion engine, an air cleaner 13 is provided. On the downstream side of the air cleaner 13, an air flow meter 14 is provided for detecting an intake air volume. On the downstream side of the air flow meter 14, there are provided a throttle valve 15 and a throttle-opening sensor 16 for detecting a throttle opening.

Furthermore, on the downstream side of the throttle valve 15, a surge tank 17 is provided. On the surge tank 17, an intake-manifold-pressure sensor 18 is provided for detecting an intake-manifold pressure. In addition, on the surge tank 17, there is provided an intake manifold 19 for introducing air into each cylinder of the engine 11. At a location in close proximity to an intake port of the intake manifold 19 for each cylinder, a fuel injection valve 20 is provided for injecting fuel into each cylinder. Moreover, at a cylinder head of the engine 11, an ignition plug 21 is provided for each cylinder. A spark discharge of the ignition plug 21 provided for a cylinder ignites mixed gas in the cylinder.

In addition, in a cylinder block of the engine 11, there are provided a cooling water temperature sensor 22 for detecting a temperature of cooling water and a crank-angle sensor 23 for detecting a revolution speed of the engine 11.

Figure 2:
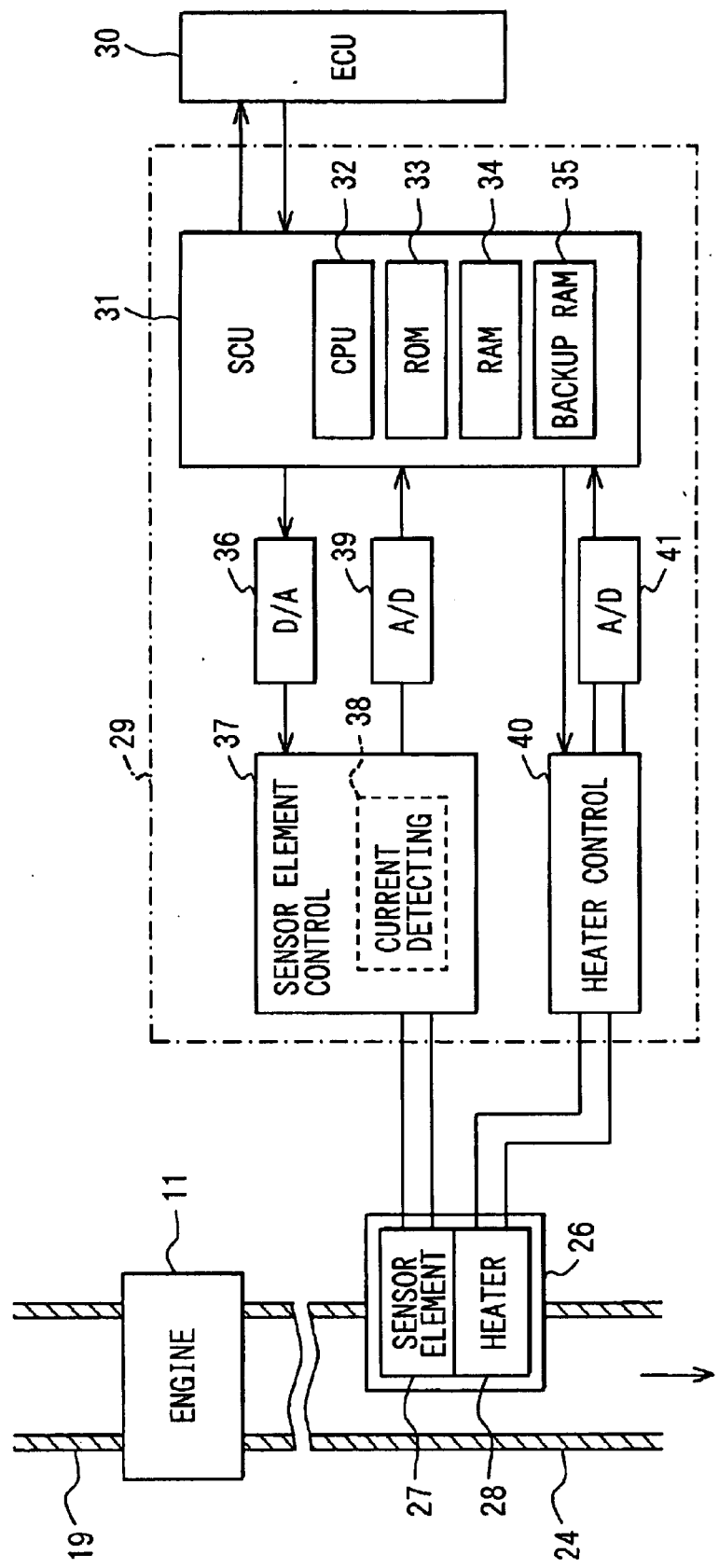
FIG. 2 is a block diagram showing the emission control system implemented by the first embodiment of the present invention.

On an exhaust pipe 24 of the engine 11, on the other had, a catalyst 25 such as a three way catalyst is provided for reducing the quantities of emissions such as CO, HC and NOx, which are contained in exhaust gas. On the upstream side of the catalyst 25, an air-fuel ratio sensor 26 (or an exhaust gas sensor) is provided for detecting an air-fuel ratio of exhaust gas. A sensor element 27 is employed in the air-fuel ratio sensor 26 as shown in FIG. 2. By merely relying on heat dissipated by exhaust gas, it is difficult to speed activation of the sensor element 27 after a start of the engine 11. In order to solve this problem, a heater 28 is embedded in the air-fuel ratio sensor 26 to be used as a means for generating heat for speeding a process to activate the sensor element 27. In addition, a current flowing through the heater 28 is controlled to maintain the temperature of the sensor element 27 in an activation temperature range during an operation of the engine 11. The impedance Zdc of the sensor element 27 employed in the air-fuel ratio sensor 26 is dependent on the temperature of the sensor element 27. Specifically, the impedance Zdc of the sensor element 27 decreases as the temperature of the sensor element 27 increases as indicated by a characteristic shown in FIG. 16. The impedance Zdc of the sensor element 27 is also referred to simply as an element impedance Zdc.

The air-fuel ratio sensor 26 is controlled by a sensor control circuit 29. The sensor control circuit 29 has a sub-microcomputer abbreviated hereafter to an SCU 31 for exchanging data with an engine control circuit (ECU) 30. The engine control circuit 30 plays the role of a host computer for the SCU 31. The engine control circuit 30 is a microcomputer serving as a core component for controlling the entire engine 11. In particular, the engine control circuit 30 controls ignition and fuel injection operations by computing an ignition command signal and a fuel injection signal by execution of an ignition and fuel injection control routine stored in a ROM not shown in the figure and outputting the ignition command signal and the fuel injection signal to an ignition unit 42 and the fuel injection valve 20 respectively.

On the other hand, as shown in FIG. 2, the SCU 31 includes embedded components such as a CPU 32, a ROM 33 serving as a recording medium, a RAM 34 and a backup RAM 35 backed up by a battery not shown in the figure. In order to control a voltage applied to the sensor element 27, the SCU 31 outputs an applied voltage command signal to a sensor element applied voltage control circuit 37 by way of a D/A converter 36. In a normal operation to detect an air-fuel ratio, the sensor element applied voltage control circuit 37 executes control to hold a voltage applied to the sensor element 27 at a predetermined level. The voltage applied to the sensor element 27 is a difference in electric potential between terminals of the sensor element 27. The sensor element applied voltage control circuit 37 includes an embedded current detection circuit 38 for detecting an element current, which flows through the sensor element 27 in accordance with the air-fuel ratio of exhaust air. A voltage corresponding to the element current detected by the current detection circuit 38 is supplied to the SCU 31 as an air-fuel ratio detection signal by way of an A/D converter 39.

In addition, the SCU 31 outputs a duty signal to a heater control circuit 40, driving the heater control circuit 40 to control a conduction rate (a duty ratio) of the heater 28. The heater control circuit 40 detects a heater voltage and a heater current, supplying detection signals of the heater voltage and the heater current to the SCU 31 by way of an A/D converter 41. By the heater voltage, a difference in electric potential between terminals of the heater 28 is meant.

Figure 3:
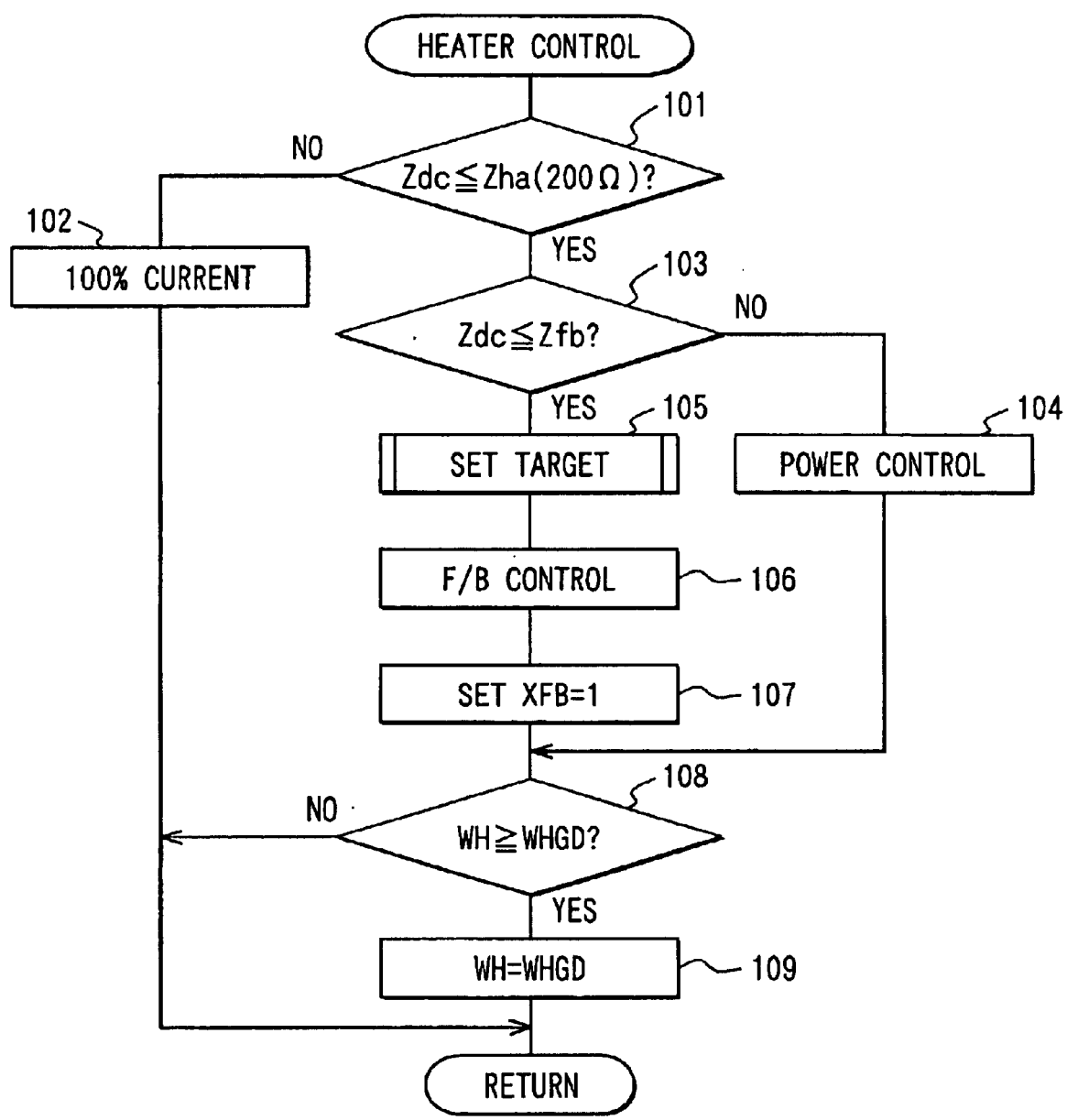
FIG. 3 shows a flowchart representing control executed by the emission control system implemented by the first embodiment of the present invention.
Figure 7:
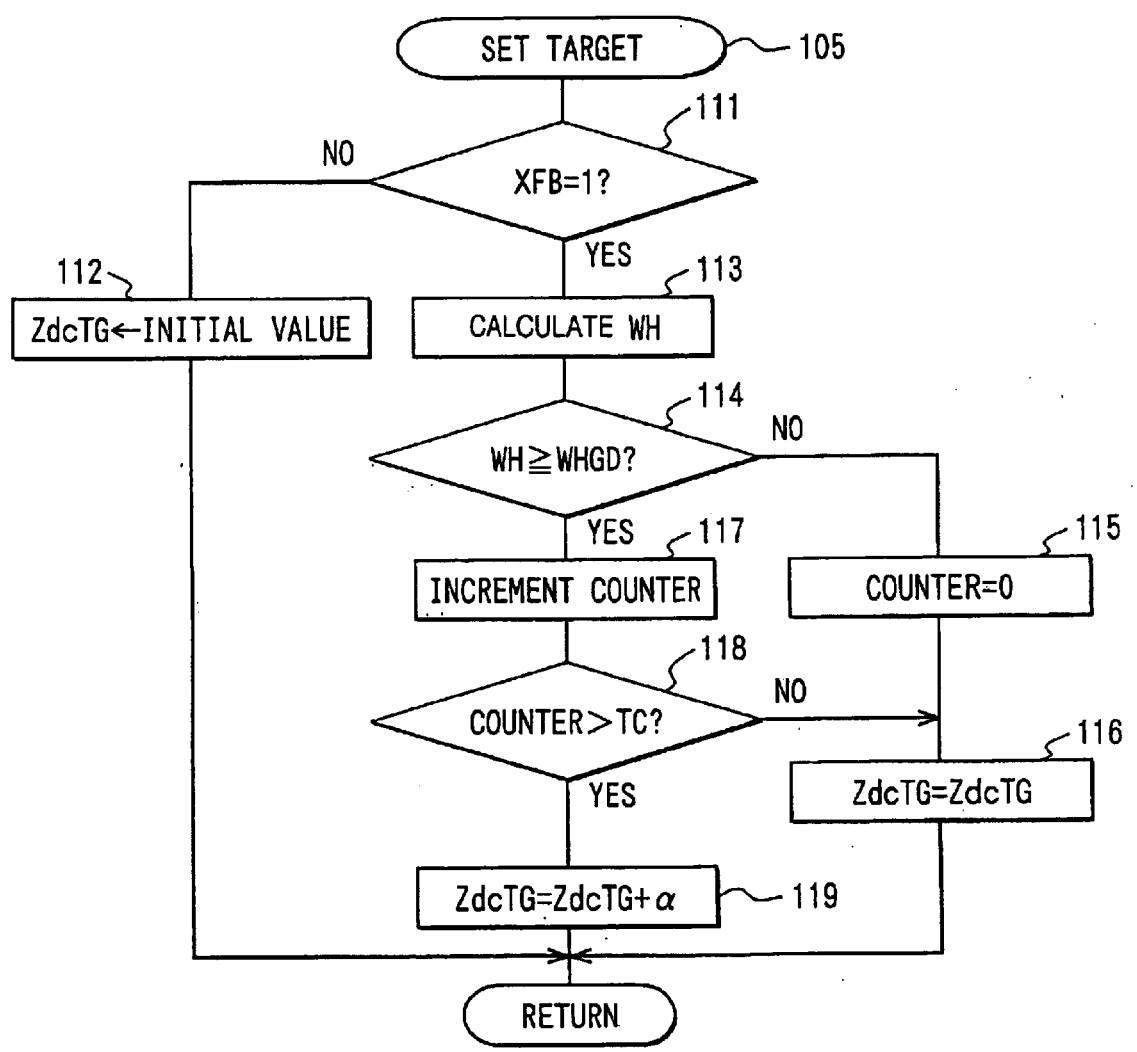
FIG. 7 shows a flowchart representing control executed by the emission control system implemented by the first embodiment of the present invention.

Routines for controlling the heater current as shown in flowcharts of FIGS. 3 and 7 are stored in the ROM 33 employed in the SCU 31. By the heater current, a current flowing through the heater 28 is implied. The following description explains processing carried out by execution of these routines by the SCU 31.

The heater control routine represented by the flowchart shown in FIG. 3 is invoked as a timer interrupt routine at predetermined intervals of typically 128 ms. When this routine is invoked, the routine begins with a step 101 to determine whether or not the element impedance Zdc of the air-fuel ratio sensor 26 has decreased to a value equal to or smaller than a predetermined semi-activation criterion value Zha of typically 200 ohms, that is, whether or not the sensor element 27 has reached a state of being semi-activated.

Figure 4:
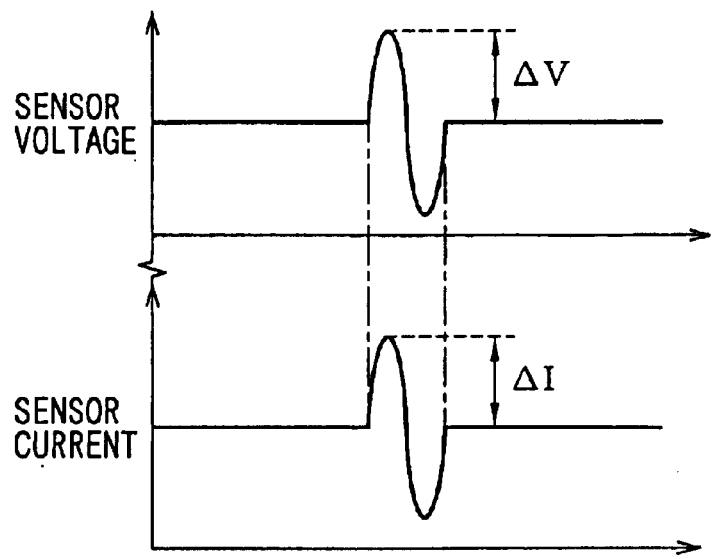
FIG. 4 shows time charts of a sensor voltage and a sensor current in the emission control system implemented by the first embodiment of the present invention.

In the determination, the element impedance Zdc is detected as follows. As shown in FIG. 4, in detection of the element impedance Zdc, the voltage applied to the air-fuel ratio sensor 26 is changed to a negative direction after being temporarily changed in a positive direction. Then, the element impedance Zdc is found in accordance with an equation given below from a change in voltage $\Delta V$ and a change in current $\Delta I$, which are resulted in when the applied voltage is changed in the positive (or negative) direction.

$$Zdc = \Delta V / \Delta I$$

It is to be noted that the above method of detecting the element impedance Zdc is merely a typical technique. As an alternative, the element impedance Zdc is found from changes in voltage and current, which are resulted in when the applied voltage is changed in both the positive and negative directions. As another alternative, the element impedance Zdc is found from a sensor voltage Vneg and a sensor current Ineg (Zdc=Vneg/Ineg) where the sensor voltage Vneg is a negative voltage applied to the air-fuel ratio sensor 26 and the sensor current Ineg is a current, which flows through the air-fuel ratio sensor 26 when the negative sensor voltage vneg is applied to the air-fuel ratio sensor 26.

If the determination result obtained at the step 101 indicates that the element impedance Zdc of the air-fuel ratio sensor 26 has not decreased to a value equal to or smaller than the predetermined semi-activation criterion value Zha of 200 ohms, the sensor element 27 is determined to have not entered the state of being semi-activated. In this case, the flow of the routine goes on to a step 102 at which the heater 28 is controlled at a conduction rate (or a duty ratio) of 100%. Such control is referred to as 100% conduction control by which the conduction rate (or a duty ratio) of the heater 28 is sustained at 100%. That is, the amount of heat generated by the heater 28 is maintained at a maximum value to speed an operation to raise the temperature of the sensor element 27. The execution of the 100% conduction control is continued till the sensor element 27 enters the state of being semi-activated.

Thereafter, the temperature of the sensor element 27 is increased by heat generated by the heater 28. Then, as the determination result obtained at the step 101 indicates that the element impedance Zdc of the air-fuel ratio sensor 26 has decreased to a value equal to or smaller than the predetermined semi-activation criterion value Zha of 200 ohms, the sensor element 27 is determined to have entered the state of being semi-activated. In this case, the flow of the routine goes on to a step 103 to determine whether or not the element impedance Zdc of the air-fuel ratio sensor 26 has decreased to a value equal to or smaller than a predetermined criterion value Zfb, which is a criterion as to whether or not to element-impedance feedback control is to be started. The element-impedance feedback control is referred to hereafter as element-impedance F/B control. The criterion value Zfb to start the element-impedance F/B control is also a criterion as to whether or not the temperature of the sensor element 27 has increased to a value close to an activation temperature, that is, whether or not the sensor element 27 has entered an activated state. The criterion value Zfb is set at a value greater than a target impedance ZdcTG stored in the backup RAM 24 by a difference of about 10 ohms. Assume for example that an initial value of the target impedance ZdcTG, that is, a value prior to sensor deterioration, is 30 ohms. In this case, the criterion value Zfb is set at 40 ohms (=30 ohms+10 ohms) at the beginning of the element-impedance F/B control.

Figure 5:
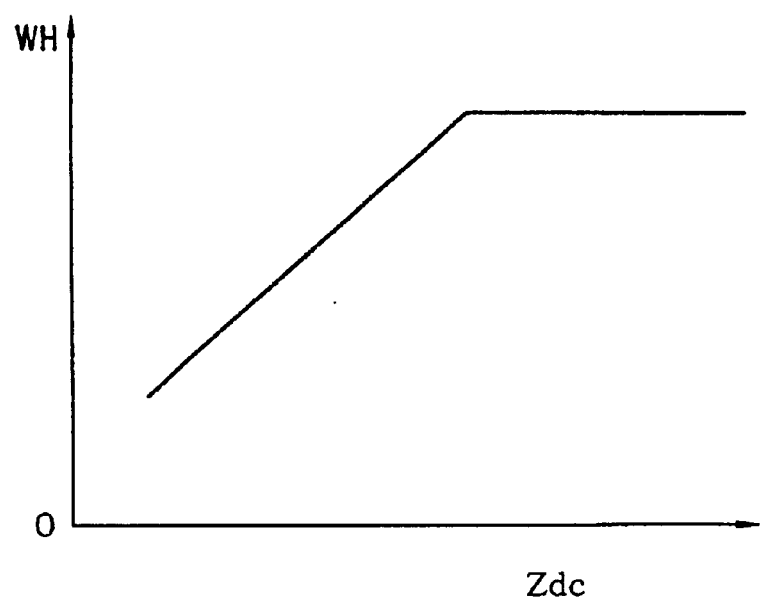
FIG. 5 is a diagram showing a graph representing a control characteristic of the emission control system implemented by the first embodiment of the present invention.

If the determination result obtained at the step 103 is 'No' indicating that the temperature of the sensor element 27 has not increased to a value close to an activation temperature, that is, the sensor element 27 has not entered an activated state, the flow of the routine goes on to a step 104 at which the conduction of the heater 28 is subjected to 'power control'. In the power control, a power command value WH for the element impedance Zdc is determined from a map representing a relation between the power command value WH and the element impedance Zdc as shown in FIG. 5. Then, a duty ratio (Duty) for the power command value WH is found. This power control is executed when the sensor element 27 is in the state of being semi-activated till the activated state is completed.

Then, the flow of the routine goes on to a step 108 to determine whether or not the power command value WH is at least equal to a power guard value WHGD found by a power-guard-value-setting routine, which is shown in none of the figures. If the power command value WH is found at least equal to the power guard value WHGD, the flow of the routine goes on to a step 109 at which the power command value WH is set at the power guard value WHGD. Then, the execution of this routine is ended. If the power command value WH is found smaller than the power guard value WHGD, on the other hand, the power command value WH found at the step 104 is used as it is and the execution of this routine is ended.

Thereafter, when this routine is activated again after the temperature of the sensor element 27 has increased to a value close to an activation temperature, a determination result of 'Yes' is obtained at the step 103. In this case, the flow of the routine goes on to a step 105 to execute a target-impedance-setting routine represented by the flowchart shown in FIG. 7. As will be described later, in the target-impedance-setting routine, a target impedance ZdcTG is set. Then, at the next step 106, the element-impedance F/B control is executed. In the element-impedance F/B control, typically, PID control is adopted to find a duty ratio Duty, that is, a conduction rate of the heater 28 as follows:

First of all, a proportional term GP, an integral term GI and a differential term GD are found by using Eqs. (1) to (3) respectively.

$$GP = KP \cdot (Zdc - ZdcTG) \quad (1)$$

$$GI = GI(i-1) + KI \cdot (Zdc - ZdcTG) \quad (2)$$

$$GD = KD \cdot \{Zdc - Zdc(i-1)\} \quad (3)$$

where notations KP, KI and KD denote a proportional constant, an integral constant and a differential constant respectively whereas notations GI (i−1) and Zdc(i−1) are respectively an integral term GI and an element impedance, which were found in the immediately preceding execution of the element-impedance F/B control.

A duty ratio Duty is then found from the computed values of the proportional term GP, the integral term GI and the differential term GD as follows:

$$Duty = GP + GI + GD$$

Then, a power command value for the duty ratio Duty is computed. It is to be noted that the element-impedance F/B control to find a duty ratio Duty is not limited to the PID control. For example, a duty ratio Duty can also be found by adoption of PI or P control.

Then, at the next step 107, a flag XFB is set at 1. The flag XFB indicates whether or not the element-impedance F/B control has been executed. Specifically, a flag XFB set at 1 indicates that the element-impedance F/B control has been executed. On the other hand, a flag XFB reset to 0 indicates that the element-impedance F/B control has not been executed. It is to be noted that, when the ignition key is turned on, the flag XFB is reset to 0.

In the execution of the element-impedance F/B control at the step 106, a power guard value WHGD is found by execution of a power-guard-value-setting routine, which is shown in none of the figures. Then, the guard processing of the power command value is carried out at the steps 108 and 109 as described above. At that time, if the power command value WH has reached the power guard value WHGD, the duty ratio Duty found at the step 106 is corrected in accordance with the power guard value WHGD.

As described above, the conduction state of the heater 28 is subjected to the 100% conduction control and then subjected to the power control in accordance with the increasing temperature of the sensor element 27 or the decreasing element impedance Zdc. In the 100% conduction control and the power control, the temperature of the sensor element 27 is increased to a value close to the activation temperature. As the temperature of the sensor element 27 is increased to a value close to the activation temperature, the element-impedance F/B control is executed to maintain the element impedance Zdc at the target impedance ZdcTG so that the temperature of the sensor element 27 is sustained at the activation temperature.

Figure 6:
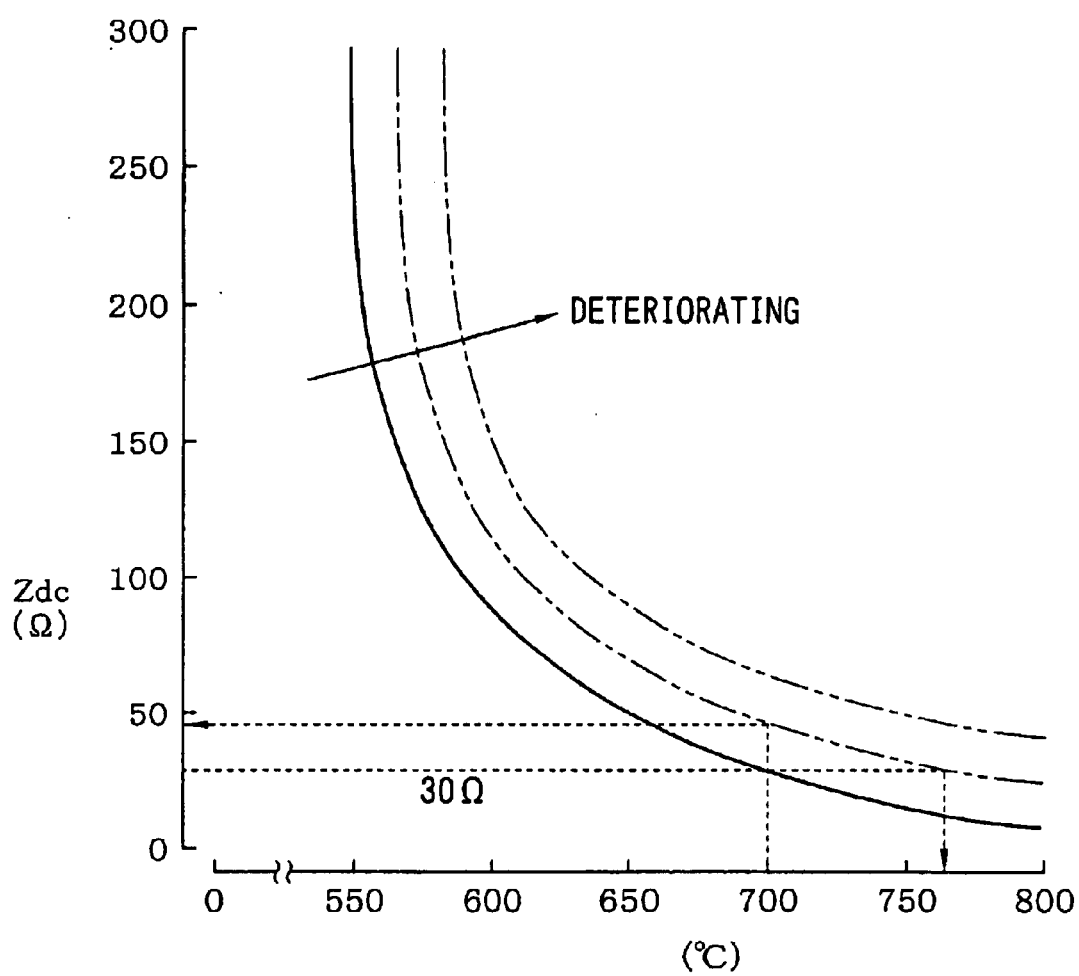
FIG. 6 is a diagram showing graphs representing sensor characteristics of the emission control system implemented by the first embodiment of the present invention.

Assume for example that a target temperature (that is, an optimum activation temperature) of the sensor element 27 is 700 degrees Celsius. In this case, as shown in FIG. 6, if the target impedance ZdcTG is set at 30 ohms prior to deterioration of the air-fuel ratio sensor 26, the temperature of the sensor element 27 can be maintained at the optimum activation temperature of 700 degrees Celsius. After deterioration of the air-fuel ratio sensor 26, however, the temperature of the sensor element 27 will far exceed the optimum activation temperature of 700 degrees Celsius with the target impedance ZdcTG set at 30 ohms. In this case, the worse the deterioration of the air-fuel ratio sensor 26, the farther the temperature of the sensor element 27 exceeds the optimum activation temperature.

In order to solve this problem, the target-impedance-setting routine represented by the flowchart shown in FIG.

7 is executed to increase the target impedance ZdcTG by an increment dependent on the degree of deterioration of the air-fuel ratio sensor 26 so that, even if the air-fuel ratio sensor 26 deteriorates, the temperature of the sensor element 27 can be maintained at the optimum activation temperature of 700 degrees Celsius.

The target-impedance-setting routine represented by the flowchart shown in FIG. 7 is a subroutine executed at the step 105 of the heater control routine represented by the flowchart shown in FIG. 3. When the target-impedance-setting routine is invoked, the flowchart shown in FIG. 7 begins with a step S111 to determine whether or not the flag XFB has been set at 1, indicating that the element-impedance F/B control has been executed. If the flag XFB is 0, indicating that the element-impedance F/B control has not been started, the flow of the routine goes on to a step 112 at which the target impedance ZdcTG is read out from the backup RAM 24 and used as an initial value. This initial value of the target impedance ZdcTG is used in the element-impedance F/B control to be executed at the step 106 of the flowchart shown in FIG. 3.

After the element-impedance F/B control is executed, the flag XFB is set at 1 at the step 107 of the flowchart shown in FIG. 3. When the target-impedance-setting routine represented by the flowchart shown in FIG. 7 is invoked again, the determination result obtained at the step 111 indicates that the flag XLB is 1. In this case, the flow of the routine goes on to a step 113 at which a heater power WH is computed from a present heater voltage Vh and a present heater current Ih in accordance with the following equation: (WH=Vh×Ih). Then, the flow of the routine goes on to a step 114 to determine whether or not the computed heater power WH is at least equal to a power guard value WHGD. If the computed heater power WH is smaller than the power guard value WHGD (WH<WHGD), the flow of the routine goes on to a step 115 at which a counter is reset to 0. The count value of the counter represents the time lapse of a state of WH≧WHGD. Then, at the next step 116, the target impedance ZdcTg is set at its present value. Prior to deterioration of the air-fuel ratio sensor 26, for example, the target impedance ZdcTg is set at 30 ohms. Then, the execution of this routine is ended.

If the determination result obtained at the step 114 is WH≧WHGD, on the other hand, the flow of the routine goes on to a step 117 at which the count value representing the time lapse of a state of WH≧WHGD is incremented. Then, the flow of the routine goes on to a step 118 to determine whether or not the time lapse of a state of WH≧WHGD is at least equal to a predetermined time Tc of typically 5 minutes. If the time lapse of a state of WH≧WHGD is found shorter than the predetermined time Tc, the air-fuel ratio sensor 26 is determined to have not deteriorated. In this case, the flow of the routine goes on to the step 116 at which the target impedance ZdcTG is kept at its present value. If the time lapse of a state of WH≧WHGD is found at least equal to the predetermined time Tc, on the other hand, the air-fuel ratio sensor 26 is determined to have deteriorated. In this case, the flow of the routine goes on to a step 119 at which the target impedance ZdcTG is incremented by a predetermined value α. Then, the execution of this routine is ended.

The target impedance ZdcTG corrected at the step 119 is stored in the backup RAM 35 and preserved therein even if the engine 11 is stopped. When this routine is invoked after a next start of the engine 11, this corrected target impedance ZdcTG is read out from the backup RAM 35 at the step 112.

On the other hand, the engine control circuit 30 executes a catalyst warming up speeding control routine represented by a flowchart shown in FIG. 8 as described below at predetermined crank-angle intervals after an ignition switch shown in none of the figures is turned on. When this routine is invoked, the flowchart begins with a step 121 to determine whether or not a condition for execution of the catalyst warming up speeding control is satisfied. The condition for execution of the catalyst warming up speeding control includes a sub-condition requiring that the catalyst 25 shall be in a state prior to a warmed-up state or a state of being inactivated and a sub-condition requiring that the engine 11 shall be in an operating state allowing ignition-timing-delaying control to be executed. An example of the operating state allowing ignition-timing-delaying control to be executed is an idle operating state. If these sub-conditions are both satisfied, the condition for execution of the catalyst warming up speeding control is considered to hold true. It is to be noted that whether the catalyst 25 is in a state prior to a warmed-up state can be determined on the basis of a lapse of time since a start of the engine 11 and a temperature of the cooling water or on the basis of a cumulative value of the intake air volume since a start of the engine 11 and a cumulative value of the fuel injection volume since a start of the engine 11. In few words, the determination of whether or not the catalyst 25 is in a state prior to a warmed-up state can be based on parameters related to the total amount of heat supplied to the catalyst 25 since a start of the engine 11.

If the condition for execution of the catalyst warming up speeding control is found satisfied, the flow of the routine goes on to a step 122 at which the ignition-timing-delaying control is executed to increase the amount of heat dissipated by exhaust gas so as to speed an operation to warm up the catalyst 25. Thereafter, as the condition for execution of the catalyst warming up speeding control becomes unsatisfied, the flow of the routine goes on to a step 123 at which the execution of the catalyst warming up speeding control is ended to make a transition to normal ignition-timing control.

Figure 9:
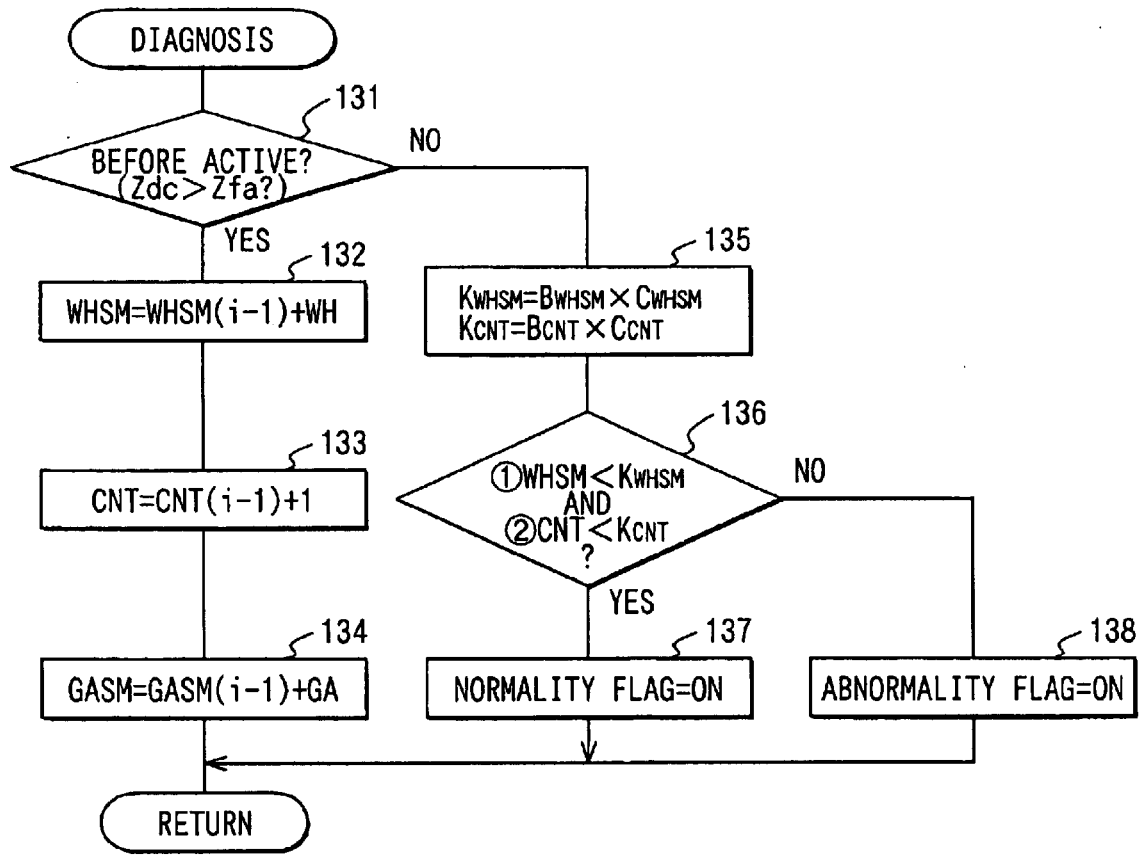
FIG. 9 shows a flowchart representing control executed by the emission control system implemented by the first embodiment of the present invention.

In addition, the engine control circuit (or the ECU) 30 invokes a catalyst warming up speeding control diagnosis routine represented by a flowchart shown in FIG. 9 as a timer interrupt routine at predetermined intervals of typically 128 ms to make a diagnosis of the emission control system in playing the role of a diagnosis means described in claims of this specification. It is to be noted that this routine can also be executed by the SCU 31.

The following description briefly explains a method of making a diagnosis of the emission control system by execution of the catalyst warming up speeding control diagnosis routine. After the engine 11 is started, the air-fuel ratio sensor 26 is heated by exhaust gas flowing through a periphery surrounding the air-fuel ratio sensor 26 and by heat generated by the heater 28, causing the temperature of the air-fuel ratio sensor 26 to increase. Thus, an operation to warm up the air-fuel ratio sensor 26 is speeded so that a signal output by the air-fuel ratio sensor 26 rises to a normal level. In the event of a failure or the like in the emission control system, the amount of heat dissipated by exhaust gas during execution of the control to speed an operation to warm up the catalyst 25 decreases, making the operation to warm up the catalyst 25 or the activation of the catalyst 25 late so that the activation of the air-fuel ratio sensor 26 also becomes late.

As a result of inspiration by a correlation between the state of progress of an operation to warm up the catalyst 25 and the state of progress of the activation of the air-fuel ratio sensor 26, there is devised a scheme wherein it is possible to indirectly determine whether or not the state of progress of an operation to warm up the catalyst 25 is very late by determining whether or not the state of progress of the activation of the air-fuel ratio sensor 26 is extremely late. In turn, by determining whether or not the state of progress of an operation to warm up the catalyst 25 is extremely late, it is possible to determine whether or not an abnormality exists in the emission control system.

It is possible to determine whether the state of progress of the activation of the air-fuel ratio sensor 26 is late or normal on the basis of the lapse of time to an activated state of the air-fuel ratio sensor 26 since a start of the engine 11 and on the basis of a cumulative value of power consumed by the heater 28 since the start of the engine 11. The cumulative value of power consumed by the heater 28 since the start of the engine 11 is referred to hereafter as a heater power cumulative value. That is, in the event of a failure or the like in the emission control system, the amount of heat dissipated by exhaust gas during execution of the control to speed an operation to warm up the catalyst 25 decreases, increasing the length of time to an activated state of the air-fuel ratio sensor 26 since a start of the engine 11 as well as increasing the heater power cumulative value. Thus, by comparing the lapse of time to an activated state of the air-fuel ratio sensor 26 since a start of the engine 11 and the heater power cumulative value with their respective criteria, it is possible to determine whether or not the activation of the air-fuel ratio sensor 26 is abnormally late. Thus, it is also possible to determine whether or not the activation of the catalyst 25 is abnormally late. As a result, it is possible to make a diagnosis of the emission control system in order to determine whether or not an abnormality exists in the emission control system.

The following description explains processing carried out by execution of the catalyst warming up speeding control diagnosis routine represented by a flowchart shown in FIG. 9 in a diagnosis of the emission control system. When the catalyst warming up speeding control diagnosis routine is invoked, the flowchart begins with a step 131 to determine whether or not the element impedance Zdc of the air-fuel ratio sensor 26 is greater than a predetermined activation criterion value Zfa of typically 40 ohms, that is, whether or not the sensor element 27 is in a state of being inactivated. The activation criterion value can be the same as the criterion value used at the beginning of the element-impedance F/B control at the step 103 of the flowchart shown in FIG. 3.

If the determination result obtained at the step 131 indicates that the element impedance Zdc of the air-fuel ratio sensor 26 is greater than the predetermined activation criterion value Zfa, the sensor element 27 is determined to be in a state of being inactivated. In this case, the flow of the routine goes on to a step 132 at which a stored heater-power cumulative value WHSM is updated by adding a current heater power WH computed at the step 113 of the flowchart shown in FIG. 7 to an immediately preceding heater-power cumulative value WHSM(i-1). The immediately preceding heater-power cumulative value WHSM(i-1) is a value of the heater power cumulated since the start of the engine 11 till the immediately preceding execution of this catalyst warming up speeding control diagnosis routine.

Then, the flow of the routine goes on to a step 133 to increment a post-engine-start time-lapse counter CNT representing a time lapsing since the start of the engine 11. Then, at the next step 134, a stored intake airflow rate cumulative value GASM is updated by adding a current intake air volume GA to an immediately preceding intake airflow rate cumulative value GASM(i-1). The immediately preceding intake airflow rate cumulative value GASM(i-1) is a value of the intake air volume cumulated since the start of the engine 11 till the immediately preceding execution of this catalyst warming up speeding control diagnosis routine.

Thereafter, as the air-fuel ratio sensor 26 is activated, lowering the element impedance Zdc of the air-fuel ratio sensor 26 to a value not greater than the predetermined activation criterion value Zfa of typically 40 ohms, a determination result of 'No' is obtained at the step 131. In this case, the flow of the routine goes on to a step 135 at which diagnosis criterion values $K_{WHSM}$ and $K_{CNT}$ are found by using the following equations:

$$K_{WHSM} = B_{WHSM} \times C_{WHSM}$$

$$K_{CNT} = B_{CNT} \times C_{CNT}$$

where notations $B_{WHSM}$ and $B_{CNT}$, each denote a base value whereas notations $C_{WHSM}$ and $C_{CNT}$ denote correction coefficients for correcting the base values $B_{WHSM}$ and $B_{CNT}$ respectively in accordance with an operating condition of the engine 11. A base value is a reference criterion value set in advance under a reference operating condition. The processing at the step 135 is carried out to play the role of a correction means.

Figure 10:
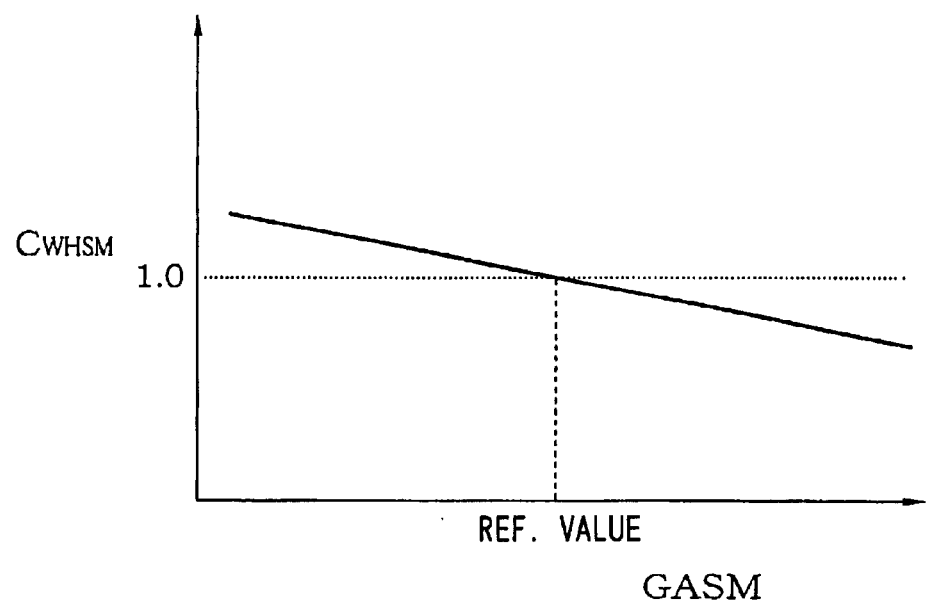
FIG. 10 is a diagram showing a graph representing a control characteristic of the emission control system implemented by the first embodiment of the present invention.
Figure 11:
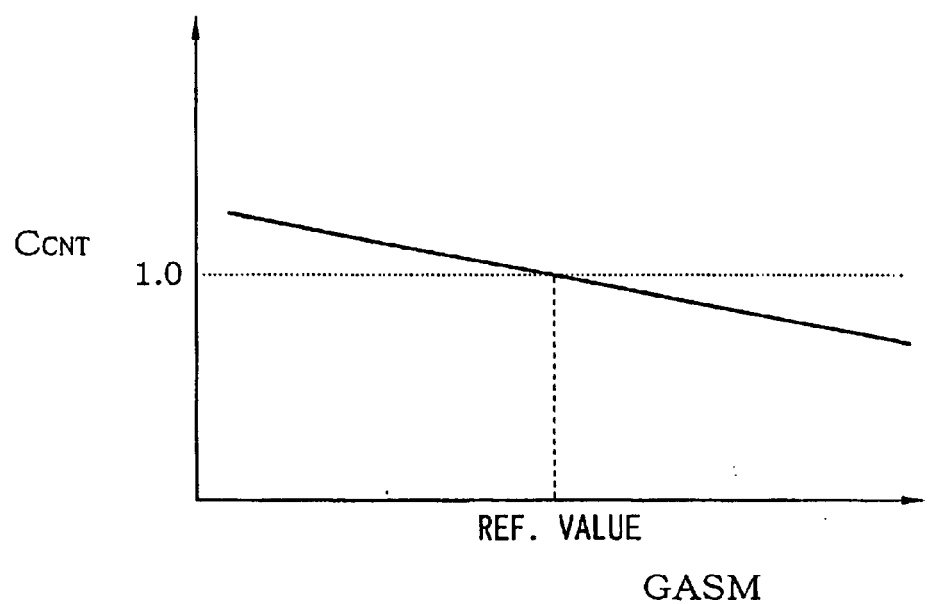
FIG. 11 is a diagram showing a graph representing a control characteristic of the emission control system implemented by the first embodiment of the present invention.

Considering the fact that the amount of exhaust heat supplied to the air-fuel ratio sensor 26 changes in accordance with the intake air volume GA (or the exhaust gas flow rate), this catalyst warming up speeding control diagnosis routine computes an intake airflow rate cumulative value GASM cumulated since the start of the engine 11 till the activated state of the air-fuel ratio sensor 26 at the step 134. After the air-fuel ratio sensor 26 is activated, the flow of the routine goes on to a step 135 at which correction coefficients $C_{WHSM}$ and $C_{CNT}$ for the intake airflow rate cumulative value GASM are found from maps shown in FIGS. 10 and 11 respectively. Considering the fact that, the larger the intake airflow rate cumulative value GASM, the larger the amount of exhaust heat supplied to the air-fuel ratio sensor 26 and, hence, the faster the air-fuel ratio sensor 26 is activated, the maps are set in such a way that, the larger the intake airflow rate cumulative value GASM, the smaller the correction coefficients $C_{WHSM}$ and $C_{CNT}$. For an intake airflow rate cumulative value GASM equal to a reference value, the correction coefficients $C_{WHSM}$ and $C_{CNT}$ are each set at 1.0. For an intake airflow rate cumulative value GASM equal to a reference value, the base values $B_{WHSM}$ and $B_{CNT}$ correspond to respectively criterion values $K_{WHSM}$ and $K_{CNT}$, which are found typically by experiments or simulation.

Figure 12:
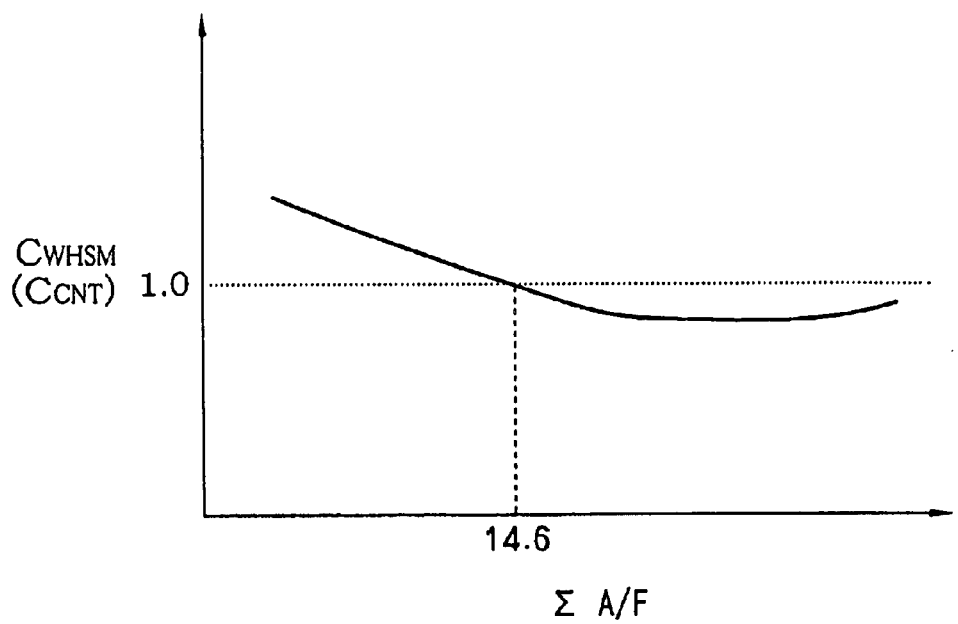
FIG. 12 is a diagram showing a graph representing a control characteristic of the emission control system implemented by the first embodiment of the present invention.

It is to be noted that, in place of the intake airflow rate cumulative value GASM, an average value of intake air volumes GA can also be found. In this case, correction coefficients $C_{WHSM}$ and $C_{CNT}$ for the average intake airflow rate cumulative value GASM are found. In addition, in accordance with the air-fuel ratio, the temperature of exhaust gas varies, changing the amount of exhaust heat supplied to the air-fuel ratio sensor 26. Thus, as an alternative, correction coefficients $C_{WHSM}$ and $C_{CNT}$ may be found for an air-fuel ratio cumulative value $\Sigma A/F$ cumulated since the start of the engine 11 till the activated state of the air-fuel ratio sensor 26 or an air-fuel ratio average value taken with respect to air-fuel ratios over a period from the start of the engine 11 to the activated state of the air-fuel ratio sensor 26 by using a map like one shown in FIG. 12.

Figure 13:
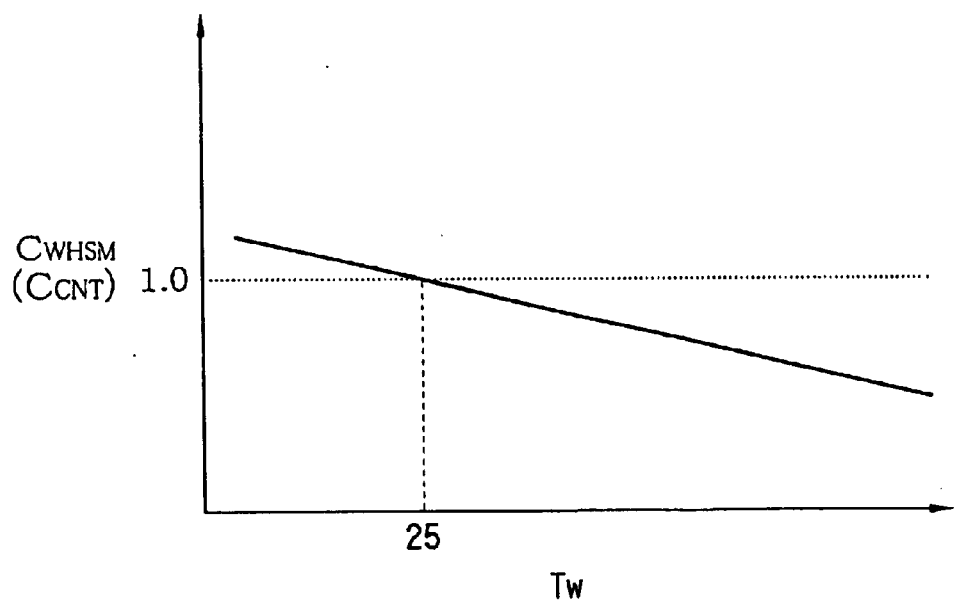
FIG. 13 is a diagram showing a graph representing a control characteristic of the emission control system implemented by the first embodiment of the present invention.

Furthermore, in accordance with the intake pipe initial temperature at the start of the engine 11, the temperature of exhaust gas varies, changing the amount of exhaust heat supplied to the air-fuel ratio sensor 26. Thus, as another alternative, correction coefficients $C_{WHSM}$ and $C_{CNT}$ may be found for a parameter having a correlation with the intake pipe initial temperature at the start of the engine 11 by using a map like one shown in FIG. 13. Examples of the parameter include the cooling water temperature Tw at the start of the engine 11, an oil temperature, an intake air temperature and the length of a stop time period of the engine 11.

Figure 14:
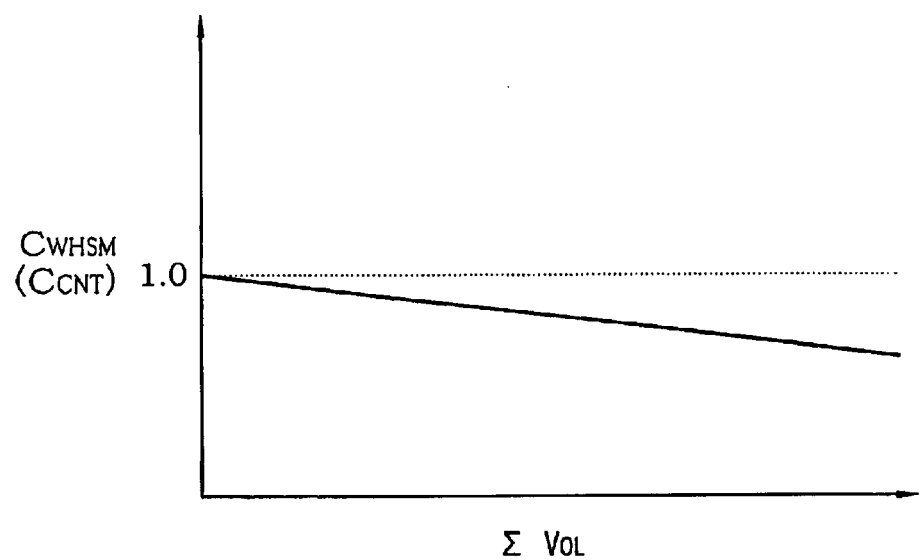
FIG. 14 is a diagram showing a graph representing a control characteristic of the emission control system implemented by the first embodiment of the present invention.

Moreover, in the case of an engine 11 including a variable-valve-timing mechanism, in accordance with a valve overlap magnitude Vol, the temperature of exhaust gas varies, changing the amount of exhaust heat supplied to the air-fuel ratio sensor 26. Thus, as a further alternative, correction coefficients $C_{WHSM}$ and $C_{CNT}$ may be found for a valve-overlap-magnitude cumulative value ΣVol cumulated since the start of the engine 11 till the activated state of the air-fuel ratio sensor 26 or a valve-overlap-magnitude average value taken with respect to valve overlap magnitudes over a period from the start of the engine 11 to the activated state of the air-fuel ratio sensor 26 by using a map like one shown in FIG. 14.

Figure 15:
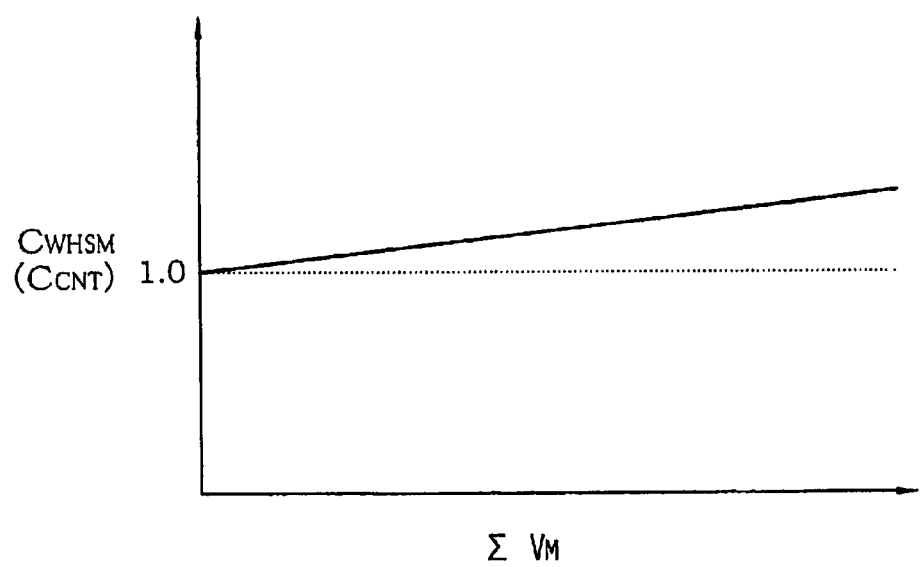
FIG. 15 is a diagram showing a graph representing a control characteristic of the emission control system implemented by the first embodiment of the present invention.

In addition, as the car speed Vm increases, the amount of the running-resisting wind cooling the exhaust pipe 24 also rises so that the temperature of the exhaust pipe 24 increases less. Thus, the increase in exhaust gas temperature decreases, making the activation of the air-fuel ratio sensor 26 late. In order to solve this problem, as a still further alternative, correction coefficients $C_{WHSM}$ and $C_{CNT}$ may be found for a car-velocity cumulative value ΣVm cumulated since the start of the engine 11 till the activated state of the air-fuel ratio sensor 26 or a car-velocity average value taken with respect to car velocities over a period from the start of the engine 11 to the activated state of the air-fuel ratio sensor 26 by using a map like one shown in FIG. 15.

Furthermore, in accordance with the magnitude of an ignition-timing delay, the temperature of exhaust gas varies, changing the amount of exhaust heat supplied to the air-fuel ratio sensor 26. Thus, as a still further alternative, a correction coefficient $C_{CNT}$ may be found for an ignition-timing-delay-magnitude cumulative value cumulated since the start of the engine 11 till the activated state of the air-fuel ratio sensor 26 or an ignition-timing-delay-magnitude average value taken with respect to ignition-timing-delay magnitudes over a period from the start of the engine 11 to the activated state of the air-fuel ratio sensor 26.

In this catalyst warming up speeding control diagnosis routine, the base values $B_{WHSM}$ and $B_{CNT}$ are corrected by using the correction coefficients $C_{WHSM}$ and $C_{CNT}$, which are found on the basis of only one parameter, namely, the average intake airflow rate cumulative value GASM. It is to be noted, however, that the base values $B_{WHSM}$ and $B_{CNT}$ can also be corrected by using the correction coefficients $C_{WHSM}$ and $C_{CNT}$, which are found on the basis of a plurality of parameters described above. In this case, the correction coefficients $C_{WHSM}$ and $C_{CNT}$ are found by using the parameters from the maps shown in FIGS. 10 to 15. Instead of using the maps, the correction coefficients $C_{WHSM}$ and $C_{CNT}$ can each be found in accordance with an equation expressing each of the coefficients $C_{WHSM}$ and $C_{CNT}$ as a function of such parameters.

In addition, in this catalyst warming up speeding control diagnosis routine, the base values Bwshm and $B_{CNT}$ are corrected by using the correction coefficients $C_{WHSM}$ and $C_{CNT}$ respectively before being used as respectively the criterion values $K_{WHSM}$ and $K_{CNT}$ of the diagnosis. As an alternative, the heater-power cumulative value WHSM cumulated since the start of the engine 11 till the activated state of the air-fuel ratio sensor 26 and the count value of the post-engine-start time-lapse counter CNT representing a time lapsing since the start of the engine 11 till the activated state of the air-fuel ratio sensor 26 can also be corrected by using the correction coefficients $C_{WHSM}$ and $C_{CNT}$ respectively. In this case, the base values $B_{WHSM}$ and $B_{CNT}$ are used as respectively the criterion values $K_{WHSM}$ and $K_{CNT}$ of the diagnosis.

After the criterion values $K_{WHSM}$ and $K_{CNT}$ of the diagnosis are found at the step 135 as described above, the flow of the routine goes on to a step 136 to determine whether or not following conditions (1) and (2) are both satisfied, that is, whether or not the activation of the air-fuel ratio sensor 26 has been progressing normally and, hence, whether the emission control system is normal or abnormal.

(1): The heater-power cumulative value WHSM cumulated since the start of the engine 11 till the activated state of the air-fuel ratio sensor 26 shall be smaller than a criterion value $K_{WHSM}$ (WHSM<$K_{WHSM}$).

(2): The count value CNT of post-engine-start time-lapse counter representing the lapse of time since the start of the engine 11 till the activated state of the air-fuel ratio sensor 26 shall be smaller than a criterion value $K_{CNT}$ (CNT<$K_{CNT}$).

If both conditions (1) and (2) are satisfied, the activation of the air-fuel ratio sensor 26 and, hence, the operation to speed an operation to warm up the catalyst 25 are determined to have been carried out normally. In this case, the flow of the routine goes on to a step 137 at which a normalcy determination flag is set in an 'ON' state to indicate that the emission control system is functioning normally. Then, the execution of this routine is ended.

If any of conditions (1) and (2) are not satisfied, on the other hand, the activation of the air-fuel ratio sensor 26 and, hence, the operation to speed an operation to warm up the catalyst 25 are determined to have not been carried out normally. In this case, the flow of the routine goes on to a step 138 at which an abnormality determination flag is reset to an 'ON' state to indicate that the emission control system is not functioning normally. Then, the execution of this routine is ended.

The processing of the step 136 is carried out to play the role of a sensor activation determination means.

It is to be noted that, as an alternative, the diagnosis criterion values $K_{WHSM}$ and $K_{CNT}$ are each set at a large value and the emission control system is determined to be abnormal only if both conditions (1) and (2) are not satisfied,.

As another alternative, in order to simplify the processing, either of conditions (1) and (2) is eliminated. That is, the determination of the step 136 is based only the remaining condition.

Figure 16:
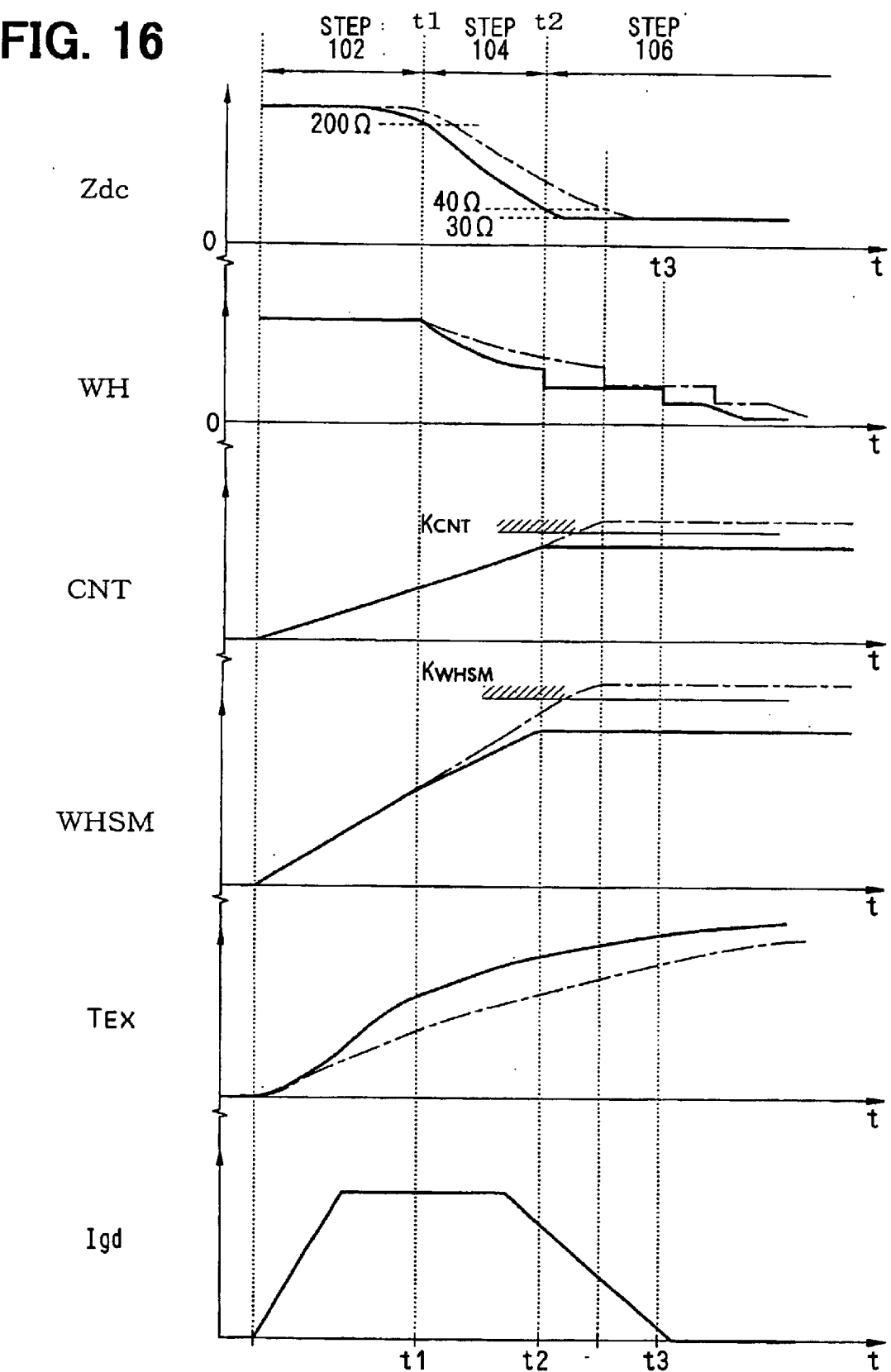
FIG. 16 shows time charts of operations taking place in the emission control system implemented by the first embodiment of the present invention.

A typical execution of the diagnosis of the emission control system is explained by referring to time charts shown in FIG. 16. FIG. 16 shows time charts of the element impedance Zdc of the air-fuel ratio sensor 26, the heater power WH, the count value of the post-engine-start time-lapse counter CNT, the heater-power cumulative value WHSM and the exhaust gas temperature Tex, which vary as a result of delaying the ignition timing after a start of the engine 11 by the ignition timing delay Igd.

After the engine 11 is started, the 100% conduction control is executed till the air-fuel ratio sensor 26 enters a state of being semi-activated as indicated by the element impedance Zdc decreasing to 200 ohms. The 100% conduction control is executed to speed an operation to increase the temperature of the air-fuel ratio sensor 26 by using heat generated by the heater 28 and heat dissipated by exhaust gas. At a time t1, the air-fuel ratio sensor 26 enters a state of being semi-activated as a result of this 100% conduction control. As the air-fuel ratio sensor 26 enters a state of being semi-activated, a transition to the power control is made. Thereafter, by using heat dissipated by exhaust gas and by execution of the power control, the temperature of the air-fuel ratio sensor 26 is increased to a value close to an activation temperature as indicated by the element impedance decreasing from 200 ohms to 40 ohms to complete the activation of the air-fuel ratio sensor 26. The element impedance decreases to 40 ohms at a time t2. Thus, at this point of time, the activation of the air-fuel ratio sensor 26 is determined to have been completed and a transition to the element impedance F/B control is made. The element impedance F/B control is executed by applying F/B control to the heater power WH so as to maintain the element impedance Zdc at a target impedance of 30 ohms set for a no-deterioration state of the air-fuel ratio sensor 26 and, hence, to maintain the temperature of the air-fuel ratio sensor 26 at the activation temperature. It is to be noted that the heater power WH is a power command value finally found on the basis of a power guard value and a power value based on feedback.

During execution of the control to speed an operation to warm up the catalyst 25, the ignition timing is delayed to increase the temperature of exhaust gas so as to speed the process of raising the temperature of the air-fuel ratio sensor 26 or the process of decreasing the element impedance Zdc. If the emission control system becomes abnormal, however, the temperature of exhaust gas becomes extremely low. In this case, the rising process of the temperature of the air-fuel ratio sensor 26 is slow in comparison with the normal state so that the decreasing process of the element impedance Zdc is also inevitably slow as well. As a result, in the event of an abnormality existing in the emission control system, the time to the activated state of the air-fuel ratio sensor 26 since a start of the engine 11 becomes long or the count value of the post-engine-start time-lapse counter CNT becomes large in comparison with the normal condition. In addition, the heater-power cumulative value WHSM also becomes large in comparison with the normal condition.

As a result of inspiration by the above phenomena, there is devised a scheme wherein, for each of the count value of the post-engine-start time-lapse counter CNT representing the time lapsing since a start of the engine till an activated state of the air-fuel ratio sensor 26 and the heater-power cumulative value WHSM, a diagnosis criterion value between a value for a normal condition and a value for an abnormal condition is set. The count value of the post-engine-start time-lapse counter CNT is examined to determine whether or not the count value is greater than the diagnosis criterion value set for the count value and, similarly, the heater-power cumulative value WHSM is examined to determine whether or not the heater-power cumulative value WHSM is greater than the diagnosis criterion value set for the heater-power cumulative value WHSM so that it is possible to determine whether or not an abnormality exists in the emission control system.

In the embodiment described above, as a result of inspiration by a correlation between the state of progress of an operation to warm up the catalyst 25 and the state of progress of the activation of the air-fuel ratio sensor 26, there is devised a scheme wherein it is possible to indirectly determine whether or not the state of progress of an operation to warm up the catalyst 25 is very late by determining whether or not the state of progress of the activation of the air-fuel ratio sensor 26 is extremely late. In turn, by determining whether or not the state of progress of an operation to warm up the catalyst 25 is extremely late, it is possible to determine whether or not an abnormality exists in the emission control system. In this case, since the air-fuel ratio sensor 26 used for control of the air-fuel ratio can be used as the air-fuel ratio sensor 26 used for a diagnosis of the emission control system, it is possible to implement the function to make a diagnosis of the emission control system while meeting a demand for reduction of the cost without the need to add a new sensor such as a catalyst-temperature sensor.

In addition, in this embodiment, the criterion values of the diagnosis are corrected in accordance with the engine operating condition such as the intake air volume and/or the environmental condition such as the ambient temperature, which have been prevailing since a start of the engine 11 till an activated state of the air-fuel ratio sensor 26. Thus, even if the engine operating condition and/or the environmental condition vary, it is always possible to determine whether the state of progress of the activation of the air-fuel ratio sensor 26 is late or normal under all but the same condition and, hence, possible to improve the precision of the determination of whether the state of progress of the activation of the air-fuel ratio sensor 26 is late or normal.

In this embodiment, the count value of the post-engine-start time-lapse counter CNT representing a time lapsing since a start of the engine 11 till an activated state of the air-fuel ratio sensor 26 and the heater-power cumulative value WHSM are measured. It is to be noted, however, that as an alternative, it is also possible to measure a time CNT lapsing over a period, which starts when the element impedance Zdc of the air-fuel ratio sensor 26 reaches a predetermined value of typically 100 ohms or smaller and ends when the element impedance Zdc becomes equal to an activation criterion value of typically 40 ohms and to measure a heater-power cumulative value WHSM cumulated over the same period. Then, the measured time CNT and the measured heater-power cumulative value WHSM are compared with their respective criterion values in a diagnosis of the emission control system in order to determine whether or not an abnormality exists in the emission control system. By providing such an alternative, it is also possible to measure a time CNT it takes to activate the air-fuel ratio sensor 26 and a heater-power cumulative value WHSM under the same condition even if the temperature of the air-fuel ratio sensor 26 and, hence, the element impedance Zdc of the air-fuel ratio sensor 26 vary. Thus, the diagnosis can be carried out with a higher degree of precision.

As another alternative, considering the fact that the control to speed an operation to warm up the catalyst 25 such as the control to delay the ignition timing is started not before a short time has lapsed since the running state of the engine 11 is stabilized to a certain degree after a start of the engine 11, it is also possible to measure a time CNT lapsing over a period, which starts when the control to speed an operation to warm up the catalyst 25 such as the control to delay the ignition timing is started and ends when the element impedance Zdc becomes equal to an activation criterion value of typically 40 ohms and to measure a heater-power cumulative value WHSM cumulated over the same period. Then, the measured time CNT and the measured heater-power cumulative value WHSM are compared with their respective criterion values in a diagnosis of the emission control system in order to determine whether or not an abnormality exists in the emission control system. By providing such another alternative, it is possible to determine whether the state of progress of the activation of the air-fuel ratio sensor 26 by execution of the control to speed an operation to warm up the catalyst 25 is late or normal with a high degree of precision without being affected by variations in engine operating state prior to the control to speed an operation to warm up the catalyst 25.

As a further alternative, it is possible to find a cumulative value of the element impedance Zdc in place of the heater-power cumulative value WHSM. Then, the cumulative value of the element impedance Zdc is compared with a criterion value in a diagnosis of the emission control system in order to determine whether or not an abnormality exists in the emission control system.

In addition, in this embodiment, there is devised a scheme wherein it is possible to indirectly determine whether the state of progress of an operation to warm up the catalyst 25 is late or normal by determining whether the state of progress of the activation of the air-fuel ratio sensor 26 provided on the upstream side of the catalyst 25 is late or normal. In turn, by determining whether the state of progress of an operation to warm up the catalyst 25 is late or normal, it is possible to make a diagnosis of the emission control system in order to determine whether or not an abnormality exists in the emission control system. In a control system including an exhaust gas sensor provided on the downstream side of the catalyst 25, however, it is possible to make a diagnosis of the emission control system in order to determine whether or not an abnormality exists in the emission control system on the basis of a result of determination of whether the state of progress of the activation of the exhaust gas sensor provided on the downstream side of the catalyst 25 is late or normal. The exhaust gas sensor is used for detecting one of a concentration of an exhaust gas component such as oxygen contained in exhaust gas and an air-fuel ratio of the exhaust gas as well as determining whether a detected air-fuel ratio is on a lean or rich side.

In addition, in a control system including exhaust gas sensors provided respectively on the upstream and downstream sides of the catalyst 25, it is possible to determine whether or not the state of progress of both the exhaust gas sensors are normal and to make a diagnosis of the emission control system in order to determine whether or not an abnormality exists in the emission control system by collectively using results of determination for both the exhaust gas sensors. In this case, it is possible to make a diagnosis of the emission control system in order to determine whether or not an abnormality exists in the emission control system by comparing a result of the determination of whether the state of progress of the activation of the exhaust gas sensor provided on the upstream side is normal or late with a result of the determination of whether the state of progress of the activation of the exhaust gas sensor provided on the downstream side is normal or late, or by using a difference between a result of the determination of whether the state of progress of the activation of the exhaust gas sensor provided on the upstream side is normal or late and a result of the determination of whether the state of progress of the activation of the exhaust gas sensor provided on the downstream side is normal or late.

In addition, as a result of inspiration by the fact that, during the period of the power control, a rate of change in element impedance Zdc for a normal state of the emission control system is different from a rate of change in element impedance Zdc for an abnormal state of the emission control system as shown in FIG. 16, there can be devised a scheme wherein an average value of rates of change in element impedance Zdc over the period of the power control is computed, and the computed average value of rates of change in element impedance Zdc is compared with a criterion value in a diagnosis of the emission control system in order to determine whether or not an abnormality exists in the emission control system. The period of the power control is defined as a period of time during which the element impedance Zdc decreases from 200 ohms to 40 ohms. The rate of change in element impedance Zdc is the magnitude of the change in element impedance Zdc per unit time.

It is to be noted that the exhaust gas sensors provided on the upstream and/or downstream sides of the catalyst 25 do not have to be an air-fuel ratio sensor for detecting an air-fuel ratio. That is, the present invention can be applied to a control system employing a sensor for detecting a concentration of a gas component such as oxygen contained in exhaust gas and/or an oxygen sensor for determining whether an air-fuel ratio of exhaust gas is on a lean or rich side.

In addition, in this embodiment, the determination of whether the state of progress of the activation of the exhaust gas sensor (that is, the air-fuel ratio sensor 26) is normal or late, is based on a result of comparison of the element impedance Zdc with a criterion value. However, the determination of whether the state of progress of the activation of the exhaust gas sensor is normal or late can also be based on a result of comparison of the exhaust gas sensor output with a predetermined value. Furthermore, in the case of an oxygen sensor for determining whether an air-fuel ratio of exhaust gas is on the rich or lean side, the emission control system can be subjected to a diagnosis in order to determine whether or not an abnormality exists in the emission control system on the basis of a result of determination of whether or not the output of the oxygen sensor has changed from a value on the lean side to a value on the rich side.

Second Embodiment

Next, a second embodiment of the present invention is explained. The elements of the second embodiment identical with their respective counterparts employed in the first embodiment are denoted by the same reference numerals as the counterparts, and explanation of the identical elements is not given.

Figure 17:
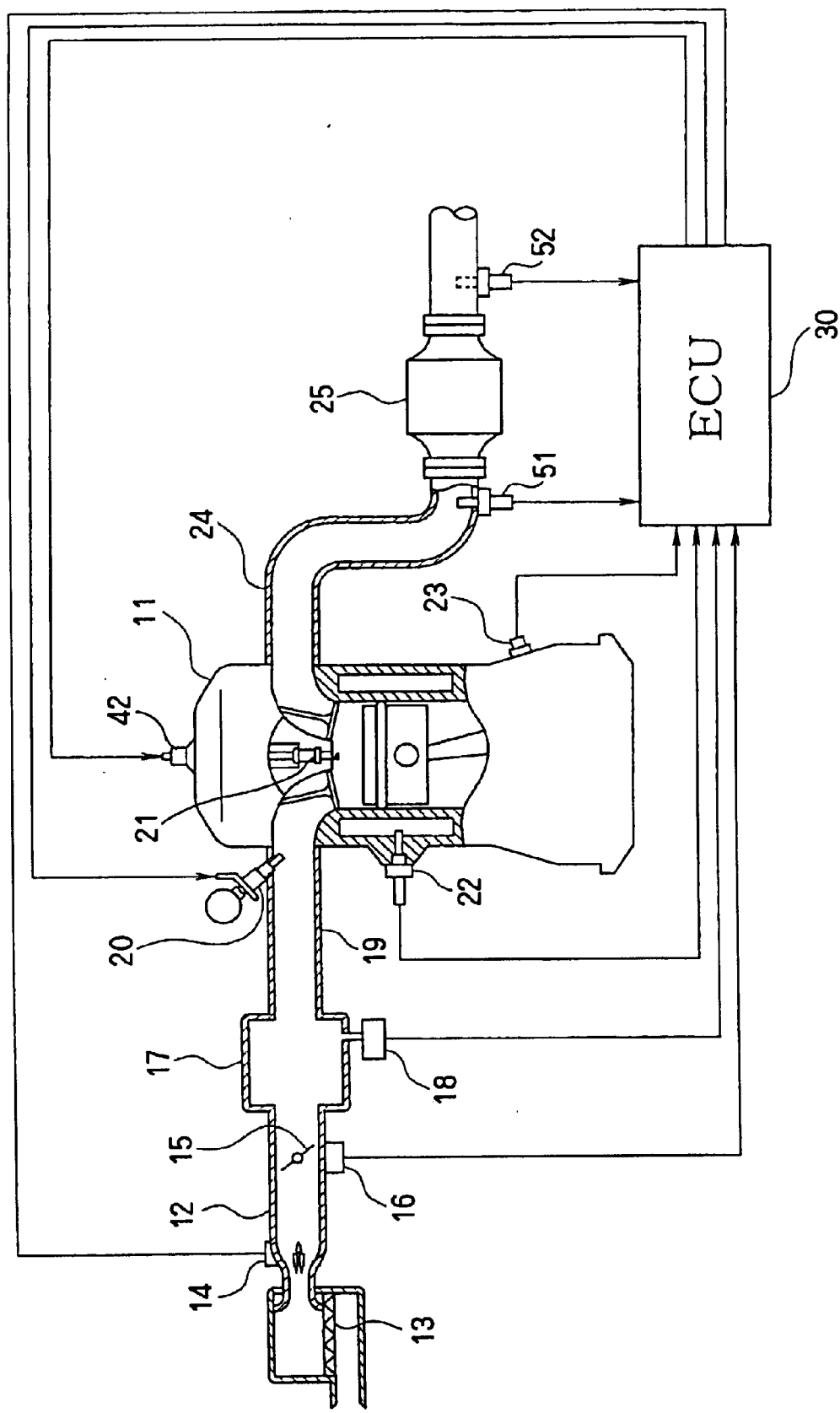
FIG. 17 is a diagram showing the configuration of an emission control system implemented by a second embodiment of the present invention.

FIG. 17 is a diagram showing the configuration of an emission control system implemented by the second embodiment. The catalyst 25 is a three way catalyst. On the exhaust pipe 24 on the upstream side of the catalyst 25, a sensor 51 is provided. On the exhaust pipe 24 on the downstream side of the catalyst 25, on the other hand, a sensor 52 is provided. The sensors 51 and 52 are each an exhaust gas component detection means for detecting a component of exhaust gas. Specifically, the sensors 51 and 52 can each be a sensor capable of detecting a concentration of a component of exhaust gas such as oxygen contained in the exhaust gas, a sensor capable of detecting an air-fuel ratio of the exhaust gas or a sensor capable of determining whether an air-fuel ratio of exhaust gas is on a rich or lean side. In the case of this embodiment, the sensor 51 is an air-fuel ratio (A/F) sensor outputting a signal linearly proportional to the air-fuel ratio of exhaust gas. On the other hand, the sensor 52 is an oxygen (O2) sensor, which inverts its output in dependence on whether the air-fuel ratio of exhaust gas has a value on the rich or lean side relative to the stoichiometric air-fuel ratio.

The ECU 30 controls the air-fuel ratio of exhaust gas on the basis of signals output by the sensors 51 and 52. Concretely, the ECU 30 executes feedback control based on a signal output by the sensor 51 to make the air-fuel ratio of exhaust gas on the upstream side of the catalyst 25 equal to a target air-fuel ratio by feeding back the signal output by the sensor 51 to represent the air-fuel ratio (or a fuel injection volume). The ECU 30 also executes sub-feedback control for correcting the target air-fuel ratio for the upstream side of the catalyst 25 on the basis of a signal output by the sensor 52 so as to make the air-fuel ratio of exhaust gas on the downstream side of the catalyst 25 equal to a control target value such as a value close to the stoichiometric air-fuel ratio.

Figure 8:
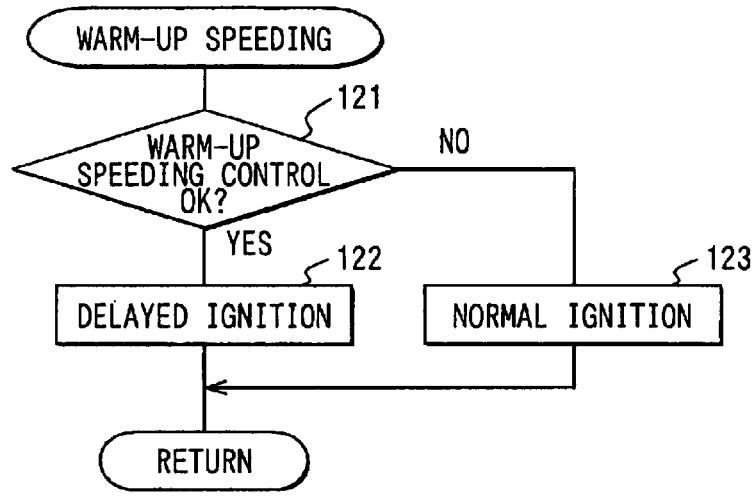
FIG. 8 shows a flowchart representing control executed by the emission control system implemented by the first embodiment of the present invention.

In addition, after the ignition switch shown in none of the figures is turned on, the ECU 30 executes the catalyst warming up speeding control routine represented by a routine shown in FIG. 8 at predetermined crank-angle intervals.

Furthermore, the ECU 30 executes diagnostic routines stored in a ROM in advance to make diagnoses for determining whether control to speed an operation to warm up the catalyst 25 is normal or abnormal and whether or not the catalyst 25 has deteriorated. The diagnostic routines are represented by flowcharts shown in FIGS. 18 and 19.

Next, a diagnosis method is explained briefly. In the course of the control to speed an operation to warm up the catalyst 25, the purification rate of exhaust gas passing through the catalyst 25 changes in accordance with the state of progress of an operation to warm up the catalyst 25. Thus, the air-fuel ratio of exhaust gas flowing through the periphery surrounding the sensor 52 also changes in accordance with the state of progress of an operation to warm up the catalyst 25. As a result, the sensor 52 changes its output, which represents the air-fuel ratio of exhaust gas flowing through the periphery surrounding the sensor 52. As a result of inspiration by this relation among the state of progress of an operation to warm up the catalyst 25, the air-fuel ratio of exhaust gas flowing through the periphery surrounding the sensor 52 and the signal output by the sensor 52, there is devised a scheme wherein the signal output by the sensor 52 is used as a basis for determination of whether the state of progress of an operation to warm up the catalyst 25 is late or normal. If the state of progress of an operation to warm up the catalyst 25 is determined to be late, the control to speed an operation to warm up the catalyst 25 is also determined to be abnormal.

After the catalyst 25 has been used for a long time, the purification characteristic of the catalyst 25 deteriorates. Thus, even if the state of progress of an operation to warm up the catalyst 25 being subjected to the control to speed an operation to warm up the catalyst 25 is determined to be normal, the purification rate of exhaust gas passing through the catalyst 25 is lower than that of the normal condition. As a result, the exhaust gas purification rate behavior, which is seen in the course of the control to speed an operation to warm up the catalyst 25 after the purification characteristic of the catalyst 25 has deteriorated, is similar to the exhaust gas purification rate behavior seen in a state of late warm-up progress of the catalyst 25. Since the behavior of the purification rate of exhaust gas appears as variations of a signal output by the sensor 52, by merely observing the signal output by the sensor 52 during execution of the control to speed an operation to warm up the catalyst 25, it is difficult to distinguish a deteriorating purification characteristic of the catalyst 25 and a state of late warm-up progress of the catalyst 25 from each other.

In order to solve the above problem, in this embodiment, as the control to speed an operation to warm up the catalyst 25 reaches a stage at which the catalyst 25 has been warmed up to a certain degree, a diagnosis is made to determine whether the state of progress of an operation to warm up (or the activation of) the catalyst 25 is late or normal by examination of the signal output by the sensor 52. This diagnosis is referred to hereafter as a pre-warm-up diagnosis. Furthermore, after the control to speed an operation to warm up the catalyst 25 is ended, a diagnosis is again carried out by examination of the signal output by the sensor 52 with a timing that allows a decision to be made to end the operation to warm up the catalyst 25 even in the event of a detected abnormality of the control to speed an operation to warm up the catalyst 25. This diagnosis is referred to hereafter as a post-warm-up diagnosis. By using results of both the pre-warm-up diagnosis and the post-warm-up diagnosis, it is possible to distinguish a deteriorating purification characteristic of the catalyst 25 and a state of late warm-up progress of the catalyst 25 from each other.

In detail, even if the state of progress of an operation to warm up the catalyst 25 being subjected to the control to speed an operation to warm up the catalyst 25 is late, the purification rate of exhaust gas after completion of the control to speed an operation to warm up the catalyst 25 is high provided that the purification characteristic of the catalyst 25 has not deteriorated. This is because the catalyst 25 was warmed up to a certain degree prior to the completion of the control to speed an operation to warm up the catalyst 25. Thus, it is possible to distinguish a deteriorating purification characteristic of the catalyst 25 and a state of late warm-up progress of the catalyst 25 from each other in dependence on whether or not the result of the post-warm-up diagnosis again indicates existence of an abnormality.

Figure 18:
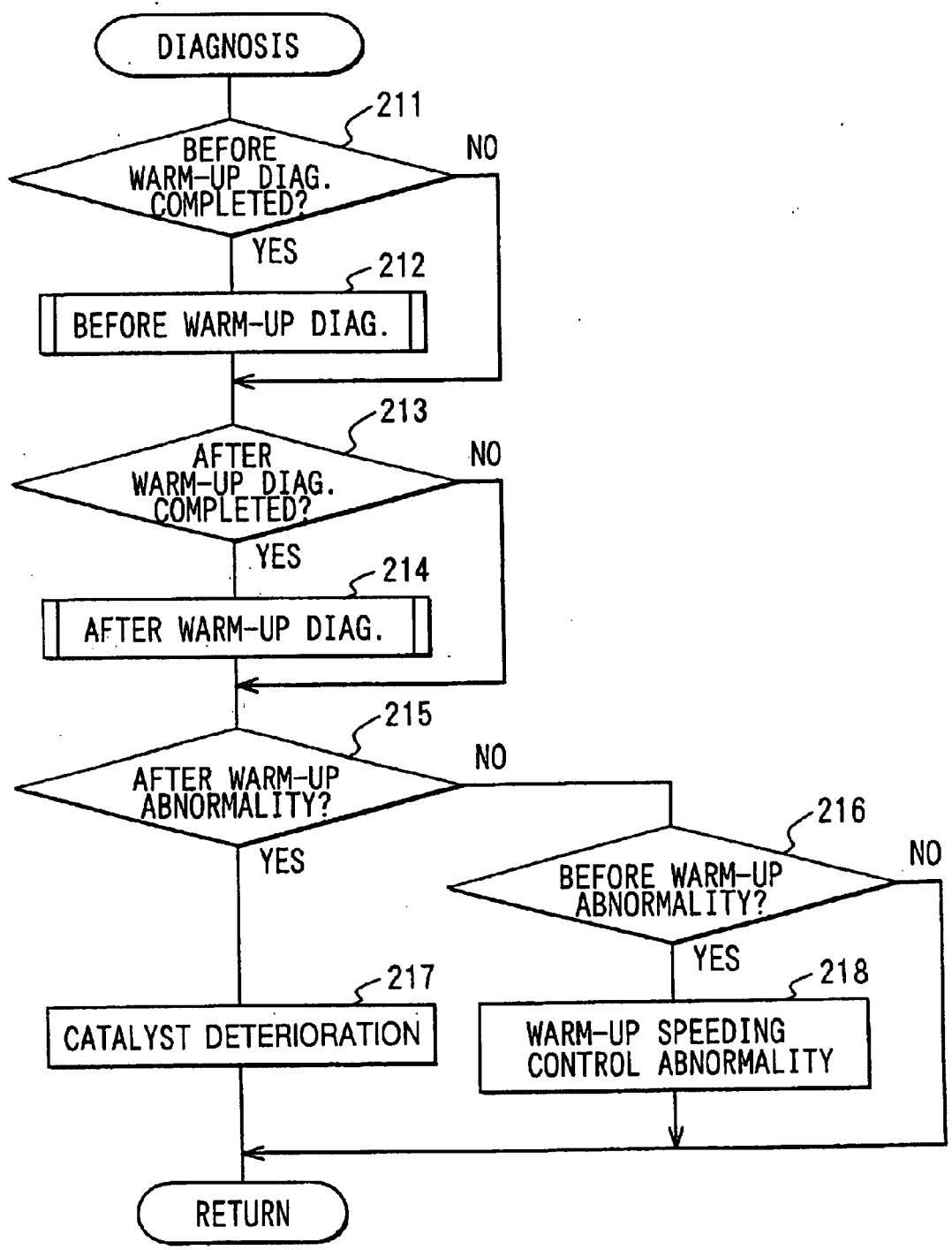
FIG. 18 shows a flowchart representing control executed by the emission control system implemented by the second embodiment of the present invention.
Figure 19:
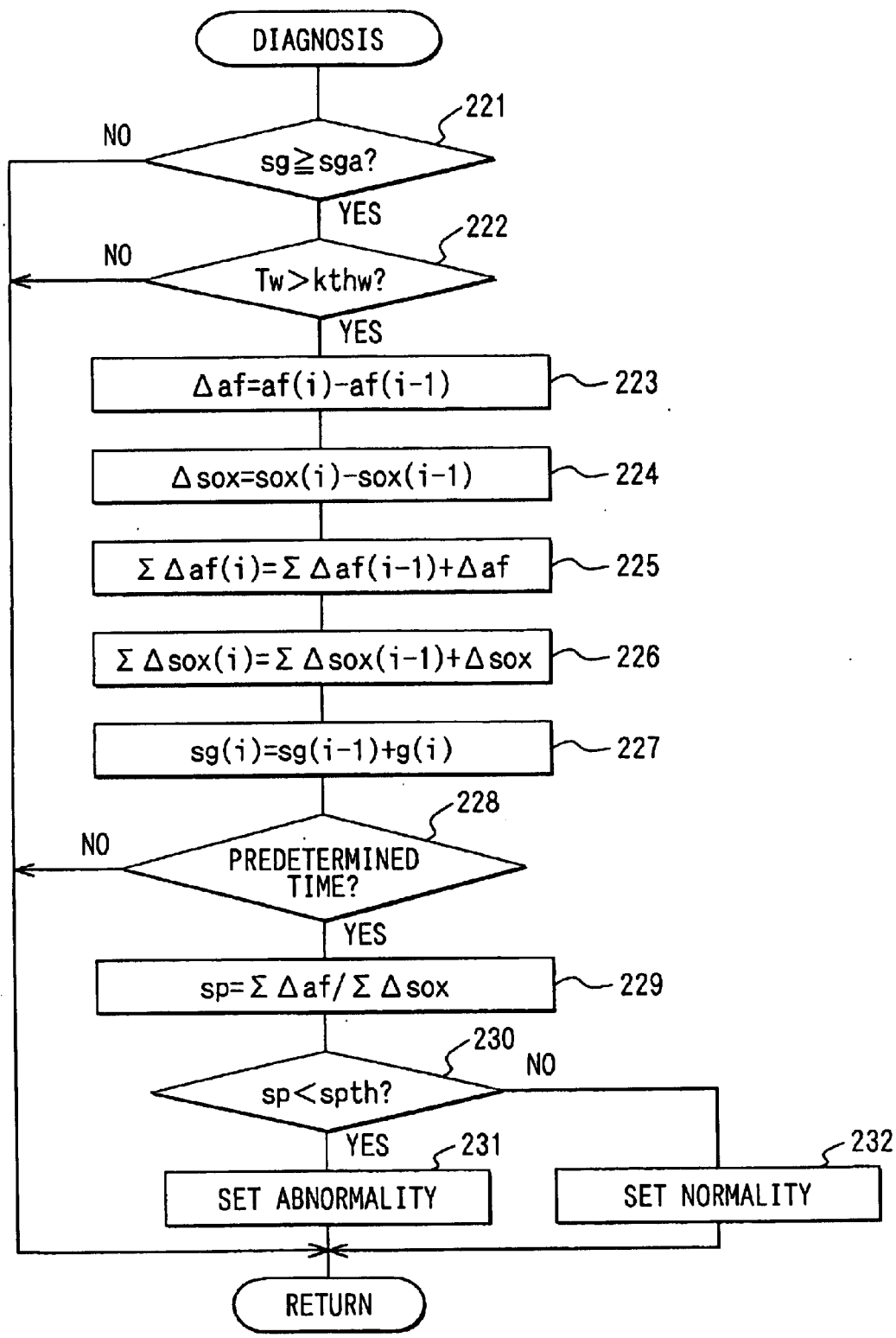
FIG. 19 shows a flowchart representing control executed by the emission control system implemented by the second embodiment of the present invention.

A diagnosis routine represented by the flowchart shown in FIG. 18 is executed to make the diagnoses described above. The diagnosis routine is invoked at predetermined time intervals of typically 50 msec to play the role of a diagnosis means after the ignition switch shown in none of the figures is turned on. When the diagnosis routine is invoked, the flowchart begins with a step 211 to determine whether or not a pre-warm-up diagnosis has been completed. If a pre-warm-up diagnosis is determined to have not been completed, the flow of the routine goes on to a step 212 at which a pre-warm-up-diagnosis routine represented by the flowchart shown in FIG. 19 is executed to determine whether or not an abnormality of the catalyst 25 exists. An abnormality determined to exist at the step 212 indicates either a deteriorating purification characteristic of the catalyst 25 or a state of late warm-up progress of the catalyst 25. It is to be noted that the pre-warm-up-diagnosis routine represented by the flowchart shown in FIG. 19 is executed at the step 212 to play the role of a first diagnosis means.

Then, the flow of the routine goes on to a step 213 to determine whether or not a post-warm-up diagnosis has been completed. If a post-warm-up diagnosis is determined to have not been completed, the flow of the routine goes on to a step 214 at which the same processing as the pre-warm-up-diagnosis routine represented by the flowchart shown in FIG. 19 is executed. Thus, existence of an abnormality of the catalyst 25 is again determined with a timing that allows a decision to be made to end the operation to warm up the catalyst 25 even in the event of the detected abnormality of the control to speed an operation to warm up the catalyst 25. If existence of an abnormality is again detected at the step 214, the catalyst 25 can be determined to have deteriorated. If the determination result obtained at the step 214 indicates normalcy, on the other hand, the catalyst 25 can be determined to have not deteriorated. It is to be noted that the pos-warm-up-diagnosis routine represented by the flowchart shown in FIG. 19 is executed at the step 214 to play the role of a second diagnosis means.

Then, the flow of the routine goes on to a step 215 to determine whether or not the result of the post-warm-up diagnosis indicates the existence of an abnormality. If the result of the post-warm-up diagnosis indicates the existence of an abnormality, the flow of the routine goes on to a step 217 at which at which the abnormality detected by the pre-warm-up diagnosis is diagnosed as the deterioration of the catalyst 25. In this case, typically, a warning lamp is turned on to inform the operator of the deterioration of the catalyst 25. In addition, an abnormality code representing the deterioration of the catalyst 25 is stored in the backup RAM of the ECU 30. Then, the execution of this routine is ended.

If the post-warm-up diagnosis result is determined at the step 215 not to indicate the existence of an abnormality or not indicate deterioration of the catalyst 25, on the other hand, the flow of the routine goes on to a step 216 to determine whether or not the result of the pre-warm-up diagnosis indicates the existence of an abnormality. If the result of the pre-warm-up diagnosis indicates the existence of an abnormality, the flow of the routine goes on to a step 218 at which, typically, a warning lamp is turned on to inform the operator of an abnormality of the control to speed an operation to warm up the catalyst 25. In addition, an abnormality code representing the abnormality of the control to speed an operation to warm up the catalyst 25 is stored in the backup RAM of the ECU 30. Then, the execution of this routine is ended.

If the determination result of the pre-warm-up indicates normalcy, on the other hand, the control to speed an operation to warm up the catalyst 25 can be determined to be functioning normally and the catalyst 25 can be determined to have not deteriorated. In this case, the execution of this routine is just ended.

Figure 20:
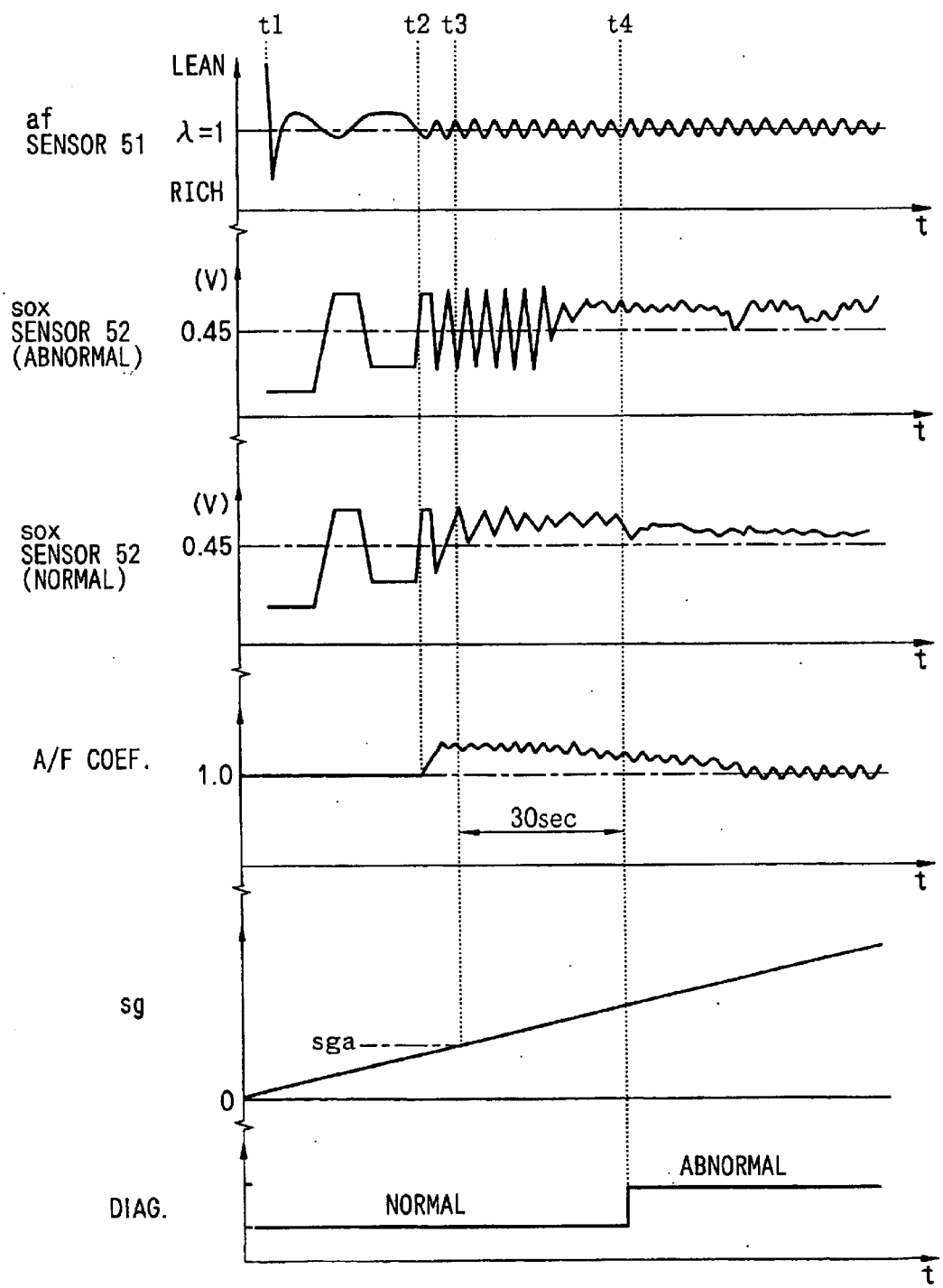
FIG. 20 shows time charts of operations taking place in the emission control system implemented by the second embodiment of the present invention.
Figure 21:
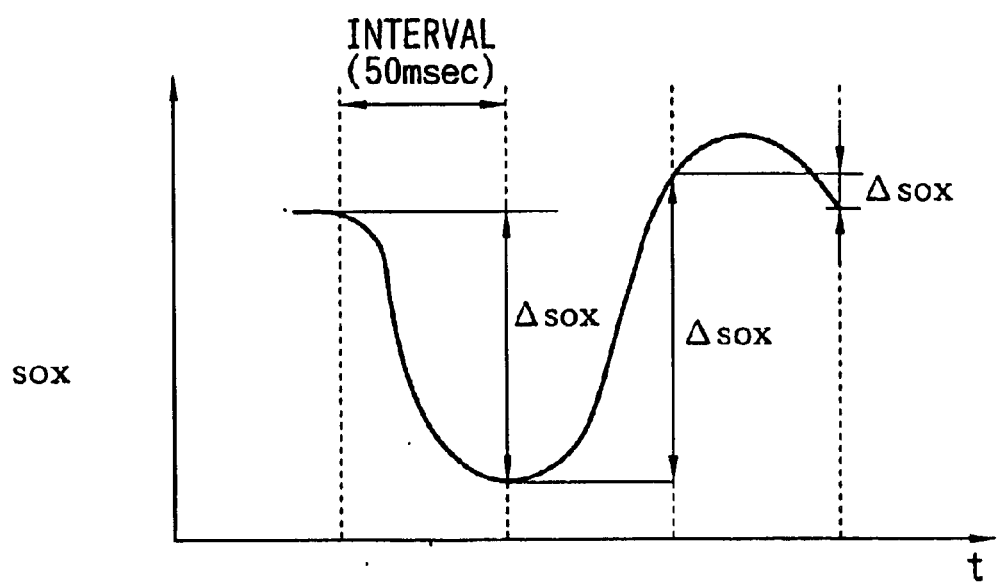
FIG. 21 shows time charts of operations taking place in the emission control system implemented by the second embodiment of the present invention.

Next, a diagnosis procedure is explained by referring to time charts shown in FIG. 20. After the engine 11 is started at a time t1, air-fuel ratio feedback control is started at a time t2. While the air-fuel ratio feedback control is being executed, an air-fuel ratio at output by the sensor 51 provided on the upstream side of the catalyst 25 is periodically switched back and forth between a value in a lean region and a value in a rich region. Thus, a signal sox output by the sensor 52 vibrates at relatively large amplitudes. After an operation to warm up the catalyst 25 makes some progress, the amplitudes of the vibration of the signal sox generated by the sensor 52 gradually decrease. If the control to speed an operation to warm up the catalyst 25 is functioning normally, the attenuation of the output signal sox is big.

Thus, this embodiment takes an event in which a cumulative value sg of the intake air volume exceeding a predetermined value sga as an event of determination that the vibration of signal soc output by the sensor 52 attenuates if the control to speed an operation to warm up the catalyst 25 is functioning normally. Then, processing is started to evaluate the magnitude of the vibration of the signal sox output by the sensor 51 for vibration of the signal af output by the sensor 51. In this processing, a change $\Delta sox$ per processing period of typically 50 msec is found. The change $\Delta sox$ is a change in output signal sox, which is a signal output by the sensor 52. Then, changes $\Delta sox$ are cumulated over a cumulation period of typically 30 sec to produce an output change cumulative value $\Sigma \Delta sox$. FIG. 6 is a diagram showing typical changes $\Delta sox$. Then, similarly, a change $\Delta af$ per processing period of typically 50 milliseconds is found. The change $\Delta af$ is a change in output signal af, which is a signal output by the sensor 51. Then, changes $\Delta af$ are cumulated over the cumulation period of typically 30 seconds to produce an output-change cumulative value $\Sigma \Delta af$. Finally, a ratio $\Sigma \Delta af / \Sigma \Delta sox$ is found as a diagnosis parameter. The diagnosis parameter $\Sigma \Delta af / \Sigma \Delta sox$ is compared with a predetermined criterion value to determine whether or not an abnormality exists.

The following description explains details of processing carried out by execution of the pre-warm-up diagnosis routine and the post-warm-up diagnosis routine, which are invoked at respectively the steps 212 and 214 of the flowchart shown in FIG. 18. Both the pre-warm-up and post-warm-up diagnosis routines are represented by the flowchart shown in FIG. 19. First of all, the flowchart shown in FIG. 19 is explained as a flowchart representing the pre-warm-up diagnosis routine. When the pre-warm-up diagnosis routine is invoked, the flowchart begins with steps 221 and 222 to determine whether or not conditions for making the pre-warm-up diagnosis are satisfied. The conditions for making the pre-warm-up diagnosis are:

(1): a condition examined at the step 221 to determine whether or not the intake air volume cumulative value sg, which is an intake air volume cumulated since a start of the engine 11, is at least equal to a predetermined value sga; and (2): a condition examined at the step 222 to determine whether or not the cooling water temperature Tw is higher than a predetermined temperature kthw of typically 20 degrees Celsius.

If the conditions for making the pre-warm-up diagnosis are satisfied, the flow of the routine goes on to a step 223 at which the immediately preceding output af(i−1) of the sensor 51 is subtracted from the current output af(i) of the sensor 51 to find an output change $\Delta af$ made by the sensor 51 in a processing period of typically 50 milliseconds. Then, at the next step 224, the immediately preceding output sox(i−1) of the sensor 52 is subtracted from the current output sox(i) of the sensor 52 to find an output change $\Delta sox$ made by the sensor 52 in the processing period of typically 50 milliseconds.

Subsequently, at the next step 225, the output change $\Delta af$ made by the sensor 51 is cumulated to produce an output-change cumulative value $\Sigma \Delta af$. Then, at the next step 226, the output change $\Delta sox$ made by the sensor 52 is cumulated to produce an output-change cumulative value $\Sigma \Delta sox$. Subsequently, at the next step 227, an input air flow rate g detected by the air flow meter 14 is cumulated to produce an input air flow rate cumulative value sg, which is an input air flow rate cumulated since the start of the engine 11.

Then, the flow of the routine goes on to a step 228 to determine whether or not a predetermined period of typically 30 sec has lapsed since the start of the pre-warm-up or post-warm-up diagnosis. If the predetermined period has not lapsed since the start of the pre-warm-up or post-warm-up diagnosis, the execution of this routine is ended. The pre-warm-up or post-warm-up diagnosis routine is invoked repeatedly at respectively the step 212 or 214 of the flowchart shown in FIG. 18. As the predetermined period lapses since the first invocation of the pre-warm-up or post-warm-up diagnosis routine, the flow of the routine goes on from the step 228 to a step 229 to compute a diagnosis parameter sp, which is a ratio of the output-change cumulative value $\Sigma \Delta af$ of the sensor 51 to the output-change cumulative value $\Sigma \Delta sox$ of the sensor 52 as follows:

$$sp = \Sigma \Delta af / \Sigma \Delta sox$$

Subsequently, the flow of the routine goes on to a step 230 at which the diagnosis parameter sp is compared with a predetermined criterion value spth to determine whether the diagnosis parameter sp is smaller or greater than the predetermined criterion value spth. If the diagnosis parameter sp is smaller than the predetermined criterion value spth, the flow of the routine goes on to a step 231 at which an abnormality is determined to exist. If the diagnosis parameter sp is equal to or greater than the predetermined criterion value spth, on the other hand, the flow of the routine goes on to a step 232 at which a normalcy is determined. A constant is used as the predetermined criterion value spth for the sake of processing simplicity. However, a variable can also be used. In this case, the variable is found from typically a map representing a relation between the variable and the intake air volume cumulative value sg, which is an intake air volume cumulated since a start of the engine 11.

If the routine represented by the flowchart shown in FIG. 19 is executed as the pre-warm-up diagnosis routine, an abnormality determined by the routine can be diagnosed as an abnormality of the control to speed an operation to warm up the catalyst 25 or a deteriorating state of the catalyst 25.

The post-warm-up diagnosis routine invoked at the step 214 of the flowchart shown in FIG. 18 is different from the pre-warm-up diagnosis routine described above in that there are differences in criterion values used at the steps 221, 222 and 230 between the two routines. Otherwise, the post-warm-up diagnosis routine is the same as the pre-warm-up diagnosis routine. That is, the post-warm-up diagnosis routine is also represented by the flowchart shown in FIG. 19.

Conditions for making the post-warm-up diagnosis are:

(1): a condition examined at the step 221 to determine whether or not the intake air volume cumulative value sg, which is an intake air volume cumulated since a start of the engine 11, is at least equal to a predetermined value allowing a decision to be made to end the operation to warm up the catalyst 25 even in the event of an abnormality of the control to speed an operation to warm up the catalyst 25; and (2): a condition examined at the step 222 to determine whether or not the cooling water temperature Tw detected by the cooling water temperature sensor 22 is higher than a predetermined temperature of typically 80 degrees Celsius. The predetermined temperature is a minimum temperature allowing a decision to be made to end the operation to warm up the catalyst 25 even in the event of an abnormality of the control to speed an operation to warm up the catalyst 25.

If above 2 conditions (1) and (2) are both satisfied, a condition for making the post-warm-up diagnosis is considered to hold true. In this case, the post-warm-up diagnosis is made. An abnormality determined again by the post-warm-up diagnosis is diagnosed as deterioration of the catalyst 25. On the other hand, normalcy determined by the post-warm-up diagnosis is interpreted as no deterioration of the catalyst 25.

In the embodiment described above, an abnormality generated in the control to speed an operation to warm up the catalyst 25 during an operation of the engine 11 can be detected immediately. Furthermore, by issuing a warning of the abnormality, it is possible to avoid a situation in which the driver continues the driving without being aware of the existence of the abnormality at all.

Moreover, since a sensor provided for air-fuel ratio control can be used as the sensor 52 for the diagnoses described above, it is not necessary to install a new sensor such as a catalyst temperature sensor.

In addition, in this embodiment., it is possible to prevent in a preventive manner deterioration of the catalyst 25 from being incorrectly diagnosed as an abnormality generated in the control to speed an operation to warm up the catalyst 25. Thus, reliability of the diagnosis can be improved and deterioration of the catalyst 25 can be detected.

In this embodiment, only one exhaust pipe 24 and only one catalyst 25 are employed. It is to be noted, however, that the present invention can be applied to a configuration in which a plurality of catalysts are used. In this case, the control to speed an operation to warm up the catalysts can be subjected to a diagnosis by using a signal output by a sensor provided on the downstream side of any specific one of the catalysts.

Furthermore, as the sensor 52, it is possible to use an air-fuel ratio sensor or a gas sensor for detecting a concentration of a gas component such as HC. Moreover, the control to speed an operation to warm up the catalyst 25 does not have to be executed by delaying the ignition timing. For example, it is possible to adopt any of a variety of commonly known means for executing the control to speed an operation to warm up the catalyst 25.

In addition, the diagnosis can also be made by using a period of transition from a rich state of the output of the sensor 52 to a lean state or vice versa. Furthermore, the control to speed an operation to warm up the catalyst 25 can also be subjected to a diagnosis for an abnormality by identifying an activation timing (or a warm-up end timing) from a signal output by the sensor 52 and determining whether or not the activation timing of the catalyst 25 is later than a normal condition.

Third Embodiment

Next, a third embodiment of the present invention is explained. The configuration elements of the third embodiment identical with their respective counterparts employed in the first and second embodiments are denoted by the same reference numerals as the counterparts, and the explanation of the identical elements is not given.

Figure 22:
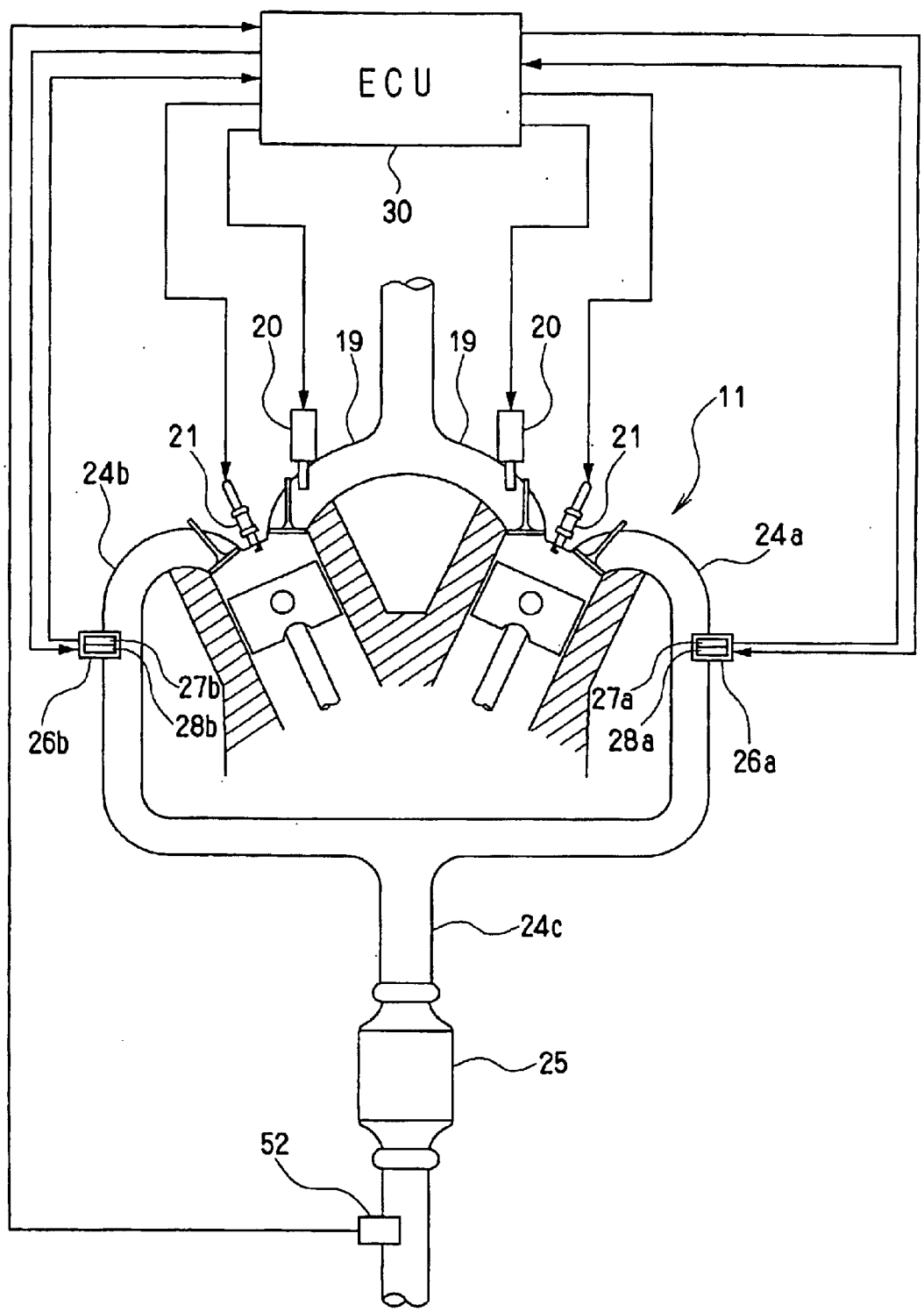
FIG. 22 shows a flowchart representing control executed by the emission control system implemented by a third embodiment of the present invention.

FIG. 22 is a diagram showing the configuration of an emission control system implemented by the third embodiment. The engine 11 is a V-type engine. The exhaust pipe comprises an exhaust pipe 24a for the right bank, an exhaust pipe 24b for the left bank and an exhaust pipe 24c for joining the exhaust pipe 24a to the exhaust pipe 24b. A catalyst 25 is provided on the exhaust pipe 24c. A sensor 52 is provided on the downstream side of the catalyst 25. The sensor 25 is an O2 sensor or an A/F sensor. A signal output by the sensor 52 can be used in correction of a target air-fuel ratio in feedback control of the air-fuel ratio. A sensor 26a is provided on the exhaust pipe 24a and a sensor 26b is provided on the exhaust pipe 24b. The sensors 26a and 26b are the same as the sensor 26 employed in the first embodiment. The sensor 26a includes a sensor element 27a and a heater 28a. Similarly, the sensor 26b includes a sensor element 27b and a heater 28b.

The engine control unit (ECU) 30 has the same configuration as that of the first embodiment. The ECU 30 has a controller for controlling the engine 11 and a sub-controller for controlling the sensors 26a and 26b. In the case of the third embodiment, the sub-controller controls the sensors 26a and 26b independently of each other. The sub-controller executes the heater control routine represented by the routine shown in FIG. 3 in response to a command received from a main controller. In this embodiment, during a diagnosis, the heater control routine represented by the routine shown in FIG. 3 is executed for only one of the sensors 26a and 26b with conduction of a current to a heater for the other sensor halted.

Figure 23:
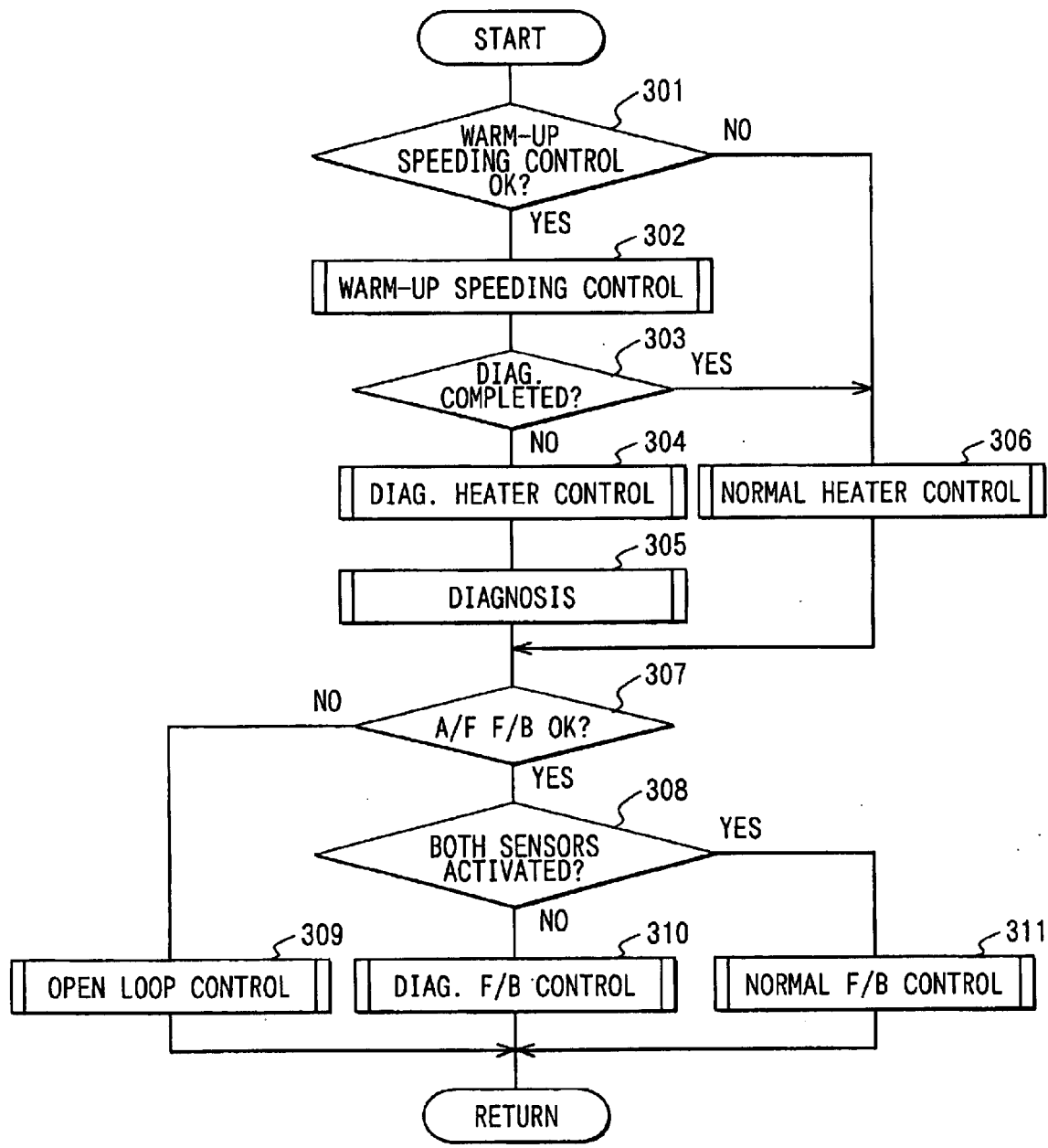
FIG. 23 shows a flowchart representing control executed by the emission control system implemented by the third embodiment of the present invention.
Figure 24:
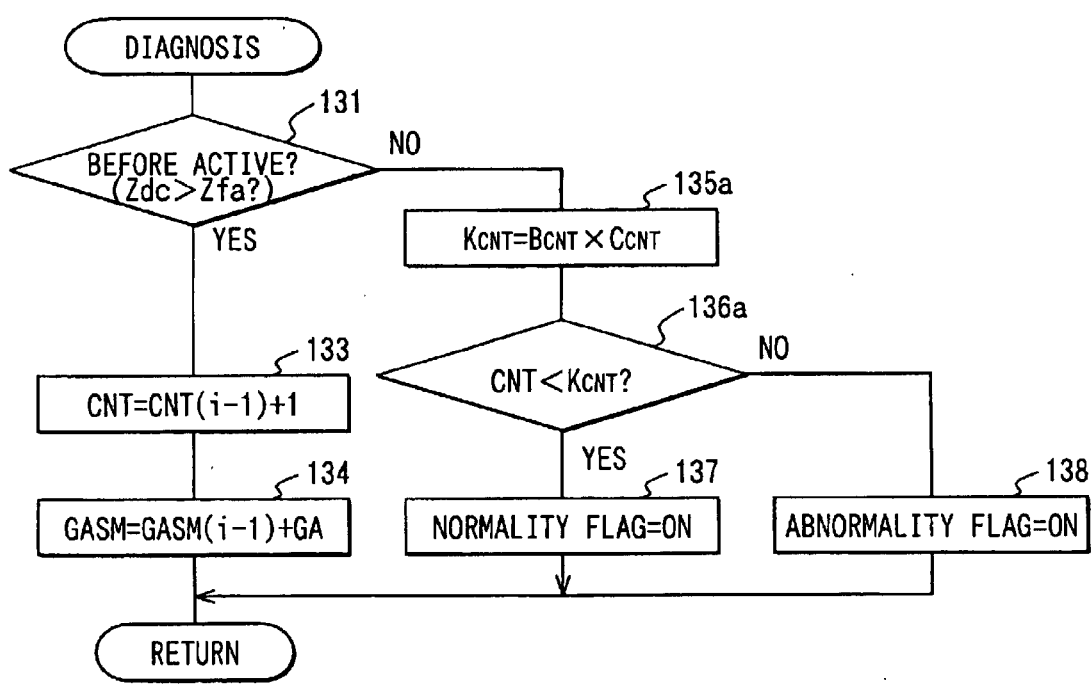
FIG. 24 shows a flowchart representing control executed by the emission control system implemented by the third embodiment of the present invention.

The ECU 30 carries out processing represented by flowcharts shown in FIGS. 23 and 24. At a cold start of the engine 11 with the engine 11 still put at a low temperature, the ECU 30 executes the control to speed an operation to warm up the catalyst 25. In addition, the ECU 30 also makes a diagnosis of the control to speed an operation to warm up the catalyst 25. In this diagnosis, only conduction of a current to a heater 28a for the sensor 26a is enabled. That is, conduction of a current to a heater 28b for the sensor 26b is disabled. Thus, the sensor 26b is warmed up in dependence on mainly heat dissipated by exhaust gas. As a result, by monitoring a signal output by the sensor 26b, it is possible to infer whether or not the control to speed an operation to warm up the catalyst 25 is being executed normally. In addition, by eliminating the effect of the heater 28b for the sensor 26b, it is possible to accurately determine whether or not the control to speed an operation to warm up the catalyst 25 is being executed normally. Furthermore, normal air-fuel ratio control can be executed by using the sensor 26a.

It is to be noted that, as an alternative, in this diagnosis, only conduction of a current to the heater 28b for the sensor 26b can is enabled while conduction of a current to the heater 28a for the sensor 26a is disabled. Moreover, the conduction of a current to the heater 28b for the sensor 26b can also be switched from an enabled state to a disabled state or vice versa periodically while the conduction of a current to the heater 28b for the sensor 26b is inversely switched from a disabled state to an enabled state or vice versa periodically. The conductions of currents to the heaters 28a and 28b of the sensors 26a and 26b respectively can also be switched at intervals, which are each equivalent to a predetermined number of engine starts, a predetermined number of such diagnoses, the lapse of a predetermined time or a predetermined running distance.

By referring to flowcharts shown in FIGS. 23 and 24, the following description explains processing carried out by the ECU 30.

A diagnosis control base routine represented by a flowchart shown in FIG. 23 is executed at predetermined intervals after the ignition switch shown in none of the figures is turned on. The flowchart begins with a step 301 to determine whether or not conditions for execution of the control to speed an operation to warm up the catalyst 25 are satisfied. Typically, the conditions for execution of the control to speed an operation to warm up the catalyst 25 include a condition requiring that the catalyst 25 shall be in a pre-warmed-up state (a pre-activation state) and a condition requiring that the operating state shall be a state allowing control of delaying the ignition timing to be executed. An example of the state allowing the control of delaying the ignition timing to be executed is an idle operating state. If these conditions are all satisfied, the conditions for execution of the control to speed an operation to warm up the catalyst 25 can be considered to hold true. Note that it is possible to determine whether or not the catalyst 25 is in a pre-warmed-up state by detection of a time lapsing since a start of the engine 11, a temperature of the cooling water, a cumulative value of the intake air volume cumulated since a start of the engine 11 or a cumulative value of the fuel injection volume cumulated since a start of the engine 11. That is, it is possible to determine whether or not the catalyst 25 is in a pre-warmed-up state by detection of a parameter related to the total amount of heat supplied to the catalyst 25 since a start of the engine 11.

At a step 302, the control to speed an operation to warm up the catalyst 25 is executed to speed the operation to warm up the catalyst 25.

Then, the routine goes on to a step 303 to determine whether or not the diagnosis of the emission control system has been completed. At a step 304, diagnosis-time heater control is executed. During the diagnosis-time heater control, the heater control routine represented by the flowchart shown in FIG. 23 is executed only for the sensor 26a of a bank on the right or left side of the engine 11. The current flowing to the heater 28b of the sensor 26b on the other bank is turned off.

At a step 305, a diagnosis of the emission control system is made.

If the diagnosis has been completed, the determination result obtained at the step 303 becomes 'Yes'. In this case, the flow of the routine goes on to a step 306. At the step 306, the heater control routine represented by the flowchart shown in FIG. 23 is executed for both the sensors 26a and 26b of the banks on the right and left sides of the engine 11.

At a step 307, conditions for execution of the air-fuel ratio F/B (feedback) control are examined to determine whether or not the conditions are satisfied. The conditions for execution of the air-fuel ratio F/B (feedback) control include a condition requiring that the temperature of the cooling water shall be at least equal to a predetermined temperature, a condition requiring that the operating state of the engine 11 shall be neither a high revolution speed state nor a heavy load state and a condition requiring that the sensor 26a of a bank on the right or left side of the engine 11 shall have been activated. If these conditions are all satisfied, the conditions for execution of the air-fuel ratio F/B control can be considered to hold true.

When both the sensors 26a and 26b of the banks on the right and left sides of the engine 11 have not been activated right after a start of the engine 11, the conditions for execution of the air-fuel ratio F/B control are considered not to hold true. In this case, the flow of the routine goes on to a step 309. At the step 309, the fuel injection volume of the fuel-injection valve 20 on each bank is controlled by execution of open-loop control.

Thereafter, as the sensor 26a of at least one of the banks, that is, a bank on the right or left side of the engine 11, is activated so that the conditions for execution of the air-fuel ratio F/B control can be considered to hold true, the flow of the routine goes on to a step 308. At the step 308, the sensors 26a and 26b of both the banks on the right and left sides of the engine 11 are examined to determine whether or not both the sensors 26a and 26b have been activated. During a diagnosis, the sensor 26a is activated earlier than the sensor 26b is. Thus, at a point of time the sensor 26a is activated first during a diagnosis, the flow of the routine goes on to a step 310 at which the air-fuel ratio F/B control is executed. During the air-fuel ratio F/B control, the fuel injection volume of the fuel-injection valve 20 on the right bank is controlled so that the air-fuel ratio detected by the sensor 26a becomes equal to a target air-fuel ratio. On the left bank, on the other hand, the air-fuel ratio detected by the sensor 26a is regarded as an actual air-fuel ratio and the fuel injection volume of the fuel-injection valve 20 on the right bank is controlled so that the actual air-fuel ratio becomes equal to a target air-fuel ratio. The processing at the step 310 is carried out to play the role of an air-fuel ratio control means.

Thereafter, as the sensors 26a and 26b of both the banks on the right and left sides of the engine 11 are activated, the flow of the routine goes on to a step 311 at which the air-fuel ratio control is switched from the diagnosis-time air-fuel ratio control to the normal air-fuel ratio control. In the normal air-fuel ratio control, independent air-fuel ratio control is executed for each of the banks.

At a step 305, the processing represented by the flowchart shown in FIG. 24 is carried out. The processing represented by the flowchart shown in FIG. 24 is similar to the processing represented by the flowchart shown in FIG. 9. At a step 135a of the flowchart shown in FIG. 24, only a criterion value $K_{CNT}$ is found. Then, the flow of the processing goes on to a step 136*a* to determine whether the control to speed an operation to warm up the catalyst 25 is normal or abnormal on the basis of the count value of the counter CNT and the criterion value $K_{CNT}$.

Figure 25:
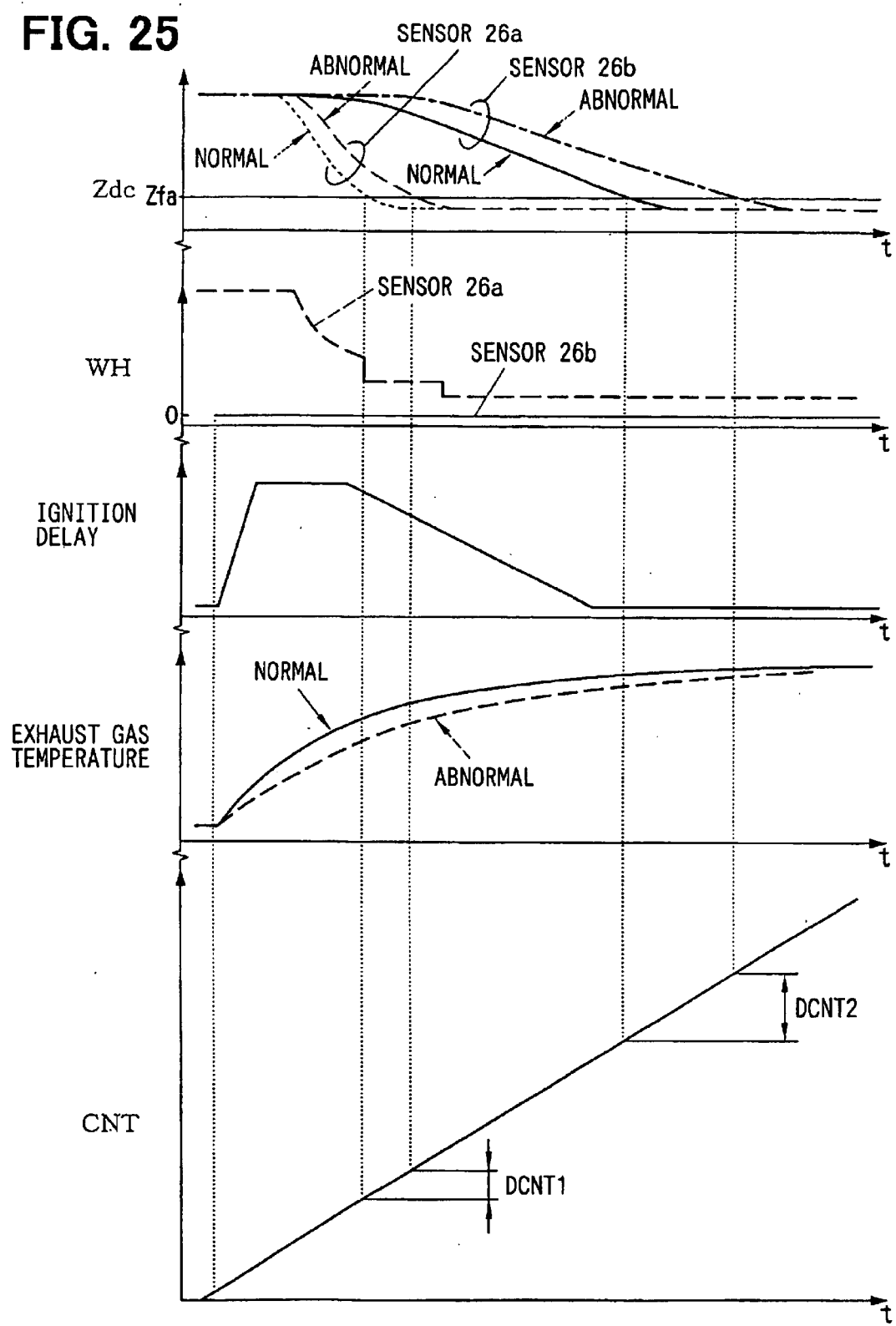
FIG. 25 shows time charts of operations taking place in the emission control system implemented by the third embodiment of the present invention.

FIG. 25 shows time charts of operations of the third embodiment. The control to speed an operation to warm up the catalyst 25 is executed by temporarily increasing an ignition delay. If the operation to delay the ignition is executed normally, the temperature of exhaust gas rises abruptly. If some abnormalities exist in the system, however, the temperature of exhaust gas rises gradually as shown by a dashed line. The power WH of the heater 28*a* for the air-fuel ratio sensor 26*a* is controlled as shown by a dashed line. On the other hand, the power WH of the heater 28*b* for the air-fuel ratio sensor 26*b* is held at 0. The impedance Zdc of each of the sensors 26*a* and 26*b* gradually decreases as the temperature increases. In the event of an abnormality, the impedance Zdc decreases more slowly than it does in a normal state. Being heated by the heater 28*a*, the impedance Zdc of the air-fuel ratio sensor 26*a* decreases less slowly than the impedance Zdc of the heater 28*b* does. The slow decrease in impedance Zdc is reflected in the count value of the counter CNT. For example, in the case of the air-fuel ratio sensor 26*a*, the slow decrease in impedance Zdc is reflected in a counter-value difference DCNT1. In the case of the air-fuel ratio sensor 26*b*, on the other hand, the slower decrease in impedance Zdc is reflected in a counter-value difference DCNT2 which is greater than the counter value difference DCNT1. Thus, by monitoring the impedance Zdc of the air-fuel ratio sensor 26*b*, it is possible to determine whether the system is normal or abnormal with a higher degree of reliability.

In accordance with the third embodiment, by using the air-fuel ratio sensor 26*b*, it is possible to determine whether the control to speed an operation to warm up the catalyst 25 is normal or abnormal. In addition, by eliminating the effect of a heater, an accurate diagnosis can be made. Moreover, the diagnosis can be carried out while the execution of the air-fuel ratio control is being continued.

The diagnosis according to the third embodiment can be made each time the engine 11 is started. As an alternative, the diagnosis according to the third embodiment can also be made for every predetermined number of times the engine 11 is started, at predetermined time intervals or at predetermined running-distance intervals. In accordance with the configuration, when the engine 11 is started without making the diagnosis, both the sensors 26*a* and 26*b* are heated by the heaters 28*a* and 28*b* respectively. Thus, each of the banks can be controlled in accordance with an air-fuel ratio that is actually detected.

In addition, conduction of a current through the air-fuel ratio sensor 26*b* can also be restricted instead of being disabled completely. By merely limiting the amount of heat generated by the heater 28*b*, a diagnosis can be carried out with a high degree of precision without making the activation of the air-fuel ratio sensor 26*b* excessively late.

Fourth Embodiment

Next, a fourth embodiment of the present invention is explained. The configuration elements of the fourth embodiment identical with their respective counterparts employed in the preceding embodiments are denoted by the same reference numerals as the counterparts, and the explanation of the identical elements is not given.

FIG. 22 is a diagram showing the configuration of an emission control system implemented by the fourth embodiment. The ECU 30 carries out processing represented by a flowchart shown in FIG. 26. In the case of the fourth embodiment, a preliminary first diagnosis is made with currents flowing to both the heaters 28*a* and 28*b*. In the first diagnosis, a diagnosis based on the air-fuel ratio sensor 26*a* and a diagnosis based on the air-fuel ratio sensor 26*b* are made. If an abnormality is detected by the first diagnosis, a determinate second diagnosis is made. In the second diagnosis, a current is prevented from flowing to the heater 28 of a particular sensor 26 in which an abnormality was detected by the first diagnosis. The second diagnosis is then made on the basis of this particular sensor 26. The first diagnosis has low precision while the second diagnosis has high precision. In this way, a high-precision diagnosis is made only if there is a suspected abnormality and made on a bank that is suspected of having the abnormality.

Figure 26:
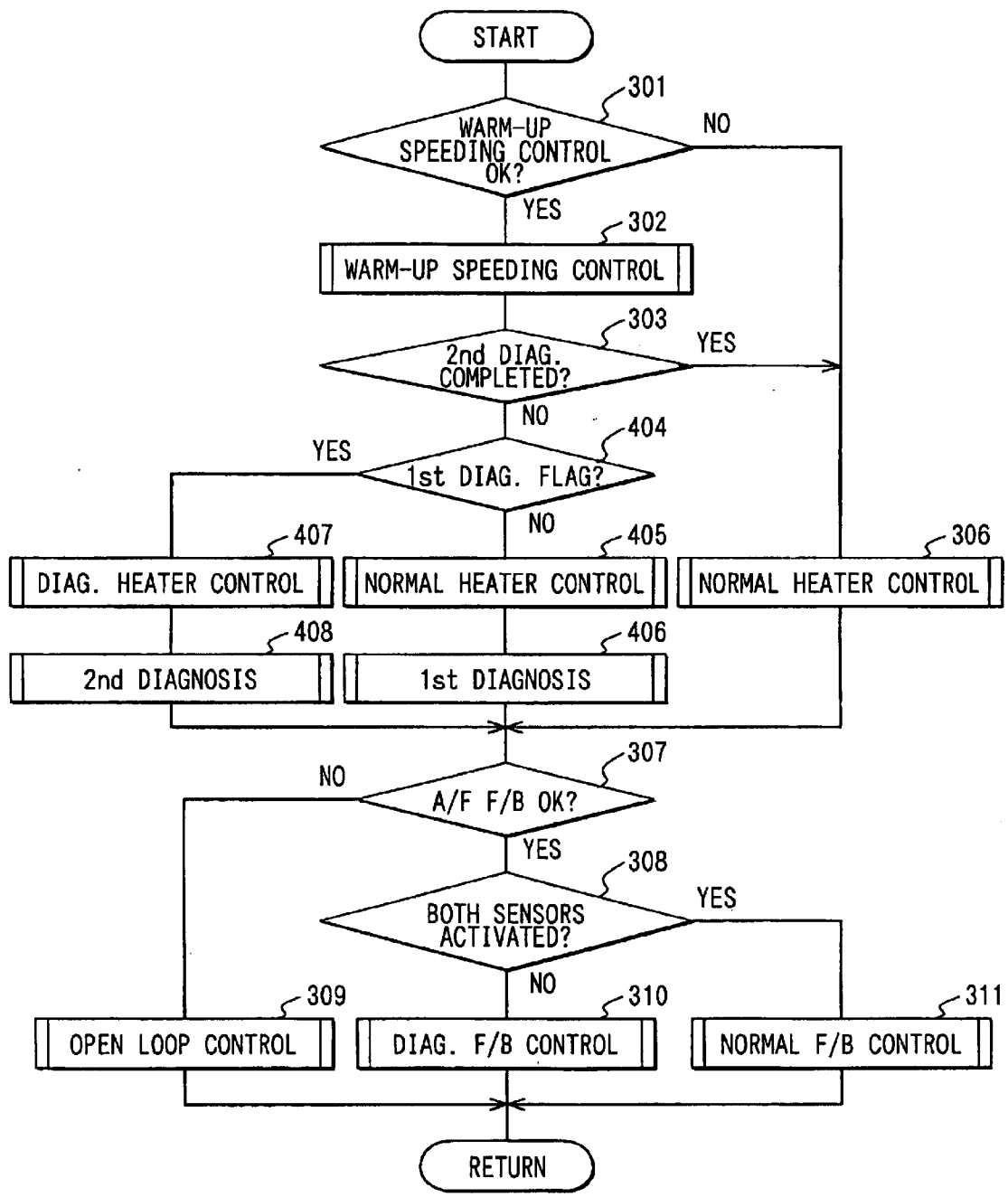
FIG. 26 shows a flowchart representing control executed by the emission control system implemented by a fourth embodiment of the present invention.

Steps 301 to 303 and 306 to 311 of the flowchart shown in FIG. 26 are the same as their respective counterparts in the third embodiment. At a step 404, the result of the first diagnosis is evaluated by examining a flag. An ON state of the flag indicates that an abnormality has been detected by the first diagnosis. If the flag is in an OFF state, the flow of the processing goes on to a step 405. At the step 405, the heater control represented by the flowchart shown in FIG. 3 is executed for both the sensors 26*a* and 26*b*. As a result, the impedance Zdc and the power WH of the air-fuel ratio sensor 26*b* exhibit the same characteristics as those shown in FIG. 25 for the air-fuel ratio sensor 26*a*. Then, at the next step 406, the diagnosis represented by the flowchart shown in FIG. 9 is made on the air-fuel ratio sensor 26*a*. At the same time, the diagnosis represented by the flowchart shown in FIG. 9 is made also on the air-fuel ratio sensor 26*b* as well. That is, the diagnoses are made on the sensors 26*a* and 26*b* independently of each other. As a result, if an abnormality is detected by the diagnosis made on the air-fuel ratio sensor 26*a*, for example, an abnormality flag for the air-fuel ratio sensor 26*a* is turned on. If an abnormality is detected by the diagnosis made on the air-fuel ratio sensor 26*b*, on the other hand, an abnormality flag for the air-fuel ratio sensor 26*b* is turned on. Thus, an abnormality in either bank can be detected.

If an abnormality is determined to exist by the first diagnosis, the flow of the processing goes on to a step 407. At the next step 407, conduction of a current to the heater 28 of the sensor 26 that is suspected of being abnormal is enabled. Assume for example that an abnormality is determined to exist by the first diagnosis made on the air-fuel ratio sensor 26*a*. In this case, the conduction of a current to the heater 28*a* is disabled and the heater control represented by the flowchart shown in FIG. 3 is carried out only on the heater 28*b*. If an abnormality is determined to exist by the first diagnosis made on the air-fuel ratio sensor 26*b*, on the other hand, the conduction of a current to the heater 28*b* is disabled and the heater control represented by the flowchart shown in FIG. 3 is carried out only on the heater 28*a*. If abnormalities are determined to exist by the first diagnoses made on both the sensors 26*a* and 26*b*, the conduction of a current to either the heater 28*a* or the heater 28*b* is disabled.

Then, at the next step 408, the second diagnosis is made. Specifically, at the next step 408, the diagnosis represented by the flowchart shown in FIG. 24 is made. Assume for example that the conduction of a current to the heater 28*a* has been disabled at the step 407. In this case, the diagnosis represented by the flowchart shown in FIG. 24 is made on the air-fuel ratio sensor 26*a*. If the conduction of a current to the heater 28*b* has been disabled at the step 407, on the other hand, the diagnosis represented by the flowchart shown in FIG. 24 is made on the air-fuel ratio sensor 26*b*. That is, the second diagnosis is made on the sensor 26 suspected of being abnormal by the first diagnosis. If the existence of the abnormality is confirmed by the second diagnosis, the diagnosis flag is set at an ON state. With the second diagnosis of the step 408 completed, the flow of the processing goes on from the step 303 to the step 306 in the next execution of this processing. If the existence of an abnormality is detected at the step 408, the ECU 30 informs the operator that the abnormality exists.

As an alternative, the diagnosis of the step 406 can also be made on either of the sensors 26a and 26b. In this case, an abnormality common to both the banks can be detected. In addition, at the step 407, the conduction of a current to the heater 28 of only either sensor 26 can also be disabled without regard to the result of the first diagnosis. Assume for example that an abnormality is determined to exist by the first diagnosis made on the air-fuel ratio sensor 26a. In this case, the conduction of a current to the heater 28b of the air-fuel ratio sensor 26b can be disabled at the step 407 and the diagnosis of the step 408 can be made on the air-fuel ratio sensor 26b. If an abnormality is determined to exist by the first diagnosis made on the air-fuel ratio sensor 26b, on the other hand, the conduction of a current to the heater 28a of the air-fuel ratio sensor 26a can be disabled at the step 407 and the diagnosis of the step 408 can be made on the air-fuel ratio sensor 26a.

In accordance with the fourth embodiment, the number of times the conduction of a current to at least one of the heaters 28a and 28b can be reduced. As a result, the air-fuel ratio control can be executed with a high degree of precision. In addition, by making the second diagnosis, the existence of an abnormality can be determined with a high degree of precision.

Fifth Embodiment

Next, a fifth embodiment of the present invention is explained. The configuration elements of the fifth embodiment identical with their respective counterparts employed in the preceding embodiments are denoted by the same reference numerals as the counterparts, and the explanation of the identical elements is not given.

Figure 27:
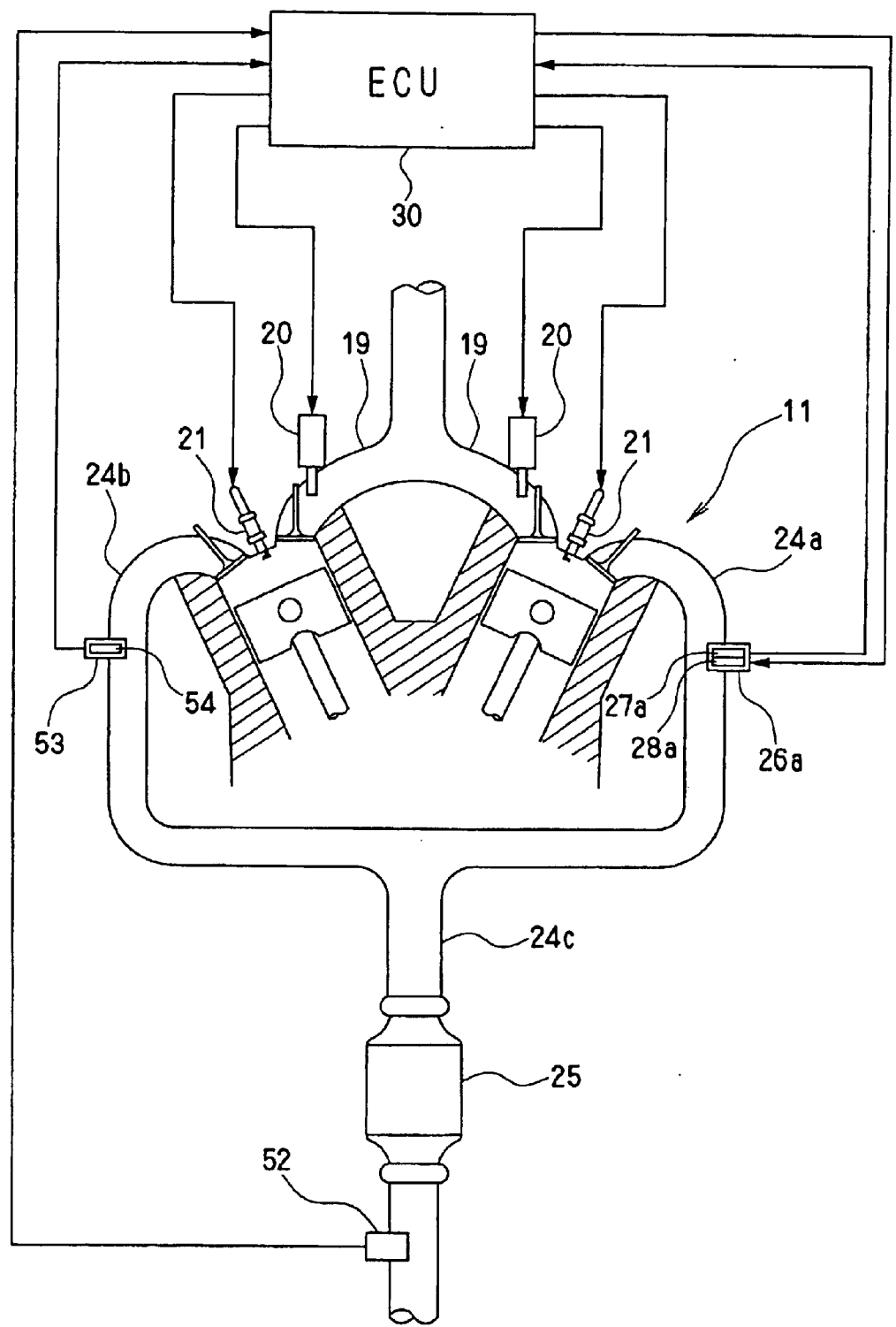
FIG. 27 is a diagram showing the configuration of an emission control system implemented by a fifth embodiment of the present invention.

FIG. 27 is a diagram showing the configuration of an emission control system implemented by the fifth embodiment. In the case of the fifth embodiment, a sensor 53 is provided as a substitute for the air-fuel ratio sensor 26b employed in the fourth embodiment. The sensor 53 is an air-fuel ratio sensor. The sensor 53 also has a sensor element 54. However, the sensor 53 is a heater-less sensor, which is a sensor that does not have a heater.

Figure 28:
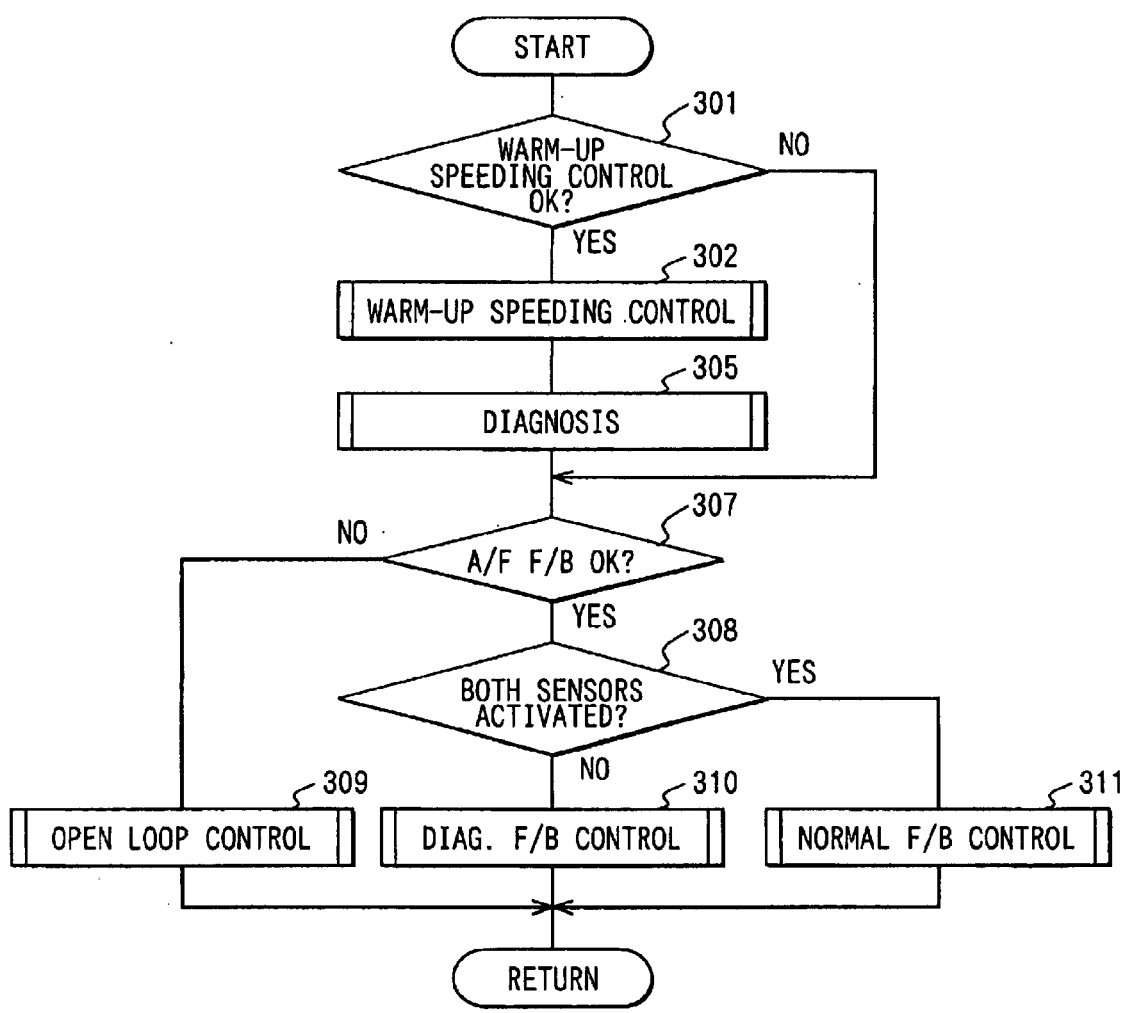
FIG. 28 shows a flowchart representing control executed by the emission control system implemented by the fifth embodiment of the present invention.

In the case of the fifth embodiment, the ECU 30 executes the heater control represented by the flowchart shown in FIG. 3 on the air-fuel ratio sensor 26a. The ECU 30 makes a diagnosis based only on the sensor 53. FIG. 28 shows a flowchart representing the diagnosis. The flowchart representing the diagnosis comprises the steps 301, 302, 305, 307, 308, 309, 310 and 311, which have been described earlier. At the step 305, however, the ECU 30 makes a diagnosis based only on the sensor 53.

In accordance with the fifth embodiment, the diagnosis can be made with a high degree of precision as well.

Sixth Embodiment

Next, a sixth embodiment of the present invention is explained. The configuration elements of the sixth embodiment identical with their respective counterparts employed in the preceding embodiments are denoted by the same reference numerals as the counterparts, and the explanation of the identical elements is not given.

Figure 29:
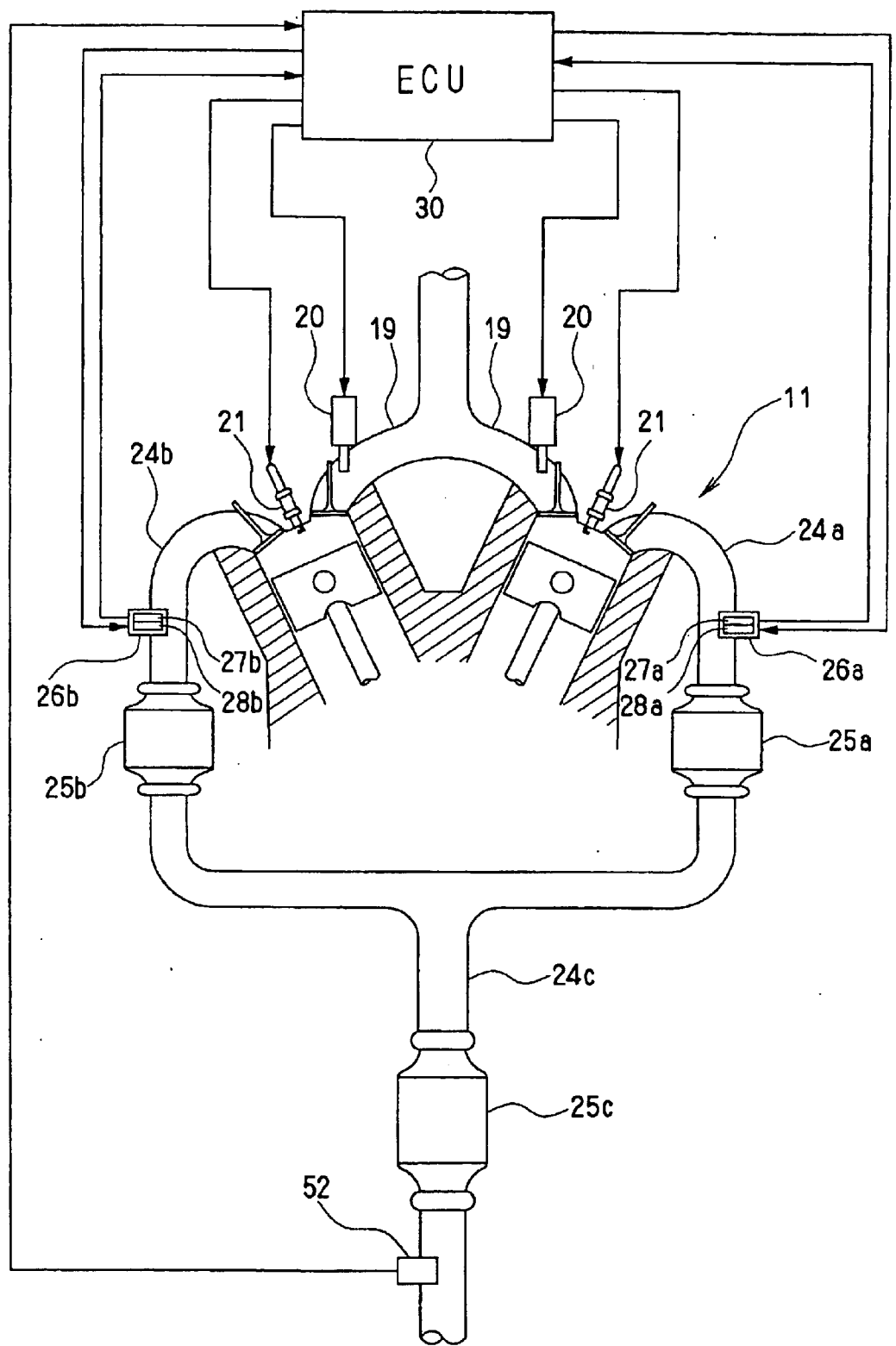
FIG. 29 is a diagram showing the configuration of an emission control system implemented by a sixth embodiment of the present invention.

FIG. 29 is a diagram showing the configuration of an emission control system implemented by the sixth embodiment. The emission control system has 3 catalysts 25a, 25b and 25c. The catalyst 25a is provided on an exhaust pipe 24a on the right bank. The catalyst 25b is provided on an exhaust pipe 24b on the left bank. The catalyst 25c is provided on a merge exhaust pipe 24c. The ECU 30 executes the same control as the third embodiment. The capacities of the catalysts 25a and 25b are each relatively small so that the catalysts 25a and 25b can be activated in a short period of time.

The third to sixth embodiments described above can be applied to an engine having a plurality of exhaust pipes, which are independent of each other and each provided for a group of cylinders. For example, the third to sixth embodiments can be applied to an inline layout engine or a boxer layout engine. In addition, the third to sixth embodiments can also be applied to a control system having a plurality of sensors provided on a single exhaust pipe. For example, the third to sixth embodiments can be applied to a control system having a first air-fuel ratio sensor provided on the upstream side of the single exhaust pipe and a second air-fuel ratio sensor provided on the downstream side of the single exhaust pipe. In this case, any of the air-fuel ratio sensors can be either a sensor having a heater or a heaterless sensor.

Furthermore, the present invention can be applied to a control system having a single sensor having a heater. In this case, it is possible to provide a configuration in which the conduction of a current to the heater of the single sensor is disabled or limited during a diagnosis. In this way, the diagnosis can be made with a higher degree of precision.

Seventh Embodiment

Next, a seventh embodiment of the present invention is explained. The configuration elements of the seventh embodiment identical with their respective counterparts employed in the preceding embodiments are denoted by the same reference numerals as the counterparts, and the explanation of the identical elements is not given.

Figure 30:
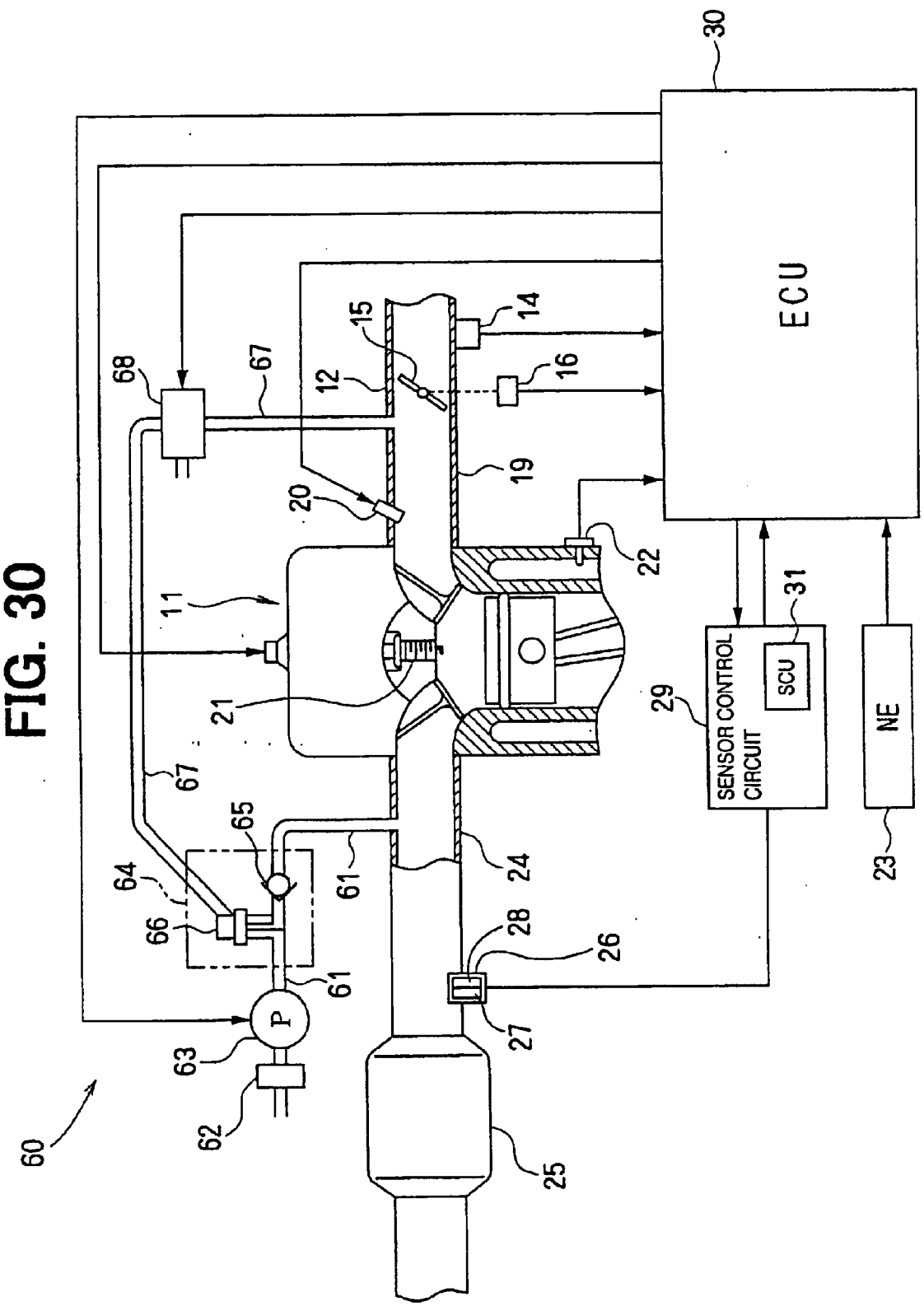
FIG. 30 is a diagram showing the configuration of an emission control system implemented by a seventh embodiment of the present invention.

FIG. 30 is a diagram showing the configuration of an emission control system implemented by the seventh embodiment. The emission control system implemented by the seventh embodiment is obtained by adding a secondary air control device 60 to the configuration of the first embodiment.

The secondary air control device 60 has a secondary air passage 61. One end of the secondary air passage 61 is connected to the exhaust pipe 24 between the air-fuel ratio sensor 26 and the engine 11. This end of the secondary air passage 61 is connected to the exhaust pipe 24 at a position with the temperature of exhaust gas inside the exhaust pipe 24 equal to or higher than a predetermined temperature. The predetermined temperature is a temperature at which the exhaust gas rich component such as HC reacts with secondary air, resulting in an after burn. The predetermined temperature is typically 700 degrees Celsius. The other end of the secondary air passage 61 is exposed to the atmosphere.

An air filter 62, an air pump 63 and a combination valve 64 are provided on the secondary air passage 61, being arranged at their respective locations starting with that closest to the end exposed to the atmosphere. The air filter 62 passes secondary air. The air pump 63 supplies secondary air to the exhaust pipe 24. The operation of the air pump 63 is controlled by the ECU 30. The combination valve 64 has a check valve 65 and an opening/closing valve 66. The check valve 65 avoids a back flow from the exhaust pipe 24 to the secondary air passage 61. The opening/closing valve 66 is driven by the atmospheric pressure. The opening/closing valve 66 is connected to the intake pipe 12 by a pipe 67. A switching valve 68 is provided on the pipe 67. The switching valve 68 switches the pressure applied to the opening/closing valve 66 from the atmospheric pressure to the intake air pressure (the negative pressure) or vice versa. The switching valve 68 is controlled by the ECU 30. When the switching valve 68 applies the atmospheric pressure to the opening/closing valve 66, the opening/closing valve 66 is closed. When the switching valve 68 applies the intake air pressure to the opening/closing valve 66, on the other hand, the opening/closing valve 66 is opened. When the opening/closing valve 66 is opened, the air pump 63 supplies secondary air to the exhaust pipe 24.

The following description explains the heater control of the air-fuel ratio sensor 26, the catalyst warming up speeding control to speed an operation to warm up the catalyst 25 and the diagnosis.

[Heater Control]

The ECU 30 executes the heater control represented by the flowchart shown in FIG. 3. As a result, the heater 28 of the air-fuel ratio sensor 26 is controlled to increase the temperature of the sensor element 27 to an activation temperature very quickly. Thereafter, the heater 28 is controlled to maintain the temperature of the sensor element 27 at the activation temperature.

[Control to Speed an Operation to Warm up the Catalyst]

Figure 31:
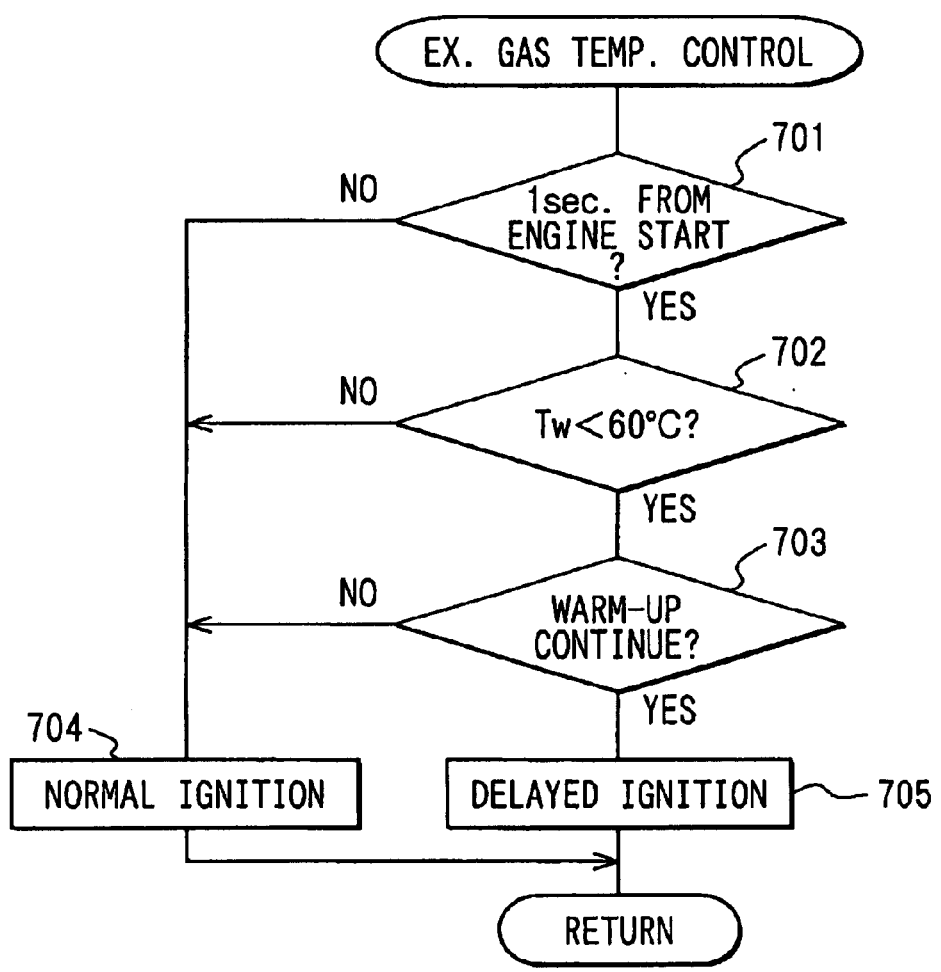
FIG. 31 shows a flowchart representing control executed by the emission control system implemented by the seventh embodiment of the present invention.
Figure 32:
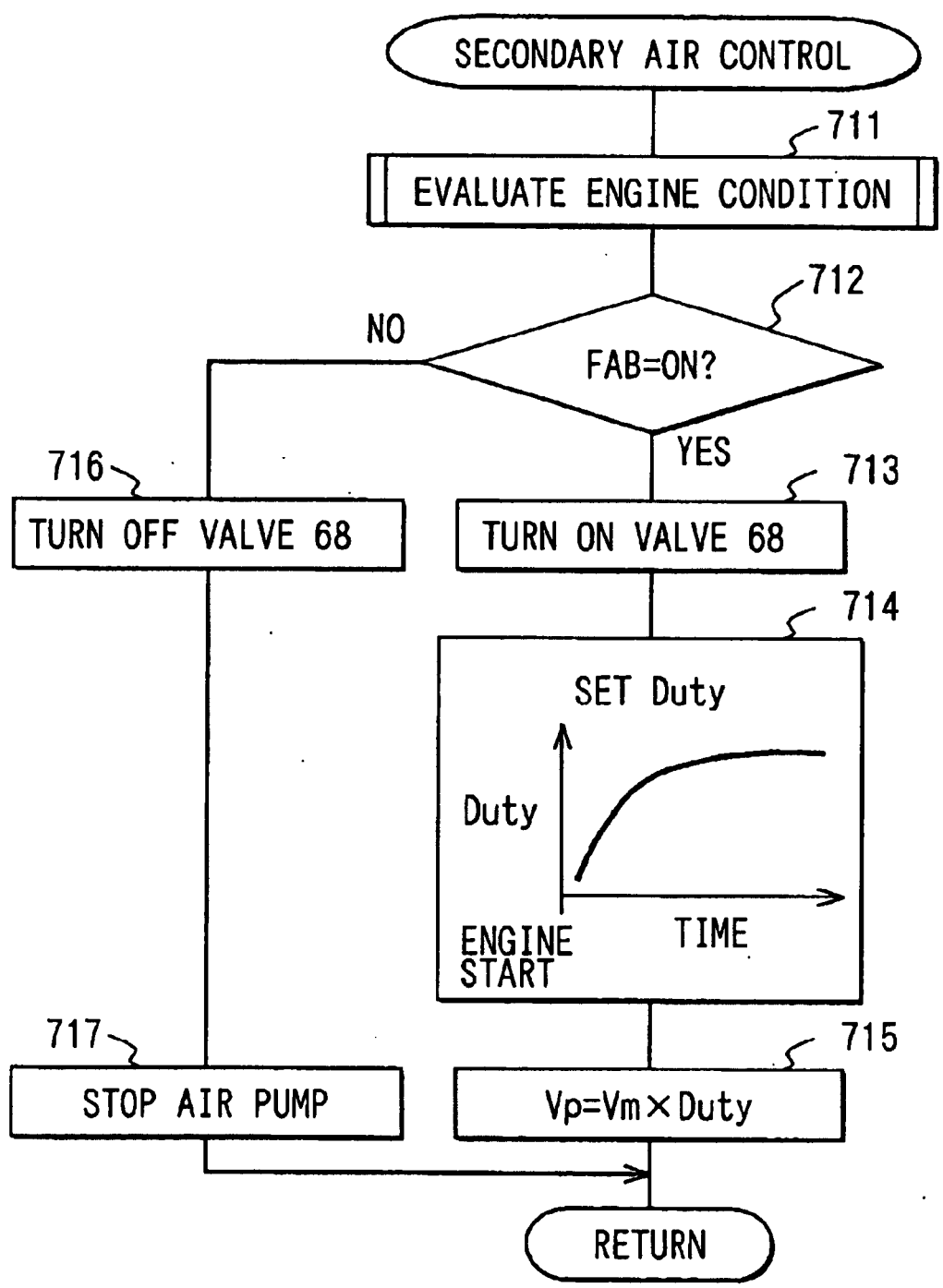
FIG. 32 shows a flowchart representing control executed by the emission control system implemented by the seventh embodiment of the present invention.
Figure 33:
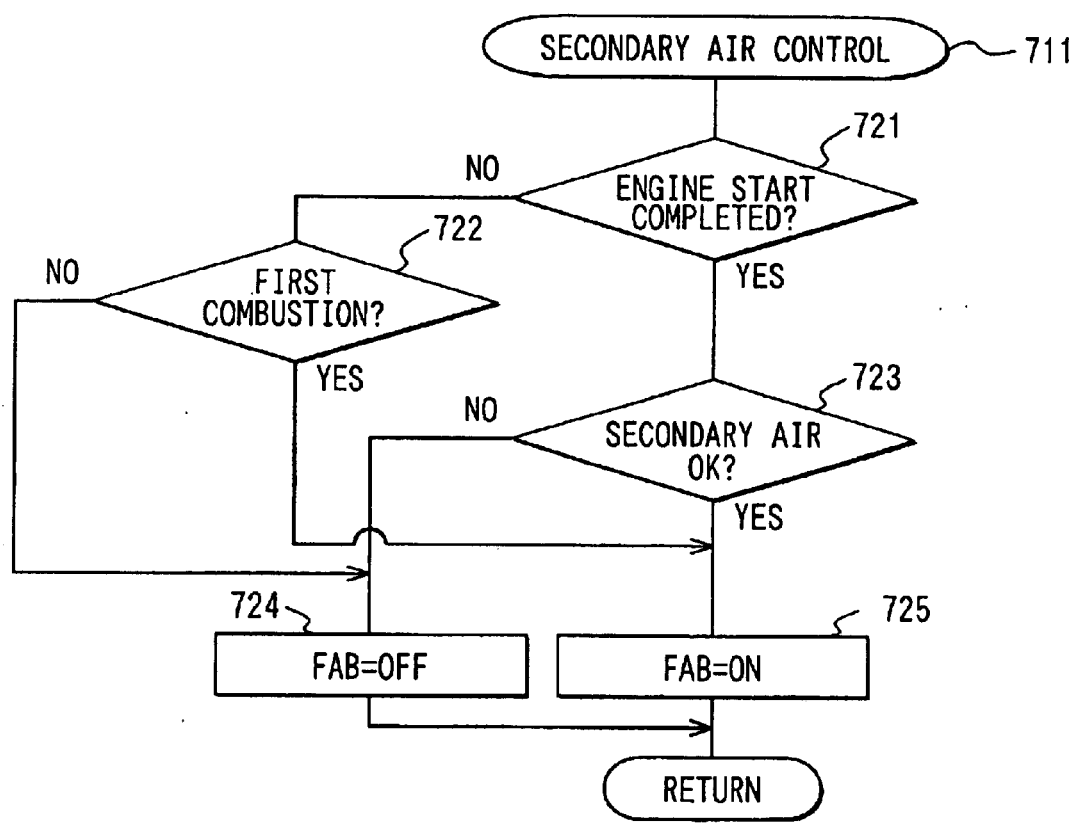
FIG. 33 shows a flowchart representing control executed by the emission control system implemented by the seventh embodiment of the present invention.

The ECU 30 carries out processing represented by flowcharts shown in FIGS. 31, 32 and 33 to speed an operation to warm up the catalyst 25. In the case of this embodiment, an operation to warm up the catalyst 25 is speeded by the after burn in the exhaust pipe 24. The after burn is carried out by increasing the temperature inside the exhaust pipe 24 and supplying secondary air containing oxygen enough for and burning combustible components including HC. The temperature inside the exhaust pipe 24 can be increased by delaying the ignition timing from the normal ignition timing. Oxygen is supplied to the inside of the exhaust pipe 24 by feeding secondary air thereto.

This embodiment includes an exhaust gas temperature control system comprising a facility for executing an exhaust gas temperature control routine represented by a flowchart shown in FIG. 31 and an ignition device having an ignition plug 21. The embodiment also includes a secondary air control system comprising a facility for executing a secondary air control routine represented by flowcharts shown in FIGS. 32 and 33 and a secondary air control device 60.

In addition, the ECU 30 executes a fuel injection routine shown in none of the figures to set the air-fuel ratio of exhaust gas flowing through the catalyst 25 during the control to speed an operation to warm up the catalyst 25 at a weak lean value so as to reduce the amount of HC flowing through the catalyst 25. It is to be noted that, when the air-fuel ratio of exhaust gas flowing through the catalyst 25 is set at a weak lean value, mixed gas inside the cylinder has an air-fuel ratio close to the stoichiometric air-fuel ratio or a weak rich value.

[Control of Temperature of Exhaust Gas]

The exhaust gas temperature control routine represented by a flowchart shown in FIG. 31 is executed typically for every injection of fuel to each cylinder. First of all, in order to determine whether or not ignition-timing-delaying control is to be executed as the control to speed an operation to warm up the catalyst 25, processing of steps 701 to 703 is carried out as follows. The processing begins with the step 701 to determine whether or not a predetermined time of typically 1 second has lapsed since completion of a start of the engine 11. A start of the engine 11 is determined to have been completed when the revolution speed Ne of the engine 11 has exceeded a start criterion value. If the predetermined period of time has lapsed since the completion of a start of the engine 11, the flow of the routine goes on to a step 702. At the step 702, the temperature Tw of the cooling water is examined to determine whether or not the temperature Tw is lower than a predetermined value of typically 60 degrees Celsius. If the temperature Tw of the cooling water is found lower than the predetermined value, the engine 11 is determined to have not entered a high-temperature restart state, that is, the engine 11 is determined not to have been restarted at a high temperature. In this case, the flow of the routine goes on to a step 203 to determine whether or not execution of the control to speed an operation to warm up the catalyst 25 is to be continued. Concretely, a decision as to whether or not execution of the control is to be executed is based on a result of determination of whether or not a time of 20 seconds has lapsed since a start-on (or a cranking start) or whether or not the engine 11 has entered a non-idle state. If the time of 20 seconds has lapsed since a start-on or the engine 11 has entered a non-idle state, for example, a decision is made not to continue execution of the control to speed an operation to warm up the catalyst 25.

If any one of the determination results obtained at the steps 701 to 703 is NO, the flow of the routine goes on to a step 704. At the step 704, the control to speed an operation to warm up the catalyst 25 is determined to be unnecessary. In this case, the normal ignition timing control is executed. With the normal ignition timing control executed, the ignition timing at the start of the engine 11 is fixed typically at a BTCD of 5 degrees CA. In addition, after completion of an operation to warm up the engine 11, processing such as idle stabilization compensation and knock advance compensation is carried out for a basic advance according to the operating state of the engine 11 in order to control the ignition timing by setting an optimum advance.

If all the determination results obtained at the steps 701 to 703 are YES, the flow of the routine goes on to a step 705. At the step 705, the ignition-timing-delaying control is executed to delay the ignition timing to typically an ATDC of 10 degrees CA. By delaying the ignition timing in this way, the combustion of mixed gas in the cylinder is also delayed as well so that the temperature of the exhaust gas flowing to the exhaust pipe 24 increases.

[Secondary Air Control]

The secondary air control routine represented by the flowchart shown in FIG. 32 is executed at predetermined intervals. When this secondary air control routine is invoked, the flowchart begins with a step 711 to execute a secondary air control evaluation routine represented by the flowchart shown in FIG. 33. The secondary air control evaluation routine executed at this step 711 sets a flag FAB at an ON state indicating that introduction of secondary air is allowed or an OFF state indicating that introduction of secondary air is disabled.

Then, the flow of the routine goes on to a step 712 to determine whether the flag FAB is in an ON or OFF state. If the flag FAB is in an ON state, the flow of the routine goes on to a step 713. At the step 713, the switching valve 68 is changed over to an ON position or a position applying the intake air pressure to the opening/closing valve 66 to open the opening/closing valve 66. Then, at the next step 714, a duty ratio map is searched for a duty ratio Duty of the air pump 63. The duty ratio Duty searched for is suitable for a time lapsing since the start of the engine 11, that is, since a start-on or the completion of the start of the engine 11. The map represents a relation between the duty ratio Duty and the lapsing time used as a parameter for searching the map. The Duty (duty ratio) map exhibits a characteristic indicating that the duty ratio Duty increases proportionally to the time lapsing since the start of the engine 11 till the time reaches a predetermined value measured from the start of the engine 11 and, thereafter, the duty ratio Duty stays at about a constant value.

Then, at the next step 715, an operating voltage Vp of the air pump 63 is found as a product obtained as a result of multiplying the a maximum operating voltage Vm of the air pump 63 by the duty ratio Duty in accordance with the following equation: Vp=Vm×Duty. The air pump 63 is then driven at the operating voltage Vp to introduce secondary air into the exhaust pipe 24.

If the determination results obtained at the step 712 indicates that the flag FAB is in an OFF state, on the other hand, the flow of the routine goes on to a step 716 at which the switching valve 68 is changed over to an OFF position or a position applying the atmospheric pressure to the opening/closing valve 66 to close the opening/closing valve 66. Then, at the next step 717, the operation of the air pump 63 is discontinued to stop the introduction of secondary air.

Next, the processing carried out at the step 711 is explained by referring to the flowchart shown in FIG. 33. The flowchart begins with a step 721 to determine whether or not the start of the engine 11 has been completed by determining whether or not the revolution speed Ne of the engine 11 has exceeded a predetermined start value. If the start of the engine 11 has not been completed, the flow of the routine goes on to a step 722 to determine whether or not a first explosion has occurred in the cylinder. If a first explosion has not occurred, the flow of the routine goes on to a step 724 at which the flag FAB is set at an OFF state. If the result of the determination later indicates that a first explosion has occurred, the flow of the routine goes on to a step 725 at which the flag FAB is set at an ON state.

If the determination result obtained at the step 721 indicates that the start of the engine 11 has been completed, on the other hand, the flow of the routine goes on to a step 723 to determine whether or not conditions for introduction of secondary air are satisfied. Typically, the conditions for introduction of secondary air include the following conditions:

(1): The temperature of the exhaust gas shall be at least equal to a temperature of typically 700 degrees Celsius that enables after burning.

(2): The temperature of the catalyst 25 shall be lower than a predetermined temperature.

(3): The engine 11 shall be in an operating state in which the amount of HC exhausted from the engine 11 is relatively large.

In the operating state cited in condition (3), variables (such as the revolution speed Ne of the engine, the intake air pressure PM and the intake air volume Ga), a roughness value representing instability of combustion as well as the delay quantity of the ignition timing with the engine revolution speed Ne set at least a predetermined speed are at least equal to predetermined values set for them respectively. In few words, the state of combustion in the cylinder shall be instable to a certain degree. In such a state of combustion, since unburned HC is exhausted from the engine 11, HC necessary for the after burn can be supplied to the exhaust pipe 24 and, by virtue of the after burn, the amount of HC flowing to the catalyst 25, that is, the amount of HC exhausted to the atmosphere, can be reduced.

In addition, if condition (1) is satisfied, right after introduction of secondary air, the after burn can be accomplished with a high degree of reliability.

The predetermined temperature cited in condition (2) is typically a temperature close to the lower limit of a range of temperatures for activating the catalyst 25 or a temperature slightly higher than the lower limit. Thus, if the temperature of the catalyst 25 is lower than the predetermined temperature, secondary air is introduced to be burned in the after burn for speeding an operation to warm up the catalyst 25. If the temperature of the catalyst 25 is equal to or higher than the predetermined temperature, on the other hand, introduction of secondary air is disabled to prevent the catalyst 25 from being overheated by heat generated from the after burning.

If conditions (1) and (2) or (1) and (3) explained above are satisfied, the conditions for introduction of secondary air are considered to hold true. In this case, the flow of the routine goes on from the step 723 to the step 725. As described above, at the step 725, the flag FAB is set at an ON state to allow introduction of secondary air. Then, the execution of this routine is ended. If the conditions for introduction of secondary air are not satisfied, on the other hand, the flow of the routine goes on to the step 724 at which, as described above, the flag FAB is set at an OFF state to prohibit introduction of secondary air. Then, the execution of this routine is ended.

It is to be noted that there are several ways to determine whether or not the conditions for introduction of secondary air are satisfied. For example, the conditions for introduction of secondary air may be considered to hold true if only condition (2) or (3) is satisfied. As described above, condition (2) requires that the temperature of the catalyst 25 shall be lower than a predetermined temperature while condition (3) requires that the engine 11 shall be in an operating state in which the amount of HC exhausted from the engine 11 is relatively large.

The following description explains a method of making a diagnosis of the emission control system. After the engine 11 is started, heat dissipated by exhaust gas flowing through a periphery surrounding the air-fuel ratio sensor 26 and heat generated by the heater 28 warm up the air-fuel ratio sensor 26, increasing the temperature thereof. As the activation of the air-fuel ratio sensor 26 goes on, a signal output by the air-fuel ratio sensor 26 increases to a normal level.

Figure 34:
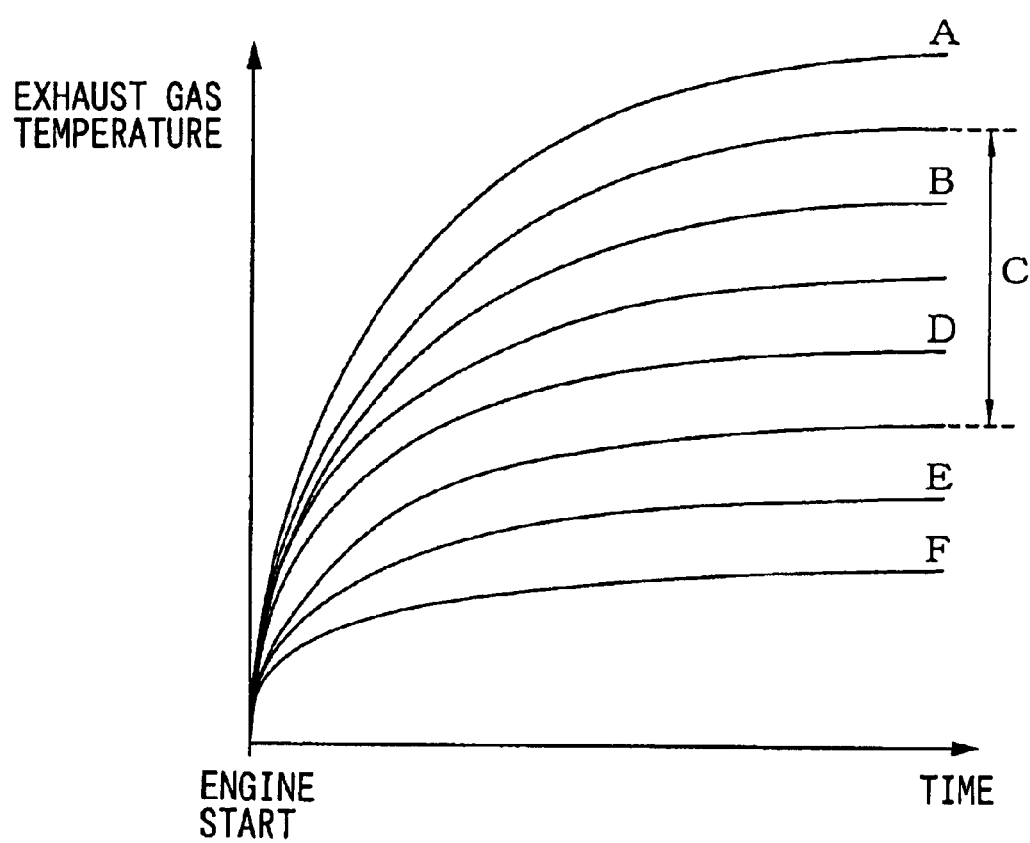
FIG. 34 shows graphs each representing changes in exhausted-gas temperature with the lapse of time in the seventh embodiment of the present invention.

As shown in FIGS. 34 and 35, if an exhaust gas temperature control system and a secondary air control system, which are employed in the emission control system, are both functioning normally, after burn occurs at a location in close proximity to a secondary gas control device provided inside the exhaust pipe 24, increasing the temperature of exhaust gas flowing through the periphery surrounding the air-fuel ratio sensor 26 and through the catalyst 25 itself. Thus, an operation to warm up the catalyst 25 is speeded and, at the same time, the state of activation of the air-fuel ratio sensor 26 is also progressing speedily as well. If the exhaust gas temperature control system or the secondary air control system becomes abnormal, however, the temperature of exhaust gas flowing through the periphery surrounding the air-fuel ratio sensor 26 and through the catalyst 25 decreases so that an operation to warm up the catalyst 25 is late and, at the same time, the state of activation of the air-fuel ratio sensor 26 is also progressing slowly. In such a case, the temperature of exhaust gas flowing through the periphery surrounding the air-fuel ratio sensor 26 varies in accordance with one of combinations (A) to (F) to be described later, changing the state of progress of activation of the air-fuel ratio sensor 26. As described below by referring to FIG. 35, combinations (A) to (F) are combinations of normal and abnormal states of the exhaust gas temperature control system with normal and abnormal states of the secondary air control system.

(A): If both the exhaust gas temperature control system and the secondary air control system are in a normal state, the temperature of exhaust gas discharged from the engine 11 should have already been raised by the exhaust gas temperature control, and further rises due to heat dissipated by after burn resulting from introduction of secondary air so that the temperature of exhaust gas flowing through the periphery surrounding the air-fuel ratio sensor 26 also increases as well. Thus, the state of activation of the air-fuel ratio sensor 26 is also progressing very speedily. Since the air-fuel ratio of exhaust gas flowing through the catalyst 25, that is, exhaust gas flowing through the periphery surrounding the air-fuel ratio sensor 26, is set at a weak lean value during the control to speed an operation to warm up the catalyst 25, the air-fuel ratio of exhaust gas flowing through the periphery surrounding the air-fuel ratio sensor 26 also has the weak lean value as well provided that both the exhaust gas temperature control system and the secondary air control system are functioning normally.

(B): If the exhaust gas temperature control system is functioning normally but the secondary air control system is not, resulting in a lack of introduced secondary air, the engine 11 discharges exhaust gas having a temperature raised by the exhaust gas temperature control but the temperature-increasing effect of the after burn decreases due to the lack of introduced secondary air. Thus, the temperature of exhaust gas flowing through the periphery surrounding the air-fuel ratio sensor 26 is lower than the temperature for combination (A) so that the state of activation of the air-fuel ratio sensor 26 is progressing slowly in comparison with combination (A). In addition, in the case of combination (B), the air-fuel ratio of exhaust gas is shifted by introduction of secondary gas in the lean-side direction only slightly so that the air-fuel ratio of exhaust gas flowing through the periphery surrounding the air-fuel ratio sensor 26 is sustained at a value close to the stoichiometric air-fuel ratio or a value close to a target air-fuel ratio set after completion of an operation to warm up the catalyst 25.

(D) to (F): If the exhaust gas temperature control system is not functioning normally, the abnormality of the exhaust gas temperature control system does nor raise the temperature of exhaust gas discharged by the engine 11 to a temperature allowing after burn. Thus, after burn does not occur sufficiently even if secondary air is introduced into the exhaust pipe 24. Adversely, the introduced secondary air cools exhaust gas. As a result, the temperature of exhaust gas flowing through the periphery surrounding the air-fuel ratio sensor 26 becomes even lower than the temperature for combination (B).

Combination (D) is a combination of the abnormal state of the exhaust gas temperature control system with the secondary air control system abnormality causing a lack of introduced secondary air. Combination (E) is a combination of the abnormal state of the exhaust gas temperature control system with the secondary air control system normal state. Combination (F) is a combination of the abnormal state of the exhaust gas temperature control system with the secondary air control system abnormality causing an excessive flow rate of introduced secondary air. The flow rate of introduced secondary air for combination (E) is greater than the flow rate for combination (D). Similarly, the flow rate of introduced secondary air for combination (F) is greater than the flow rate for combination (E). Thus, the temperature of exhaust gas flowing through the periphery surrounding the air-fuel ratio sensor 26 for combination (E) is lower than the temperature for combination (D). Similarly, the temperature of exhaust gas flowing through the periphery surrounding the air-fuel ratio sensor 26 for combination (F) is lower than the temperature for combination (E). As a result, the state of activation of the air-fuel ratio sensor 26 for combination (E) is progressing more slowly than that the state for combination (D). Similarly, the state of activation of the air-fuel ratio sensor 26 for combination (F) is progressing more slowly than that the state for combination (E).

Since the exhaust gas temperature control system does not result in adequate after burn for combinations (D), (E) and (F), the greater the flow rate of introduced secondary air, the higher the concentration of oxygen contained in exhaust gas flowing through the periphery surrounding the air-fuel ratio sensor 26 and, hence, the greater the shift of the air-fuel ratio of the exhaust gas in the lean-side direction. Thus, in the case of combination (F), which is a combination with the secondary air control system abnormality causing an excessive flow rate of introduced secondary air, the lean-side direction shift of the air-fuel ratio of exhaust gas flowing through the periphery surrounding the air-fuel ratio sensor 26 is largest, putting the air-fuel ratio of the exhaust gas on the lean side. In the case of combination (D), which is a combination with the secondary air control system abnormality causing a lack of introduced secondary air, on the other hand, the lean-side direction shift of the air-fuel ratio of exhaust gas flowing through the periphery surrounding the air-fuel ratio sensor 26 decreases, sustaining the air-fuel ratio of the exhaust gas at a value close to the stoichiometric air-fuel ratio. In the case of combination (E), which is a combination with the secondary air control system normal state, the lean-side direction shift of the air-fuel ratio of exhaust gas flowing through the periphery surrounding the air-fuel ratio sensor 26 has a magnitude between those for combinations (F) and (D), putting the air-fuel ratio of the exhaust gas at a weak lean value.

(C): If the exhaust gas temperature control system is functioning normally but the secondary air control system is not, resulting in an excessive flow rate of introduced secondary air, the engine 11 discharges exhaust gas having a temperature raised by the exhaust gas temperature control but the excessive portion of the introduced secondary air cools the exhaust gas. Thus, the temperature of exhaust gas flowing through the periphery surrounding the air-fuel ratio sensor 26 decreases proportionally to the magnitude of the excessive portion of the introduced secondary air. As a result, the temperature of exhaust gas flowing through the periphery surrounding the air-fuel ratio sensor 26 is lower than the temperature for combination (A) but higher than that for combination (E). Accordingly, the state of activation of the air-fuel ratio sensor 26 is progressing more slowly than that the state for combination (A) but more speedily than that for combination (E). In the case of combination (C), since the amount of oxygen left unburned in the after burn increases, the air-fuel ratio of exhaust gas flowing through the periphery surrounding the air-fuel ratio sensor 26 has a value on the lean side.

In this embodiment, the state of progress of activation of the air-fuel ratio sensor 26 and a signal output by the air-fuel ratio sensor 26 are evaluated to determine which of combinations (A) to (F), that is, which of combinations of normal and abnormal states of the exhaust gas temperature control system with normal and abnormal states of the secondary air control system, prevails.

FIGS. 36, 37, 38 and 39 each show a flowchart representing a diagnosis. By making the diagnoses, it is possible to identify which of combinations (or modes) (A) to (F) shown in FIG. 35 prevails.

Figure 36:
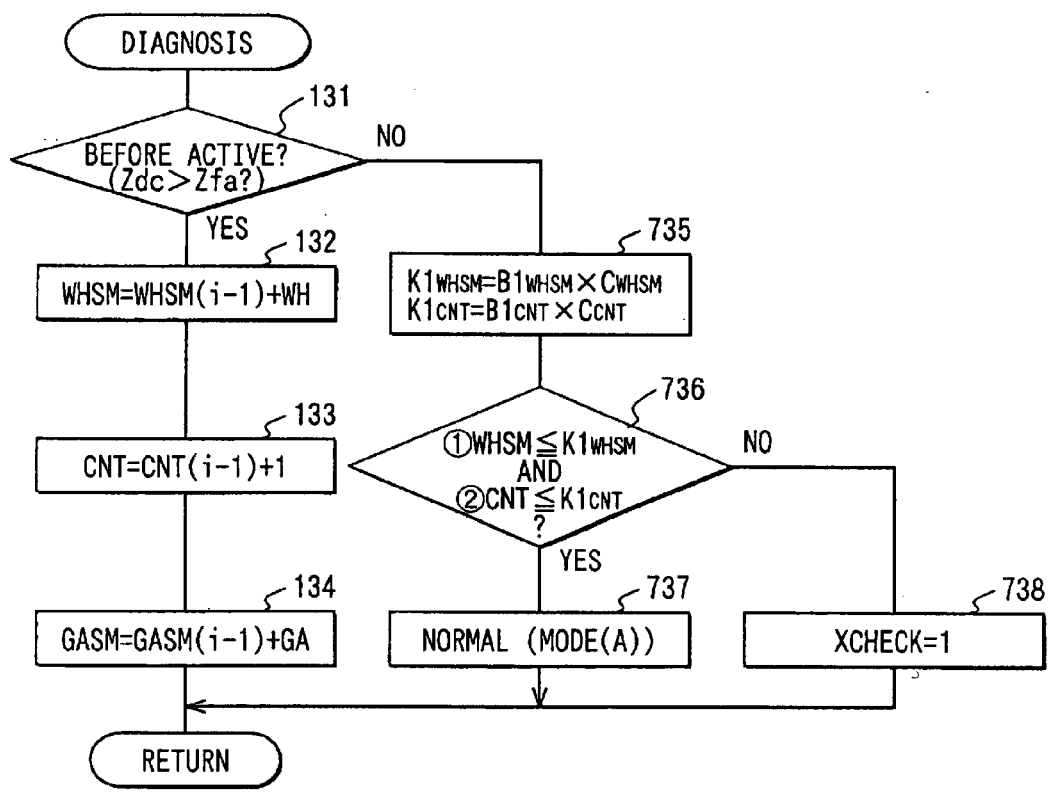
FIG. 36 shows a flowchart representing control executed by the emission control system implemented by the seventh embodiment of the present invention.

FIG. 36 shows a flowchart representing diagnostic processing to recognize mode (A). The processing steps 131, 132, 133 and 134 are the same as their respective counterparts in the flowchart shown in FIG. 9. On the other hand, processing steps 735, 736, 737 and 738 are similar to respectively the steps 135, 136, 137 and 138 of the flowchart shown in FIG. 9.

At the step 735, $K1_{WHSM}$ and $K1_{CNT}$ are set as first criterion values. The first criterion values $K1_{WHSM}$ and $K1_{CNT}$ are set for respectively the heater power cumulative value WHSM and the lapsing time CNT. The first criterion values $K1_{WHSM}$ and $K1_{CNT}$ are respectively a heater power cumulative value WHSM and a lapsing time CNT that are expectedly required for activating the air-fuel ratio sensor 26 to an activated state if both the exhaust gas temperature control system and the secondary air control system are functioning normally. Notations $B1_{WHSM}$ and $B1_{CNT}$ used at this step denote first base values of respectively the heater power cumulative value WHSM and the lapsing time CNT. These first base values $B1_{WHSM}$ and $B1_{CNT}$ are respectively the first base values $B1_{WHSM}$ and $B1_{CNT}$ that are optimum for an engine operating state serving as a reference state. On the other hand, notations $C_{WHSM}$ and $C_{CNT}$ used at this step denote first correction values of respectively the heater power cumulative value WHSM and the lapsing time CNT. These first correction values $C_{WHSM}$ and $C_{CNT}$ are coefficients for correcting the first base values $B1_{WHSM}$ and $B1_{CNT}$ respectively. The magnitudes of the first correction values $C_{WHSM}$ and $C_{CNT}$ depend on the actual operating state of the engine 11. At the next step 736, a heater power cumulative value WHSM and a lapsing time CNT, which are actually required for activating the air-fuel ratio sensor 26, are compared with the first criterion values $K1_{WHSM}$ and $K1_{CNT}$ respectively to determine whether or not the emission control system is in mode (A). If the actual heater power cumulative value WHSM and the actual lapsing time CNT are both found equal to or smaller than the first criterion values $K1_{WHSM}$ and $K1_{CNT}$ respectively, the emission control system is determined to be in mode (A). In this case, the flow of the diagnosis goes on to a step 737 at which the emission control system is determined to be normal. Otherwise, the emission control system is determined to be in a mode other than mode (A). In this case, the flow of the diagnosis goes on to a step 738 at which a flag XCHEK is set at 1.

Figure 37:
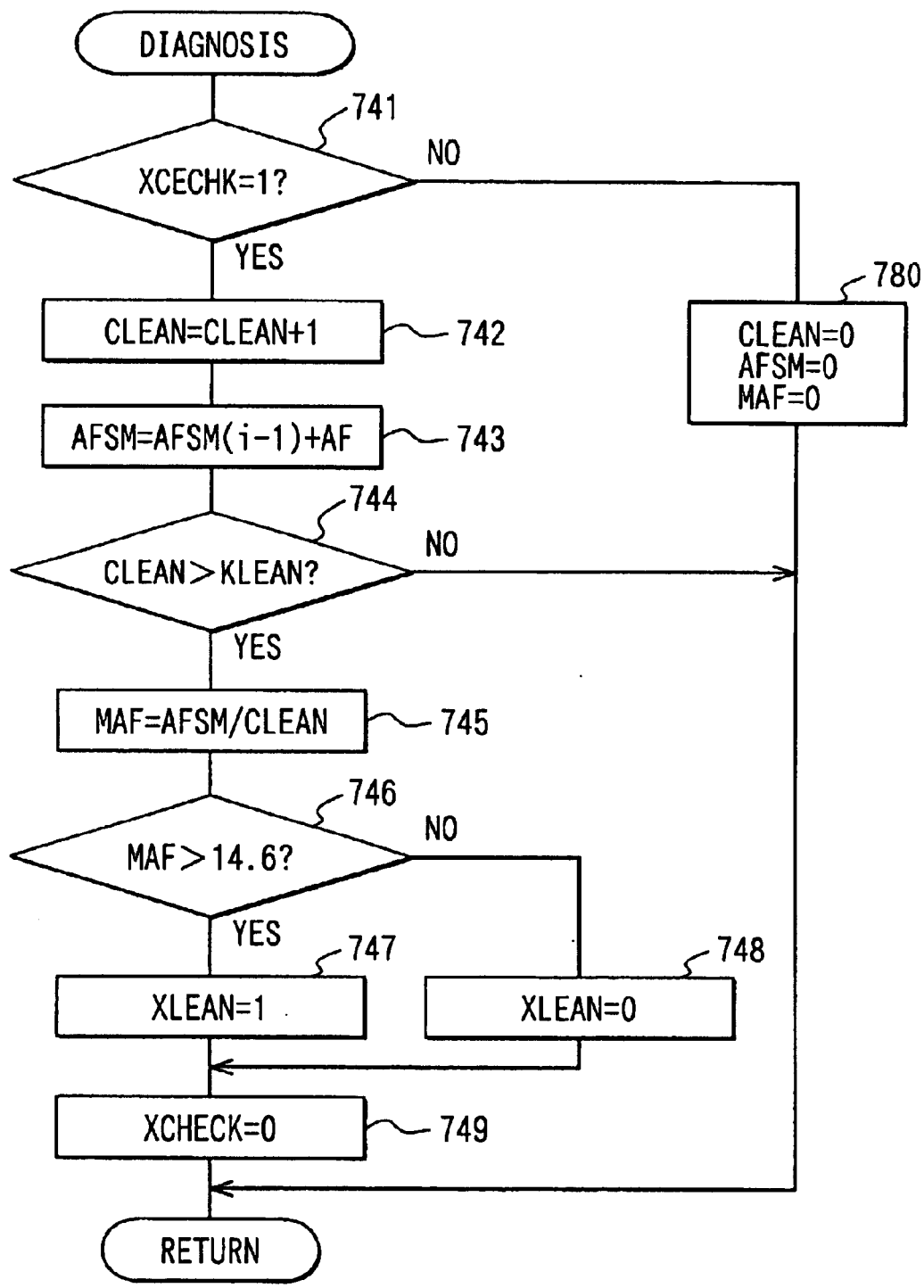
FIG. 37 shows a flowchart representing control executed by the emission control system implemented by the seventh embodiment of the present invention.

A pre-diagnosis processing routine represented by the flowchart shown in FIG. 37 is executed at predetermined intervals to determine whether or not an average air-fuel ratio MAF is on the lean side relative to the stoichiometric value as follows. The flowchart begins with a step 741 to determine whether or not the abnormality indication flag XCHECK has been set at 1. If the flag XCHECK has been set at 1, the flow of the routine goes on to a step 742 at which the count value of a counter CLEAN is incremented by 1. Then, at the next step 743, a current air-fuel ratio AF is added to an air-fuel ratio cumulative value AFSM (i−1) to update a stored air-fuel ratio cumulative value AFSM.

Subsequently, the flow of the routine goes on to a step 744 to determine whether the count value of the counter CLEAN is greater or smaller than a predetermined value KLEAN. If the count value of the counter CLEAN is found equal to or smaller than the predetermined value KLEAN, the execution of this routine is ended without carrying out any processing. Thus, for the abnormality indication flag XCHECK=1, the processing to compute an air-fuel ratio cumulative value AFSM is continued till the count value of the counter CLEAN exceeds the predetermined value KLEAN.

At a point of time the count value of the counter CLEAN exceeds the predetermined value KLEAN, the flow of the routine goes on to a step 745. At the step 745, the air-fuel ratio cumulative value AFSM is divided by the count value of the counter CLEAN to find an average air-fuel ratio MAF as follows:

$$MAF = AFSM/CLEAN$$

Subsequently, the flow of the routine goes on to a step 746 to determine whether or not the average air-fuel ratio MAF is on the lean side relative to the stoichiometric value of 14.6. If the average air-fuel ratio MAF is on the lean side relative to the stoichiometric value, the flow of the routine goes on to a step 747 at which a flag XLEAN is set at 1. Then, at the next step 749, the flag XCHECK is reset to 0 before the execution of this routine is ended.

If the determination result obtained at the step 746 is NO, on the other hand, the flow of the routine goes on to a step 748. At the step 748, the flag XLEAN is reset to 0. Then, at the next step 749, the flag XCHECK is also reset to 0 before the execution of this routine is ended.

After the flag XCHECK is reset to 0 at the step 749, the determination result obtained at the step 741 in the next execution of this routine is NO, causing the flow of the routine to go on to a step 780. At the step 780, the air-fuel ratio cumulative value AFSM, the count value of the counter CLEAN and the average air-fuel ratio MAF are all reset to 0 before the execution of this routine is ended.

It is to be noted that, even while secondary air is being introduced, in the air-fuel ratio feedback control system, instead of finding an average air-fuel ratio MAF, an average feedback correction quantity or a parameter having a correlation with the air-fuel ratio (that is, a signal output by the air-fuel ratio sensor 26) can also be computed for use in the determination of whether or not the computed average feedback correction quantity or the computed parameter is on the lean side relative to a value corresponding to the stoichiometric air-fuel ratio.

Figure 38:
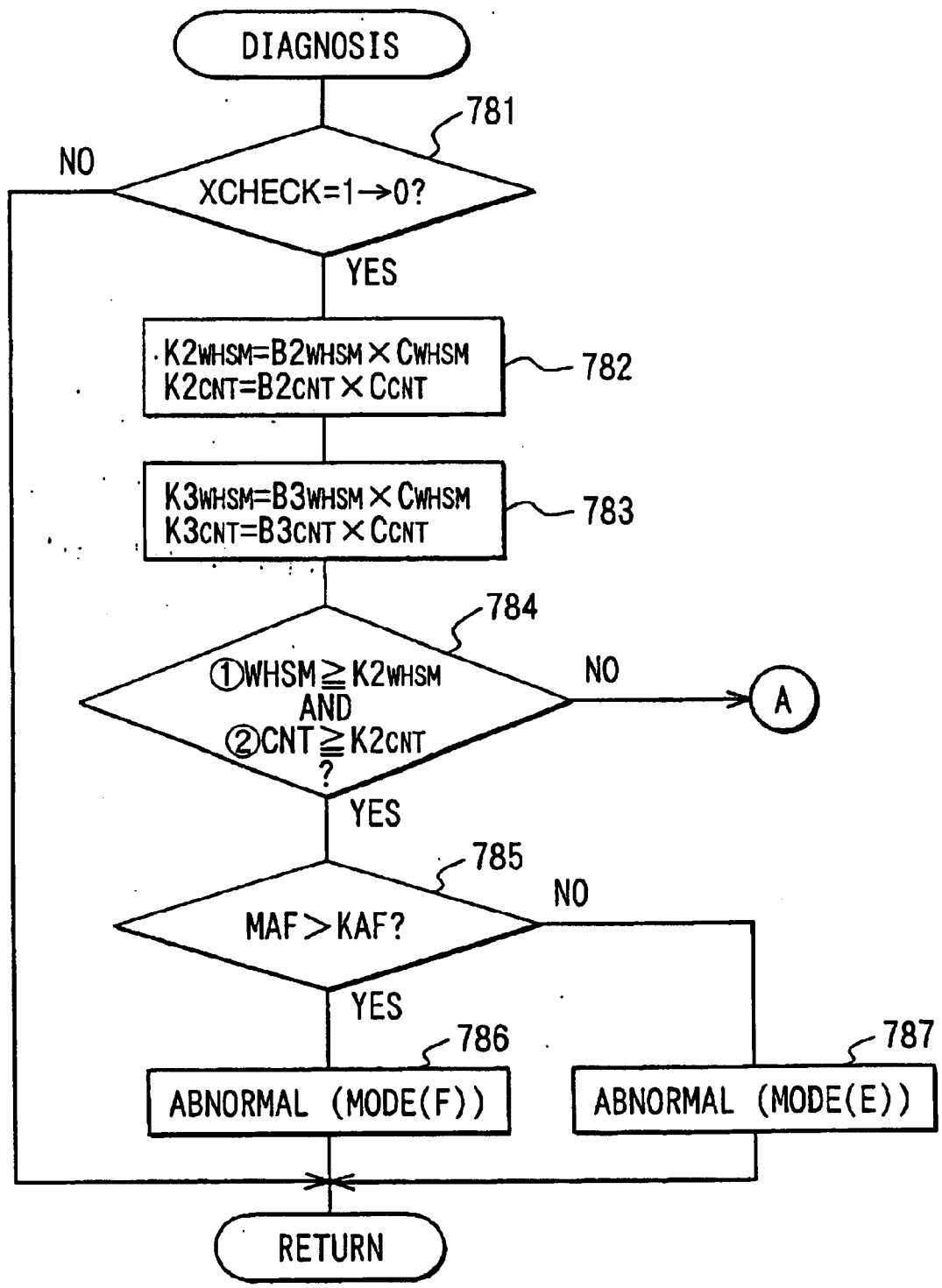
FIG. 38 shows a flowchart representing control executed by the emission control system implemented by the seventh embodiment of the present invention.
Figure 39:
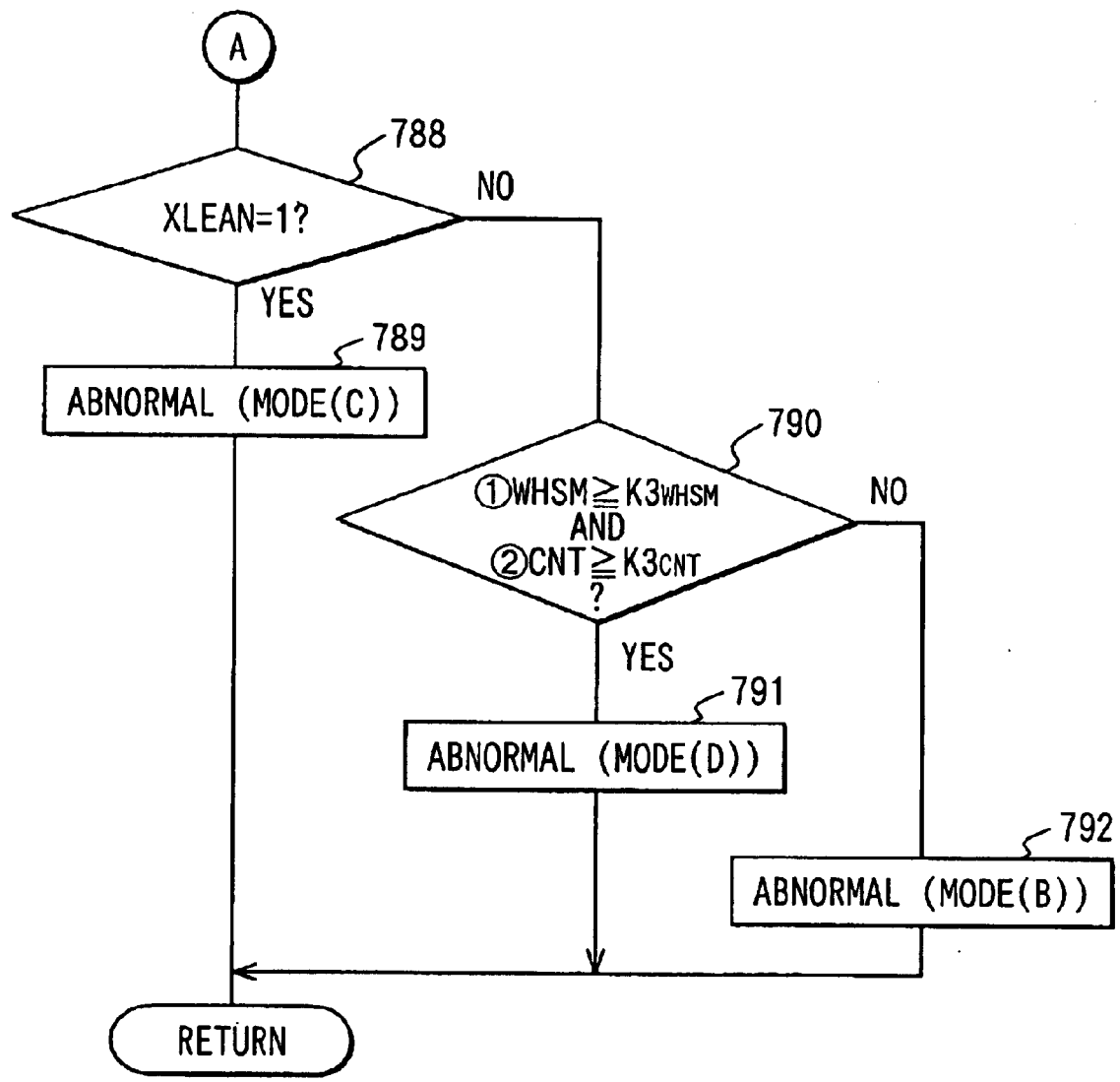
FIG. 39 shows a flowchart representing control executed by the emission control system implemented by the seventh embodiment of the present invention.

An abnormality-mode identification routine represented by the flowchart shown in FIGS. 38 and 39 is executed at predetermined intervals to recognize modes (B) to (F). The flowchart shown in FIG. 38 begins with a step 781 to determine whether or not the flag XCHECK has been reset from 1 to 0. At a step 782, second criterion values $K2_{WHSM}$ and $K2_{CNT}$ are found in accordance with the following equations:

$$K2_{WHSM} = B2_{WHSM} \times C_{WHSM}$$

$$K2_{CNT} = B2_{CNT} \times C_{CNT}$$

In the above equations, the second criterion values $K2_{WHSM}$ and $K2_{CNT}$ are provided for mode E in which the exhaust gas temperature control system is not functioning normally but the secondary air control system is functioning normally. Notations $B2_{WHSM}$ and $B2_{CNT}$ denote second base values. The second base values $B2_{WHSM}$ and $B2_{CNT}$ are respectively the second criterion values $K2_{WHSM}$ and $K2_{CNT}$ that are set for an engine operating state taken as a reference state in advance. On the other hand, notations $C_{WHSM}$ and $C_{CNT}$ used in the above equations denote correction values used for correcting the second base values $B2_{WHSM}$ and $B2_{CNT}$ respectively. The magnitudes of the correction values $C_{WHSM}$ and $C_{CNT}$ depend on the actual operating state of the engine 11.

Then, at the next step 783, third criterion values $K3_{WHSM}$ and $K3_{CNT}$ are found in accordance with the following equations:

$$K3_{WHSM}=B3_{WHSM} \times C_{WHSM}$$
$$K3_{CNT}=B3_{CNT} \times C_{CNT}$$

In the above equations, the third criterion values $K3_{WHSM}$ and $K3_{CNT}$ are provided for mode D in which the exhaust gas temperature control system is not functioning normally and the secondary air control system is also not functioning normally either, particularly resulting in a lack of introduced secondary air. Notations $B3_{WHSM}$ and $B3_{CNT}$ denote third base values. The third base values $B3_{WHSM}$ and $B3_{CNT}$ are respectively the third criterion values $K3_{WHSM}$ and $K3_{CNT}$ that are set for an engine operating state taken as a reference state in advance. On the other hand, notations $C_{WHSM}$ and $C_{CNT}$ used in the above equations denote correction values used for correcting the third base values $B3_{WHSM}$ and $B3_{CNT}$ respectively. The magnitudes of the correction values $C_{WHSM}$ and $C_{CNT}$ depend on the actual operating state of the engine 11.

Then, the flow of the routine goes on to a step 784 to determine whether or not following conditions (1) and (2) are satisfied:

(1): A heater power cumulative value WHSM cumulated since the start of the engine 11 till an activated state of the air-fuel ratio sensor 26 is at least equal to the second criterion value $K2_{WHSM}$ (WHSM$\geq K2_{WHSM}$)

(2): A lapsing time CNT lapsing since the start of the engine 11 till the activated state of the air-fuel ratio sensor 26 is at least equal to the second criterion value $K2_{CNT}$ (CNT$\geq K2_{CNT}$).

If conditions (1) and (2) are both satisfied, the emission control system is determined to be operating in mode (E) or (F) in which the activation of the air-fuel ratio sensor 26 and, hence, an operation to warm up the catalyst 25 are latest. In this case, the flow of the routine goes on to a step 785 to determine whether or not the average air-fuel ratio MAF is on the lean side relative to a predetermined value of typically 17.

If the average air-fuel ratio MAF is on the lean side relative to the predetermined value of typically 17, the flow of the routine goes on to a step 786 at which the emission control system is determined to be operating in mode (F) before the execution of this routine is ended.

If the determination result obtained at the step 785 is NO, on the other hand, the flow of the routine goes on to a step 787 at which the emission control system is determined to be operating in mode (E) before the execution of this routine is ended.

If the determination result obtained at the step 784 is NO, on the other hand, the emission control system is determined to be operating in mode (B), (C) or (D). In this case, the flow of the routine goes on to a step 788 of the flowchart shown in FIG. 39 to determine whether or not the flag XLEAN has been set at 1.

If the flag XLEAN has been set at 1, the flow of the routine goes on to a step 789 at which the emission control system is determined to be operating in mode (C) before the execution of this routine is ended.

If the flag XLEAN has been reset to 0, on the other hand, the emission control system is determined to be operating in mode (B) or (D). In this case, the flow of the routine goes on to a step 790 to determine whether or not following conditions (1) and (2) are satisfied:

(1): A heater power cumulative value WHSM cumulated since the start of the engine 11 till an activated state of the air-fuel ratio sensor 26 is at least equal to the third criterion value $K3_{WHSM}$ (WHSM$\geq K3_{WHSM}$)

(2): A lapsing time CNT lapsing since the start of the engine 11 till the activated state of the air-fuel ratio sensor 26 is at least equal to the third criterion value $K3_{CNT}$ (CNT$\geq K3_{CNT}$).

If conditions (1) and (2) are both satisfied, the flow of the routine goes on to a step 791 at which the emission control system is determined to be operating in mode (D) before the execution of this routine is ended.

If the determination result obtained at the step 790 is NO, on the other hand, the flow of the routine goes on to a step 792 at which the emission control system is determined to be operating in mode (B) before the execution of this routine is ended.

The ECU 30 stores the mode determined in the processing described above in a memory. The stored mode is reported to the operator or a service person in response to a predetermined operation.

It is to be noted that in order to simplify the determination processing carried out at the step 736 of the flowchart shown in FIG. 36, the determination processing carried out at the step 784 of the flowchart shown in FIG. 38 and the determination processing carried out at the step 790 of the flowchart shown in FIG. 39, one of 2 conditions (1) and (2) can be eliminated. That is, in the predetermination processing, only one of the 2 conditions is examined.

In accordance with the embodiment described above, it is thus possible to determine whether an abnormality of the emission control system is caused by an abnormality of the exhaust gas temperature control system or an abnormality of the secondary air control system with a high degree of precision so that work as repair in the event of an abnormality or replacement of a part can be done with ease. In addition, by using a signal output by the air-fuel ratio sensor 26, it is also possible to determine whether an abnormality existing in the secondary air control system is caused by an insufficient flow rate of introduced secondary air or an excessive flow rate of introduced secondary air.

Figure 40:
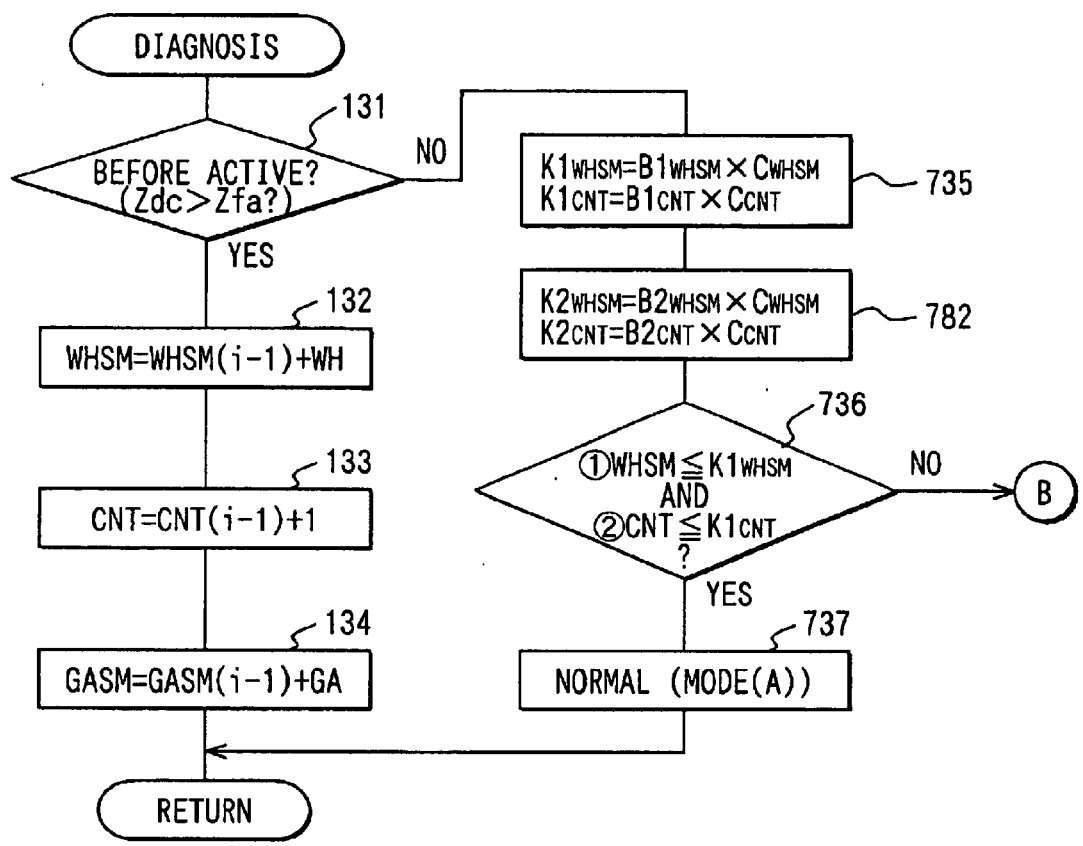
FIG. 40 shows a flowchart representing control executed by a modified version of the emission control system implemented by the seventh embodiment of the present invention.
Figure 41:
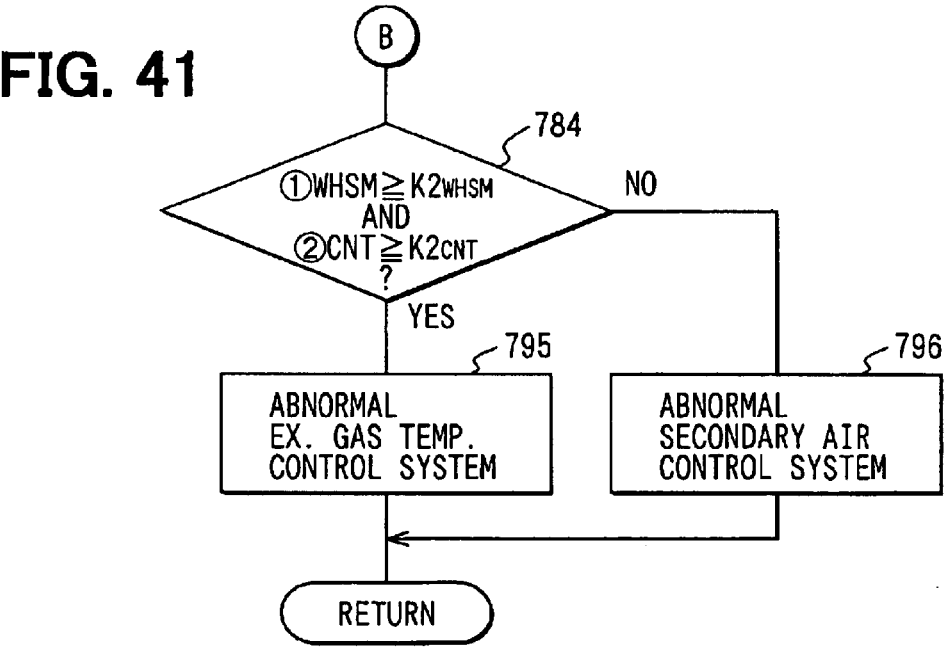
FIG. 41 shows a flowchart representing control executed by the modified version of the emission control system implemented by the seventh embodiment of the present invention.

FIGS. 40 and 41 show a flowchart representing operations carried out by a modified version of the seventh embodiment. This modified version of the seventh embodiment is capable of distinguishing 3 states from each other. The 3 states are a normal state of the emission control system, an abnormal state of the exhaust gas temperature control system and an abnormal state of the secondary air control system. Steps 131, 132, 133, 134, 735, 782, 736, 737 and 784 are the same as their respective counterparts of the embodiments explained previously. In this embodiment, at the step 784, an abnormality is diagnosed as an abnormal state of the exhaust gas temperature control system or an abnormal state of the secondary air control system. At a step 795, the ECU 30 stores an abnormality of the exhaust gas temperature control system in a memory. At a step 796, on the other hand, the ECU 30 stores an abnormality of the secondary air control system in the memory. This abnormality can be an abnormality of mode B or D.

Thus, this modified version of the seventh embodiment is capable of determining a cause of an abnormality detected in control to speed an operation to warm up the catalyst 25 in the event of such an abnormality.

In the seventh embodiment, the air pump 63 is driven by varying a duty ratio of a voltage applied thereto so as to change the flow rate of introduced secondary air. However, this present invention can also be applied to a control system employing a simple secondary air control device such as an on-off-type air pump 63 used originally for keeping the flow rate of introduced secondary air constant.

Eighth Embodiment

Next, an eighth embodiment of the present invention is explained. The configuration elements of the eighth embodiment identical with their respective counterparts employed in the preceding embodiments are denoted by the same reference numerals as the counterparts, and the explanation of the identical elements is not given.

Figure 42:
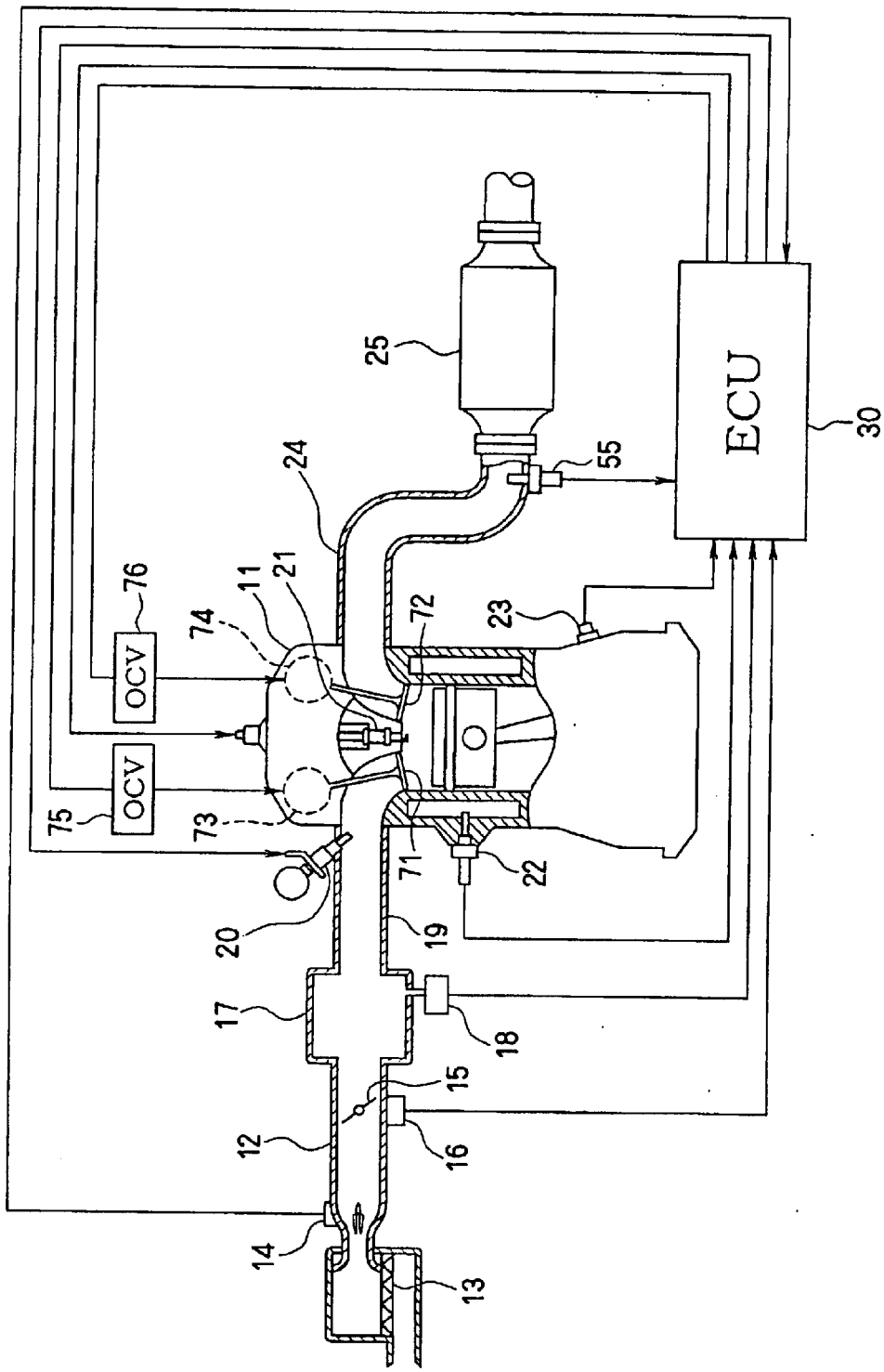
FIG. 42 is a diagram showing the configuration of an emission control system implemented by an eighth embodiment of the present invention.

FIG. 42 is a diagram showing the configuration of an emission control system implemented by the eighth embodiment. The eighth embodiment is obtained by adding a valve-timing control device to the configuration of the first embodiment. The engine 11 has an intake valve 71 and an exhaust valve 72. A variable cam timing actuator 73 is provided on a camshaft for driving the intake valve 71. On the other hand, a variable cam timing actuator 74 is provided on a camshaft for driving the exhaust valve 72. Oil is supplied to the variable cam timing actuators 73 and 74 through oil control valves 75 and 76 respectively. The oil control valves 75 and 76 are controlled by the ECU 30. As a result, the ECU 30 is capable of adjusting the valve timing. As the valve timing control device, an electromagnetic valve driving device can also be employed. For example, an electromagnetic actuator can be used for directly driving the intake valve 71.

The emission control system implemented by the eighth embodiment has a sensor 55 for detecting a temperature of exhaust gas. The sensor 55 is provided on the upstream side of the catalyst 25 to serve as a means for detecting a warmed-up state of the catalyst 25.

Figure 43:
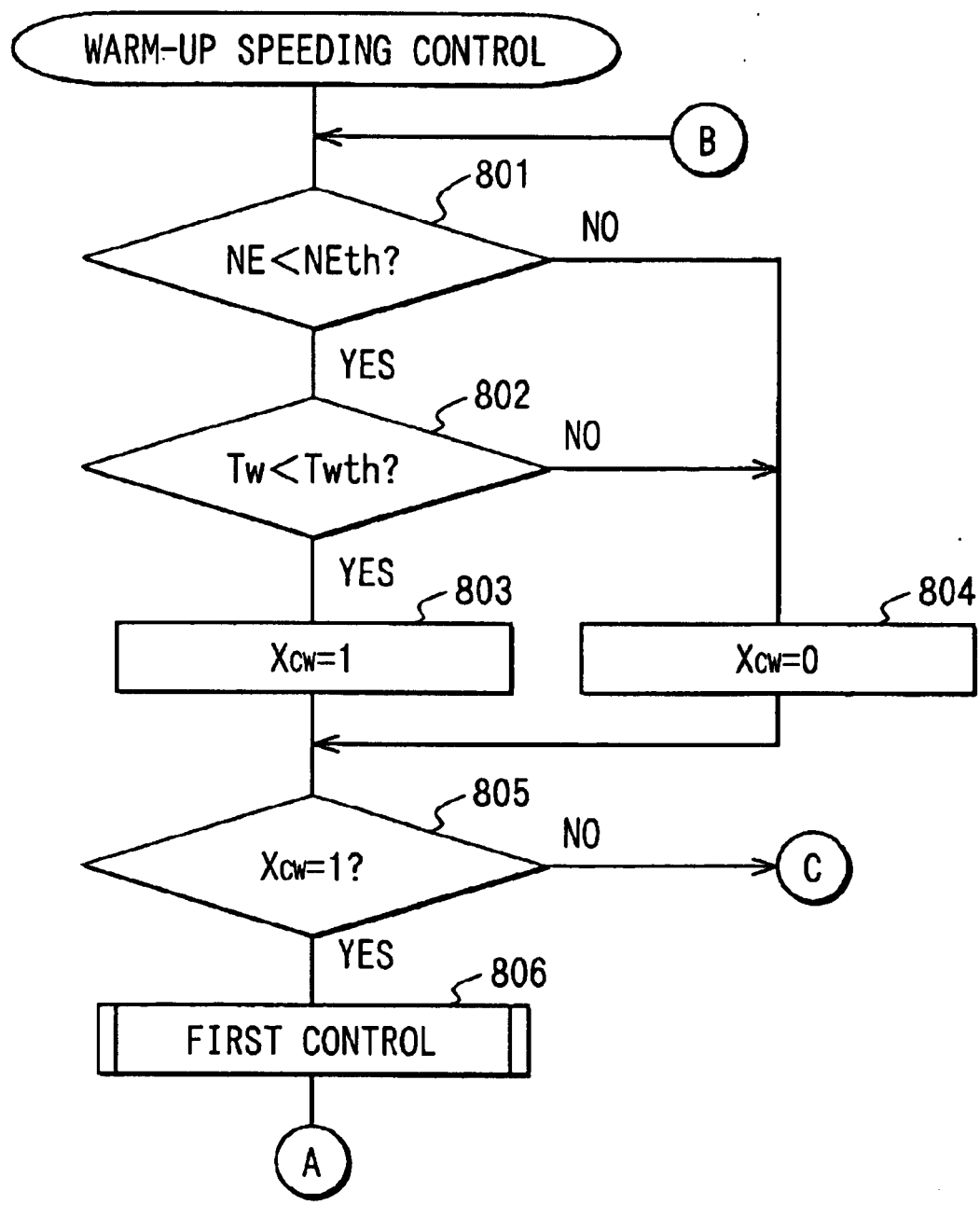
FIG. 43 shows a flowchart representing control executed by the emission control system implemented by the eighth embodiment of the present invention.
Figure 44:
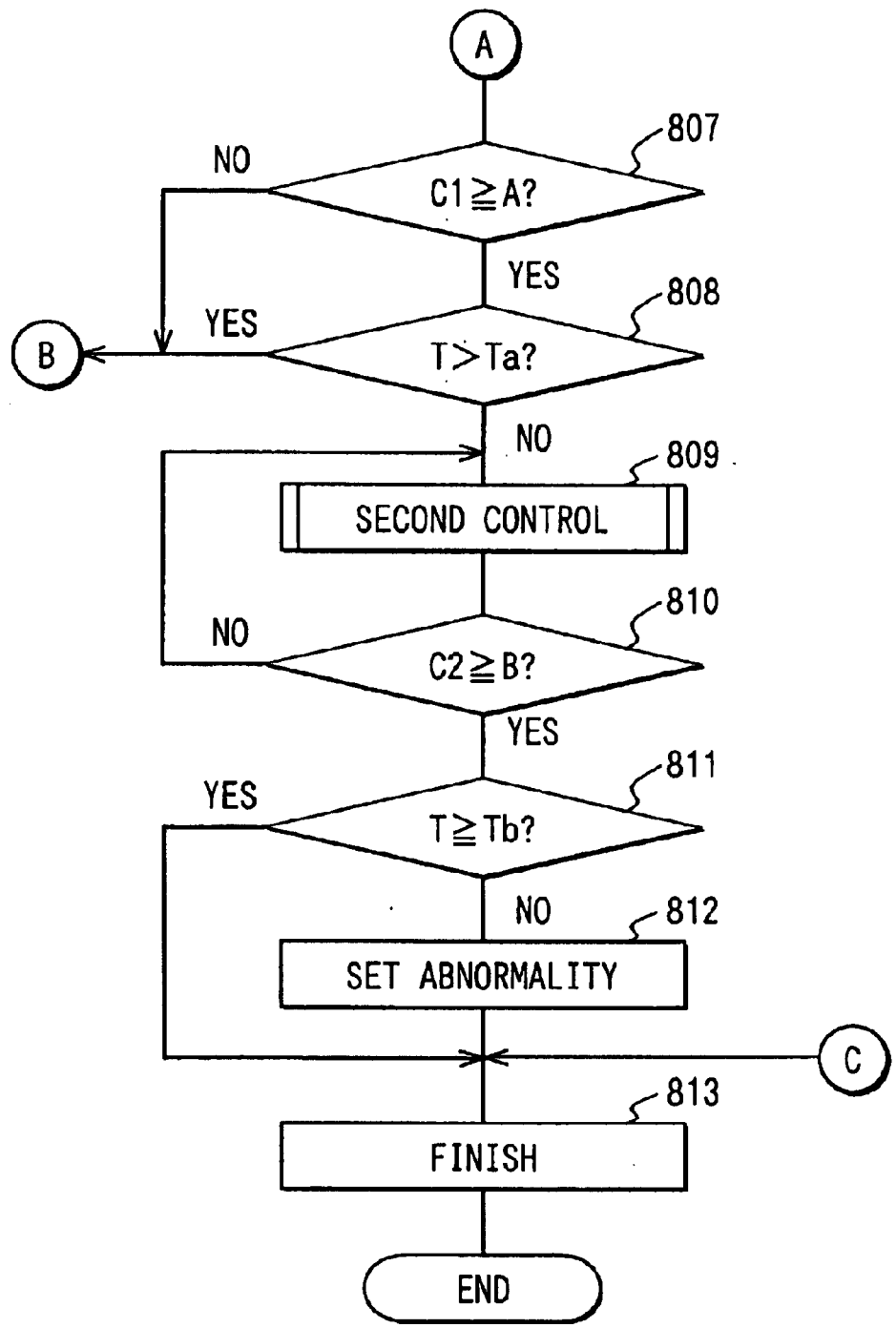
FIG. 44 shows a flowchart representing control executed by the emission control system implemented by the eighth embodiment of the present invention.

The ECU 30 executes a program for implementing the control to speed an operation to warm up the catalyst 25 at a start of the engine 11 in accordance with a flowchart shown in FIGS. 43 and 44. First of all, the ECU 30 executes normal control to speed an operation to warm up the catalyst 25 in an idle operation after a start of the engine 11. The normal control to speed an operation to warm up the catalyst 25 is referred to as first control. The normal control to speed an operation to warm up the catalyst 25 adjusts all control parameters of idle-up control, ignition-timing-delaying control, air-fuel ratio lean control, valve-overlap-increasing control, intake-valve-lift-increasing control and cylinder-gas-flow-rate-up control (or at least one of the control parameters) to their respective target values (or its target value) used in the control to speed an operation to warm up the catalyst 25 in order to increase the amount of heat dissipated by exhaust gas in an attempt to speed the operation to warm up the catalyst 25 or the activation of the catalyst 25. If the exhaust gas temperature T detected by the sensor 55 has not reached a predetermined temperature Ta used as a target set at the current point of time during the normal control to speed an operation to warm up the catalyst 25 even after a predetermined period of time has lapsed since the start of the normal control to speed an operation to warm up the catalyst 25, the embodiment executes enforced control to speed an operation to warm up the catalyst 25. The exhaust gas temperature T detected by the sensor 55 can be regarded as a quantity representing an actual warmed-up state of the catalyst 25 while the predetermined temperature Ta is a target warmed-up state of the catalyst 25. The enforced control to speed an operation to warm up the catalyst 25 is referred to as second control.

The second control adjusts all the control parameters of the idle-up control, the ignition timing delaying control, the air-fuel ratio lean control, the valve overlap increasing control, the intake valve lift increasing control and the cylinder gas flow rate up control or at least one of the control parameters in order to further increase the amount of heat dissipated by exhaust gas to target values even greater than their respective target values set for the normal control to speed an operation to warm up the catalyst 25 in an attempt to enhance the effectiveness of the control to speed the operation to warm up the catalyst 25. If no predetermined effect of the control with the enhanced effectiveness of speeding the operation to warm up the catalyst 25 or the activation of the catalyst 25 is obtained as expected in the course or at the end of the second control even after another predetermined period of time has lapsed since the start of the second control to speed the operation to warm up the catalyst 25, an abnormality is determined to exist in the emission control system.

Figure 45:
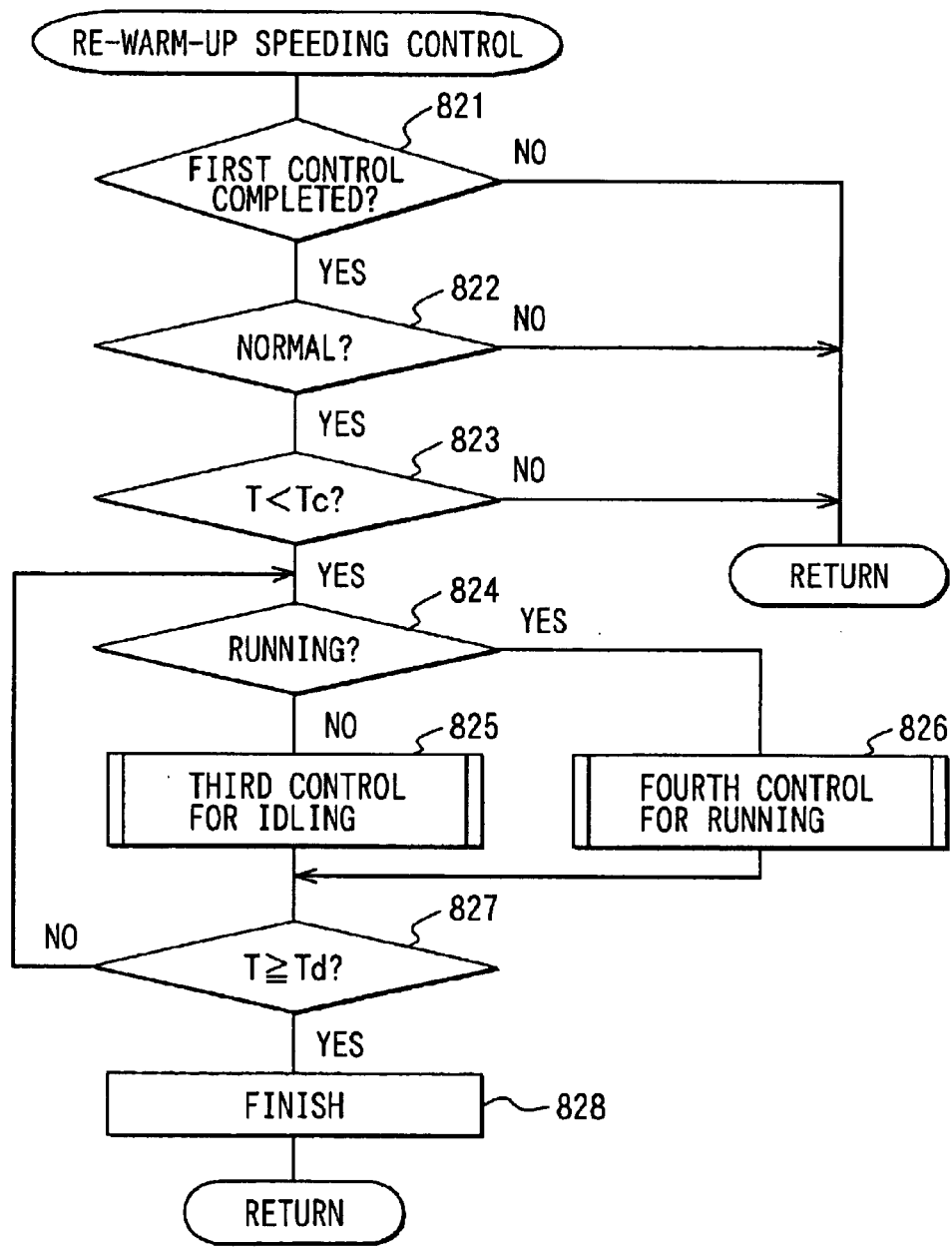
FIG. 45 shows a flowchart representing control executed by the emission control system implemented by the eighth embodiment of the present invention.

In addition, the ECU 30 also executes a program for implementing the control to speed an operation to warm up the catalyst 25 during an operation of the engine 11 in accordance with a flowchart shown in FIG. 45. That is, if the exhaust gas temperature T detected by the sensor 55 becomes lower than a minimum temperature Tc, at which the warmed-up state of the catalyst 25 can be maintained, in an operation of the engine 11 even after the control executed at a start of the engine 11 to speed an operation to warm up the catalyst 25 has been completed, the control to speed an operation to warm up the catalyst 25 can be executed during the operation of the engine 11. Specifically, if the operation of the engine 11 is an operation in an idle state, third control for the idle state is executed. If the operation of the engine 11 is an operation in a running state, on the other hand, fourth control for the running state is executed. As described above, the exhaust gas temperature T detected by the sensor 55 can be regarded as a quantity representing an actual warmed-up state of the catalyst 25 while the predetermined temperature Tc is a target warmed-up state of the catalyst 25.

The third control adjusts all the control parameters of the idle-up control, the ignition timing delaying control, the air-fuel ratio lean control, the valve overlap increasing control, the intake valve lift increasing control and the cylinder gas flow rate up control or at least one of the control parameters in order to further increase the amount of heat dissipated by exhaust gas to control values greater than their respective control values set for the normal idle state in an attempt to speed an operation to warm up the catalyst 25.

On the other hand, the fourth control adjusts at least one of the control parameters of the ignition timing delaying control, the valve overlap increasing control and the cylinder gas flow rate up control except control parameters each having a relatively big effect on the running performance of the vehicle in order to further increase the amount of heat dissipated by exhaust gas to control values greater than the present control values in an attempt to speed an operation to warm up the catalyst 25.

The following description explains effects of an operation to warm up the catalyst 25 in the idle-up control, the ignition timing delaying control, the air-fuel ratio lean control, the valve overlap increasing control, the intake valve lift increasing control and the cylinder gas flow rate up control.

In the idle-up control, a target idle revolution speed is increased and a throttle opening is made larger in accordance with the increase in target idle revolution speed. Thus, the intake air volume in an idle state rises, causing the exhaust airflow rate to also increase as well. As a result, since the amount of heat dissipated by exhaust gas (=the flow rate of the exhaust gas×the temperature of the exhaust gas) also rises accordingly, causing the amount of heat supplied to the catalyst 25 to also increase as well, it is possible to speed an operation to warm up the catalyst 25. It is to be noted that, in the case of a control system equipped with an idle speed control valve, the opening of the idle speed control valve can be raised instead of increasing the throttle opening.

In addition, the ignition timing delaying control is executed to delay the ignition timing of the ignition plug 21 in an attempt to delay the ignition timing of gas inside the cylinder so that exhaust gas having a high temperature can be discharged to the exhaust pipe 24 in order to speed an operation to warm up the catalyst 25.

The air-fuel ratio lean control is executed to reduce the fuel injection volume in order to shift the air-fuel ratio to the lean side relative to the stoichiometric air-fuel ratio. If the air-fuel ratio is shifted to the lean side relative the stoichiometric air-fuel ratio, the temperature of exhaust gas increases, making it possible to speed an operation to warm up the catalyst 25.

The valve overlap increasing control is executed to advance the valve timing of the intake valve 71 but to delay the valve timing of the exhaust valve 72 in order to increase the magnitude of a valve overlap. Thus, an internal EGR (Exhaust Gas Rate) rises, lowering the combustion speed of gas inside the cylinder so that a peak timing of the temperature of gas inside the cylinder can be delayed. As a result, exhaust gas having a high temperature can be discharged to the exhaust pipe 24 in order to speed an operation to warm up the catalyst 25. It is to be noted that the magnitude of a valve overlap can also be raised by executing valve timing delaying control on the intake valve 71 only. As an alternative, the magnitude of a valve overlap can also be raised by executing valve timing delaying control on the exhaust valve 72 only.

In addition, in the case of a control system equipped with a valve lift varying mechanism for varying a lift quantity of the intake valve 71, the intake valve lift raising control is executed to increase the lift quantity of the intake valve 71. If the lift quantity of the intake valve 71 is raised, the intake air volume rises, causing the exhaust airflow rate to also increase as well. As a result, since the amount of heat dissipated by exhaust gas (=the flow rate of the exhaust gas×the temperature of the exhaust gas) also rises accordingly, causing the amount of heat supplied to the catalyst 25 to also increase as well, it is possible to speed an operation to warm up the catalyst 25.

Furthermore, in the case of a control system equipped with a swirl-flow control valve for controlling a swirl flow or a tumble-flow control valve for controlling a tumble flow, the cylinder gas flow rate up control is executed to change the opening of the swirl-flow control valve or the tumble-flow control valve in a direction to close the valve in order to raise the flow rate of gas inside the cylinder. Thus, a flame generation state in the cylinder is improved, making it possible to increase the combustion temperature of gas inside the cylinder. As a result, exhaust gas having a high temperature can be discharged to the exhaust pipe 24 to speed an operation to warm up the catalyst 25.

[Control to Speed an Operation to Warm up the Catalyst at a Start of the Engine]

FIGS. 43 and 44 show a flowchart representing a program implementing control to speed an operation to warm up the catalyst 25 at a start of the engine 11. The program implementing the control to speed an operation to warm up the catalyst 25 at a start of the engine 11 is executed after an ignition switch shown in none of the figures is turned on. When the program is invoked, the flowchart begins with steps 801 and 802 to determine whether or not conditions for execution of the control to speed an operation to warm up the catalyst 25 at a start of the engine 11 are satisfied. In this case, the conditions for execution of the control to speed an operation to warm up the catalyst 25 at a start of the engine 11 are satisfied only if both following conditions (1) and (2) are satisfied.

1: The revolution speed NE of the engine 11 shall be lower than a predetermined engine revolution speed NEth.

That is, the engine 11 shall be in an idle-operation state. This condition is examined at the step 801.

2: A cooling-water temperature Tw detected by the cooling-water-temperature sensor 22 shall be lower than a predetermined temperature Twth at which the operation to warm up the catalyst 25 can be considered to have been completed. That is, the catalyst 25 shall be in a pre-warm-up state. This condition is examined at the step 802.

Only if both conditions (1) and (2) are satisfied, are the conditions for execution of the control to speed an operation to warm up the catalyst 25 at a start of the engine 11 considered to hold true. In this case, the flow of the routine goes on to a step 803 at which a flag Xcw is set at 1. If any of both conditions (1) and (2) is not satisfied, on the other hand, the conditions for execution of the control to speed an operation to warm up the catalyst 25 at a start of the engine 11 are not considered to hold true. In this case, the flow of the routine goes on to a step 804 at which the flag Xcw is reset to 0.

Then, the flow of the routine goes on to a step 805 to determine whether or not the flag Xcw has been set at 1. If Xcw=1, the flow of the routine goes on to a step 806 at which the first control is executed. In this case, a control parameter used in the control to speed an operation to warm up the catalyst 25 is selected among a plurality of control parameters in accordance with the operating state of the engine 11. As the first control, typically, the following control is executed.

In the idle-up control, the target idle revolution speed is set at a target idle revolution speed NEcw for the control to speed an operation to warm up the catalyst 25 at a start of the engine 11. This target idle revolution speed NEcw for the control to speed an operation to warm up the catalyst 25 at a start of the engine 11 is set at a value higher than a target idle revolution speed NEid for an idle state after the operation to warm up the catalyst 25 by a predetermined value $\Delta NE1$ (that is, NEcw=NEid+$\Delta NE1$). Control is executed to increase a throttle opening (or an opening of an idle-speed control valve) so that the idle revolution speed becomes equal to this target idle revolution speed NEcw set for the control to speed an operation to warm up the catalyst 25 at a start of the engine 11.

The ignition timing delaying control is executed to delay an ignition timing of the ignition plug 21 to a target ignition timing IGcw set for the control to speed an operation to warm up the catalyst 25 at a start of the engine 11. This target ignition timing IGcw is set on the delayed side relative to a target ignition timing IGid for an idle state after the operation to warm up the catalyst 25 by a predetermined value $\Delta IG1$ (that is, IGcw=IGid−$\Delta IG1$). It is to be noted that, in execution of the control to delay an ignition timing, the ignition timing needs to be delayed gradually to the target ignition timing IGcw set for the control to speed an operation to warm up the catalyst 25 at a start of the engine 11 with an actual ignition timing being monitored in order to prevent the combustibility from worsening. It is also possible to change a delay speed of the ignition timing while monitoring the revolution speed of the engine 11. If the delay speed of the ignition timing is too high, causing the revolution speed of the engine 11 to inevitably decrease, the delay speed of the ignition timing needs to be reduced.

The air-fuel ratio lean control is executed to reduce a fuel injection volume by a predetermined value $\Delta TAU1$ so as to set the air-fuel ratio at a target air-fuel ratio AFcw for the control to speed an operation to warm up the catalyst 25 at a start of the engine 11. This target air-fuel ratio AFcw is set at a value on the lean side relative to the stoichiometric air-fuel ratio. It is to be noted that feedback control can also be executed on the fuel injection ratio so as to take the air-fuel ratio to the target air-fuel ratio AFcw after activation of the air-fuel ratio sensor 26 for detecting an air-fuel ratio of exhaust gas. In addition, in the case of a control system equipped with an oxygen sensor for determining whether the air-fuel ratio of exhaust gas is on the lean or rich side relative to the stoichiometric value, parameters such as a comparison voltage and a delay time may be changed so that the center of the feedback control is positioned on the lean side relative to the stoichiometric air-fuel ratio.

The valve-overlap-increasing control is executed to advance an opening-valve timing of the intake valve 71 to a target intake-valve opening position VTIcw set for the control to speed an operation to warm up the catalyst 25 at a start of the engine 11, but to delay a closing-valve timing of the exhaust valve 72 to a target intake-valve closing position VTEcw set for the control to speed an operation to warm up the catalyst 25 at a start of the engine 11 in order to increase the magnitude of a valve overlap. This target intake-valve opening position VTIcw is set at a value on the advanced side relative to a target intake-valve opening position VTIid for an idle state after an operation to warm up the catalyst 25 by a predetermined value ΔVTI1 (that is, VTIcw=VTIid+ΔVTI1). Similarly, the target intake-valve closing position VTEcw is set at a value on the delayed side relative to a target intake-valve closing position VTEid for an idle state after an operation to warm up the catalyst 25 by a predetermined value ΔVTE1 (that is, VTECw=VTEid−ΔVTE1).

The intake-valve-lift-raising control is executed to increase a lift quantity of the intake valve 71 to a target intake-valve lift VLIcw set for the control to speed an operation to warm up the catalyst 25 at a start of the engine 11. This target intake-valve lift VLIcw is set at a value greater than a target intake-valve lift VTIid for an idle state after an operation to warm up the catalyst 25 by a predetermined value ΔVLI1 (that is, VLIcw=VLIid+ΔVLI1).

The cylinder gas flow rate up control is executed to change an opening of a swirl-flow control valve in the valve-closing direction to a target swirl flow rate control valve opening SWcw set for the control to speed an operation to warm up the catalyst 25 at a start of the engine 11 in order to raise the flow rate of gas inside the cylinder. This target swirl flow rate control valve opening SWcw is set a value on the valve-closing side relative to a target swirl flow rate control valve opening Swid for an idle state after an operation to warm up the catalyst 25 by a predetermined value ΔSW1 (that is, SWcw=SWid−ΔSW1). As an alternative, the cylinder gas flow rate up control is executed to change an opening of a tumble flow control valve in the valve-closing direction to a target tumble flow rate control valve opening TBcw set for the control to speed an operation to warm up the catalyst 25 at a start of the engine 11 in order to raise the flow rate of gas inside the cylinder. This target tumble flow rate control valve opening TBcw is set a value on the valve-closing side relative to a target tumble flow rate control valve opening TBid for an idle state after an operation to warm up the catalyst 25 by a predetermined value ΔTB1 (that is, TBcw=TBid−ΔTBL).

During the first control, the flow of the routine goes on to a step 807 of the flowchart shown in FIG. 44 to determine whether or not the count value of a counter C1 has reached or exceeded a predetermined value A. The counter C1 is used for measuring the length of time lapsing since the start of the normal control to speed an operation to warm up the catalyst 25. If the count value of the counter C1 has not reached the predetermined value A, the flow of the routine goes back to the step 801.

Thereafter, at a point of time the count value of a counter C1 has reached or exceeded the predetermined value A, the flow of the routine goes on from the step 807 to a step 808. At the step 808, exhaust gas temperature T detected by the sensor 55 is examined to determine whether or not the temperature T has exceeded a predetermined temperature Ta used as a target at the present point of time in order to determine whether or not an operation to warm up the catalyst 25 is progressing smoothly. The temperature T can be regarded as the temperature of the catalyst 25.

If the temperature T has exceeded the predetermined temperature Ta, the operation to warm up the catalyst 25 is determined to be progressing smoothly. In this case, the flow of the routine goes back to the step 801.

If the determination result obtained at the step 801 or 802 is NO during the first control, the flow of the routine goes on to a step 804 at which the flag Xcw is reset to 0. With the flag Xcw reset to 0, a determination result of NO is also obtained at the step 805, causing the flow of the routine to go on a step 813 of the flowchart shown in FIG. 44. At the step 813, processing to end the control to speed an operation to warm up the catalyst 25 is carried out. Then, the execution of this routine is ended after the control parameters used in the control to speed an operation to warm up the catalyst 25 are restored to their respective normal control values.

If the determination result obtained at the step 808 indicates that the temperature T has not exceeded the predetermined temperature Ta, on the other hand, the state of progress of an operation to warm up the catalyst 25 is determined to be late due to effects including the effect of the temperature of the atmosphere. In this case, the flow of the routine goes back to the step 809 at which the second control is executed. Control parameters to be used in the second control may be selected by taking factors such as an operating state of the engine 11 into consideration. As the second control, typically, the following control is executed.

In the idle-up control, the target idle revolution speed is set at a value even higher than the target idle revolution speed NEcw by a predetermined value ΔNE2 to increase a throttle opening.

The ignition timing delaying control is executed to delay an ignition timing to a value further delayed from the target ignition timing IGcw by a predetermined value ΔIG2.

The air-fuel ratio lean control is executed to reduce a fuel injection volume to a value even smaller than the target air-fuel ratio AFcw by a predetermined value ΔTAU2.

The valve overlap increasing control is executed to advance an opening-valve timing of the intake valve 71 to a value further leading ahead of the target intake-valve opening position VTIcw by a predetermined value ΔVTI2 and to delay a closing-valve timing of the exhaust valve 72 to a value further lagging behind the target intake-valve opening position VTEcw by a predetermined value ΔVTE2 in order to increase the magnitude of a valve overlap.

The intake valve lift raising control is executed to increase a lift quantity of the intake valve 71 to a value even greater than the target intake-valve lift VLIcw by a predetermined value ΔVLI2.

The cylinder gas flow rate up control is executed to change an opening of the swirl flow control valve in the valve-closing direction to a value further shifted into the closed-valve side relative to the target swirl flow rate control valve opening SWcw by a predetermined value ΔSW2. As an alternative, the cylinder gas flow rate up control is executed to change an opening of the tumble flow control valve in the valve-closing direction to a value further shifted into the closed-valve side relative to the target tumble flow rate control valve opening TBcw by a predetermined value ΔTB2.

It is to be noted that the correction values ΔNE2, ΔIG2, ΔTAU2, ΔVTI2, ΔVTE2, ΔVLI2, ΔSW2 and ΔTB2 for correcting the control parameters can each be set at a fixed value determined in advance in order to make computations simple or set in accordance with a difference between the present temperature of exhaust gas and a target temperature of exhaust gas. By setting the correction values for correcting the control parameters in accordance with a difference between the present temperature of exhaust gas and the target temperature of exhaust gas in this way, the correction values are each set at a value that increases the amount of heat dissipated by exhaust gas in proportion to the temperature difference, which can be regarded as a difference between an actual temperature of the catalyst 25 and a target catalyst temperature. As a result, it is possible to obtain a proper effect of speeding an operation to warm up the catalyst 25.

At a step 810, the count value of a counter C2 is examined to determine whether or not the count value has reached or exceeded a predetermined value B. The counter C2 is used for measuring the length of time lapsing since the start of the second control. If the count value of the counter C2 has not reached the predetermined value B, the flow of the routine goes back to the step 809. At a point of time the count value of the counter C2 has reached or exceeded the predetermined value B, the flow of the routine goes on from the step 810 to a step 811. At the step 811, exhaust gas temperature T detected by the sensor 55 is examined to determine whether or not the temperature T has reached or exceeded a minimum temperature Tb within a normal range that can be obtained by execution of the second control. Since the temperature T can also be regarded as the temperature of the catalyst 25, it is possible to determine whether or not the second control has resulted in a predetermined effect of speeding an operation to warm up the catalyst 25.

If the temperature T of exhaust gas has not reached the minimum temperature Tb, the flow of the routine goes on to a step 812. At the step 812, an abnormality is determined to exist in the emission control system and a warning lamp is turned on to give a warning to the driver. In addition, an abnormality code is stored in a backup RAM of the ECU 30. Then, at the next step 813, the processing to end the control to speed an operation to warm up the catalyst 25 is carried out and the flag Xcw is reset to 0 before the execution of this routine is ended.

If the determination result obtained at the step 811 indicates that the temperature T of exhaust gas has reached or exceeded the minimum temperature Tb, on the other hand, the flow of the routine goes on directly to the step 813 at which the processing to end the control to speed an operation to warm up the catalyst 25 is carried out and the flag Xcw is reset to 0 before the execution of this routine is ended.

It is to be noted that, in accordance with this routine, in the execution of the second control, the control is always ended as the length of time measured by the counter C2 becomes equal to a predetermined period. As an alternative, if the state of an operation to warm up the sensor 52 is determined to be progressing smoothly as a result of the execution of the second control, the execution of the second control can be continued till the temperature Tw of the cooling water temp or the temperature T of exhaust gas reaches a minimum temperature that allows a decision to be made to end the operation to warm up the catalyst 25.

[Control to Speed an Operation to Re-Warm up the Catalyst]

A routine represented by a flowchart shown in FIG. 45 is executed repeatedly at predetermined intervals during an operation of the engine 11. When the routine is invoked, the flowchart begins with steps 821 to 823 to determine whether or not execution conditions are satisfied. The execution conditions are considered to hold true only if following 3 conditions (1) to (3) are all satisfied:

(1): The control to speed an operation to warm up the sensor 52 at the start of the engine 11 shall have been completed. This condition is examined at the step 821.

(2): The emission control system shall have been determined to be functioning normally. This condition is examined at the step 822.

(3): The temperature T of exhaust gas shall have decreased to a temperature lower than a minimum temperature Tc at which a warmed-up state of the catalyst 25 can be maintained. That is, the temperature T of exhaust gas shall have decreased to a temperature corresponding to an inactive state of the catalyst 25. This condition is examined at the step 823.

If even only one of above conditions (1) to (3) is not satisfied, the conditions for execution of the control to speed an operation to warm up the catalyst 25 during an operation of the engine 11 are considered not to hold true. In this case, the execution of the routine is ended without carrying out subsequent processing.

If all above conditions (1) to (3) are satisfied, on the other hand, the flow of the routine goes on to a step 824 to determine whether or not the vehicle is running. If the result of determination indicates that the vehicle is not running, that is, if the engine 11 is in an idle operation state, the flow of the routine goes on to a step 825 at which the third control for the idle operation state is executed. In this case, control parameters to be used in the third control may be selected in accordance with the operating state of the engine 11. As the third control, typically, the following control is executed.

In the idle-up control, the target idle revolution speed is set at a value higher than the target idle revolution speed NEid by a predetermined value ΔNE3 to increase a throttle opening.

The ignition timing delaying control is executed to delay an ignition timing to a value delayed from the target ignition timing IGid by a predetermined value ΔIG3.

The air-fuel ratio lean control is executed to reduce a fuel injection volume to a value smaller than the target air-fuel ratio AFid by a predetermined value ΔTAU3.

The valve overlap increasing control is executed to advance an opening-valve timing of the intake valve 71 to a value leading ahead of the target intake-valve opening position VTIid by a predetermined value ΔVTI3 and to delay a closing-valve timing of the exhaust valve 72 to a value lagging behind the target intake-valve opening position VTEid by a predetermined value ΔVTE3 in order to increase the magnitude of a valve overlap.

The intake valve lift raising control is executed to increase a lift quantity of the intake valve 71 to a value greater than the target intake-valve lift VLIid by a predetermined value ΔVLI3.

The cylinder gas flow rate up control is executed to change an opening of the swirl flow control valve in the valve-closing direction to a value in the closed-valve side relative to the target swirl flow rate control valve opening SWid by a predetermined value ΔSW3. As an alternative, the cylinder gas flow rate up control is executed to change an opening of the tumble-flow control valve in the valve-closing direction to a value in the closed-valve side relative to the target tumble flow rate control valve opening TBid by a predetermined value ΔTB3.

It is to be noted that the correction values ΔNE3, ΔIG3, ΔTAU3, ΔVTI3, ΔVTE3, ΔVLI3, ΔSW3 and ΔTB3 for correcting the control parameters can each be set at a fixed value determined in advance in order to make computations simple or set in accordance with a difference between the present temperature of exhaust gas and a target temperature of exhaust gas.

If the result of determination obtained at the step 824 indicates that the vehicle is running, on the other hand, the flow of the routine goes on to a step 826 at which the fourth control for the idle operation state is executed. As the fourth control, typically, the following control is executed.

The ignition timing delaying control is executed to delay an ignition timing to a value delayed from the present target ignition timing IGr by a predetermined value ΔIG4.

The valve overlap increasing control is executed to advance an opening-valve timing of the intake valve 71 to a value leading ahead of the present target intake-valve opening position VTIr by a predetermined value ΔVTI4 and to delay a closing-valve timing of the exhaust valve 72 to a value lagging behind the present target intake-valve opening position VTEr by a predetermined value ΔVTE4 in order to increase the magnitude of a valve overlap.

The cylinder gas flow rate up control is executed to change an opening of the swirl-flow control valve in the valve-closing direction to a value in the closed-valve side relative to the present target swirl flow rate control valve opening SWr by a predetermined value ΔSW4. As an alternative, the cylinder gas flow rate up control is executed to change an opening of the tumble flow control valve in the valve-closing direction to a value in the closed-valve side relative to the present target tumble flow rate control valve opening TBr by a predetermined value ΔTB4.

It is to be noted that the correction values ΔIG4, ΔVTI4, ΔVTE4, ΔSW4 and ΔTB4 for correcting the control parameters can each be set at a fixed value determined in advance in order to make computations simple or set in accordance with a difference between the present temperature T of exhaust gas and a target temperature of exhaust gas or in accordance with the present operating state of the engine 11. In this way, the correction values can be set so as to raise the amount of heat dissipated by exhaust gas as much as possible to a value within a range assuring the drivability at that time.

Then, at the next step 827, the temperature T of exhaust gas is examined to determine whether or not the temperature T is at least equal to a predetermined temperature Td. The temperature Td is a lowest temperature at which a decision can be made to end the operation to warm up the catalyst 25. If the temperature T of exhaust gas is found lower than the predetermined temperature Td, the flow of the routine goes back to the step 824 to repeat either the third control or the fourth control. In this way, either the third control or the fourth control is executed repeatedly till the temperature T of exhaust gas is found at least equal to the predetermined temperature Td.

Thereafter, at a point of time the temperature T of exhaust gas is found at least equal to the predetermined temperature Td, the catalyst 25 is determined to have been restored to the activated state. In this case, the flow of the routine goes on from the step 827 to a step 828 at which processing to end the control to speed an operation to warm up the catalyst 25 is carried out. Then, the execution of this routine is ended after the control parameters used in the control to speed an operation to warm up the catalyst 25 are restored to their respective idle-state or running-state control values.

Figure 46:
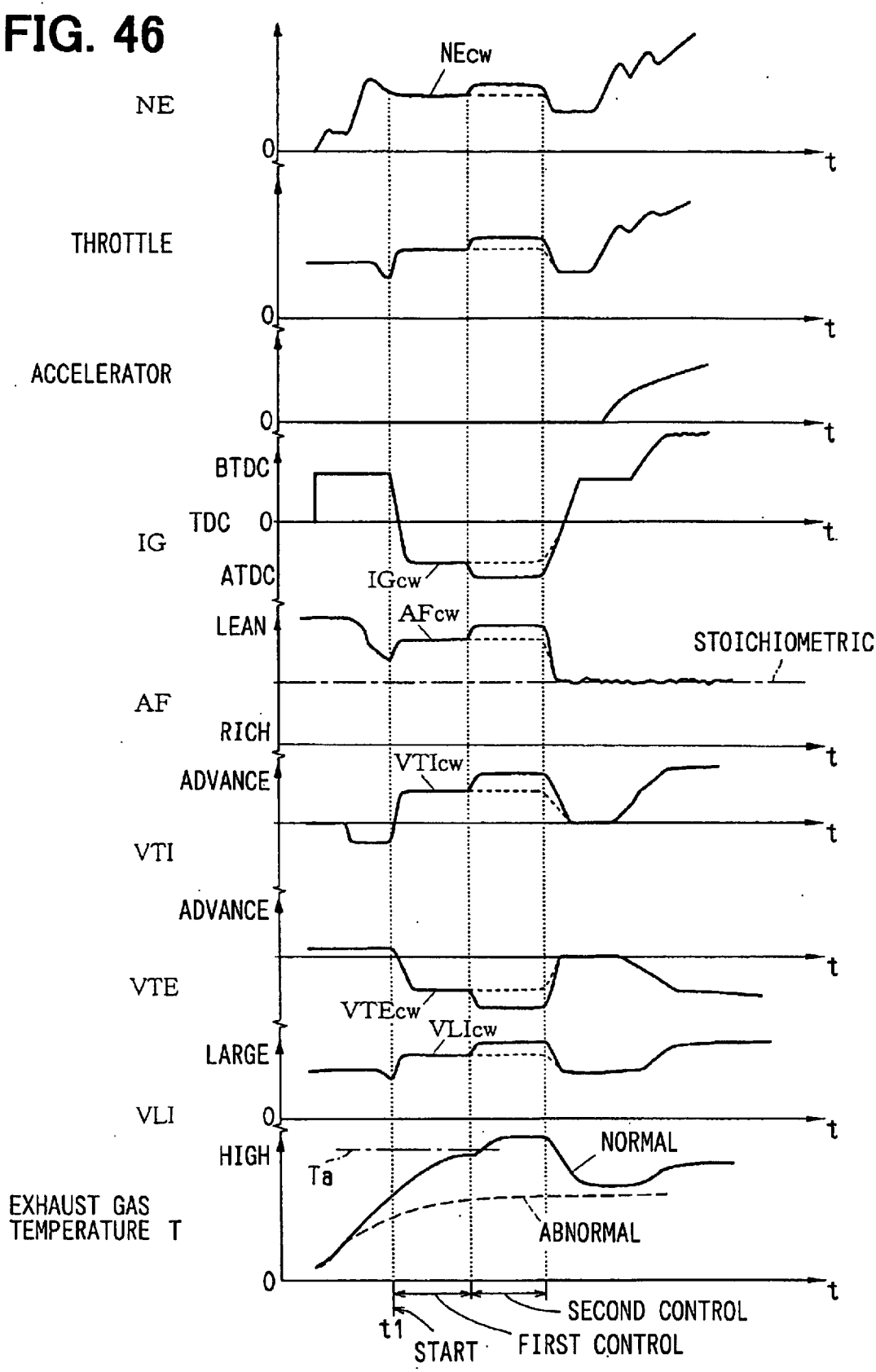
FIG. 46 shows time charts of operations taking place in the emission control system implemented by the eighth embodiment of the present invention.

FIG. 46 shows time charts of operations taking place in the eighth embodiment. In particular, FIG. 46 shows time charts of the control carried out at a start of the engine 11 to speed an operation to warm up the catalyst 25. The control to speed an operation to warm up the catalyst 25 is started at a time t1. In detail, the first control is started at the time t1 and the second control is started at a time t2. Concretely, FIG. 46 shows changes in plurality of parameters. In the case of the eighth embodiment, at least one of the parameters is used. The parameters shown in FIG. 46 are the engine revolution speed NE, the throttle valve opening, an accelerator operation quantity, the ignition timing IG, the air-fuel ratio AF, the opening timing VTI of intake valve, the closing timing VTE of exhaust valve, the lift quantity VLI of the intake valve and the temperature T of exhaust gas.

In accordance with this embodiment, the first control is executed to speed an operation to warm up the catalyst 25. If the first control does not warm up the catalyst 25 sufficiently, possible existence of an abnormality due to some causes may be suspected. In the case of this embodiment, if the first control does not warm up the catalyst 25 sufficiently, the second control is executed to speed an operation to warm up the catalyst 25. The second control is devised to result in a bigger expected effect of speeding an operation to warm up the catalyst 25 than the first control. Thus, if the abnormality, the existence of which is suspected, is caused by a low temperature of the atmosphere or the like, the second control is capable of speeding an operation to warm up the catalyst 25. As a result, with this embodiment, an operation to warm up the catalyst 25 can be speeded with a high degree of reliability.

In addition, in the case of this embodiment, if the second control does not successfully warm up the catalyst 25 either, the emission control system is determined to be abnormal. In this case, a diagnosis can be made with a high degree of accuracy by eliminating the abnormality external causes such as the temperature of the atmosphere.

Furthermore, in the case of this embodiment, the temperature of the catalyst 25 may decrease again after the catalyst 25 has once been warmed up. In this case, the third or fourth control is executed also to speed an operation to warm up the catalyst 25. Thus, the temperature of the catalyst 25 can be restored back to the activation temperature after the temperature of the catalyst 25 has once decreased.

It is to be noted that, on the downstream side of the catalyst 25, an exhaust gas temperature sensor can also be provided for sensing a temperature of exhaust gas on the downstream side of the catalyst 25 so that a warmed-up state of the catalyst 25 can be detected. Furthermore, in addition to the exhaust gas temperature sensor provided on the downstream side of the catalyst 25, an exhaust gas temperature sensor can also be provided on the upstream side of the catalyst 25. The exhaust gas temperature sensor provided on the upstream side of the catalyst 25 is used detecting a temperature of exhaust gas flowing to the catalyst 25 while the exhaust gas temperature sensor provided on the downstream side of the catalyst 25 is used detecting a temperature of exhaust gas leaving the catalyst 25 so that a warmed-up state of the catalyst 25 can be determined by collectively using the temperatures detected by both the sensors.

In addition, a catalyst-temperature sensor can also be embedded inside the catalyst 25 to be used as a means for directly sensing a temperature of the catalyst 25 so that a warmed-up state of the catalyst 25 can be detected with a high degree of accuracy. Considering the fact that exhaust gas leaving the catalyst 25 includes lean components such as NOx and rich components such as HC and CO, as an alternative, the emission control system can also be provided with an exhaust gas sensor for detecting a concentration of a lean component and a concentration of a rich component to estimate a purification rate of the exhaust gas. Thus, a warmed-up state of the catalyst 25 can be inferred.

Moreover, in the case of this embodiment, after the enforced control to speed an operation to warm up the catalyst 25 at a start of the engine 11 has been executed for a predetermined period of time, it is possible to determine whether or not an abnormality exists in the emission control system by determining whether or not a temperature T of exhaust gas is lower than a minimum temperature Tb of a normal range that can be obtained by execution of the enforced control to speed an operation to warm up the catalyst 25. It is possible, however, to change the method of determining whether or not an abnormality exists in the emission control system. For example, in accordance with another method, if an increasing profile (that is, a gradient) of the temperature T of exhaust gas does not satisfy a predetermined requirement within a predetermined period immediately following the start of the control to speed an operation to warm up the catalyst 25 at a start of the engine 11, an abnormality may be determined to exist in the emission control system. In accordance with a further method, if an increase in exhaust gas temperature or an increasing gradient of the exhaust gas temperature observed during the enforced control to speed an operation to warm up the catalyst 25 is found equal to or smaller than a predetermined value, an abnormality may be determined to exist in the emission control system. In accordance with a still further method, the amount of heat supplied to the catalyst 25 since a time immediately following the end of a start of the engine 11 or a parameter having a correlation with the amount of heat is cumulated since such a time to produce a cumulative value of the parameter having a correlation with the amount of heat and, if the cumulative value is found greater than a predetermined criterion value at a point of time the temperature T of exhaust gas exceeds a predetermined temperature, an abnormality may be determined to exist in the emission control system. In accordance with an alternative method to the still further method, the amount of heat supplied to the catalyst 25 since a time immediately following the end of a start of the engine 11 or a parameter having a correlation with the amount of heat is cumulated since such a time to produce a cumulative value of the parameter having a correlation with the amount of heat and, if the temperature T of exhaust gas is found equal to or smaller than the predetermined temperature at a point of time the cumulative value reaches the predetermined criterion value, an abnormality may be determined to exist in the emission control system.

Note that, in place of the a cumulative value of the parameter having a correlation with the amount of heat, it is also possible to use a cumulative value of the intake air volume or the intake air volume cumulative value corrected by using the air-fuel ratio.

In addition, in the case of this embodiment, the emission control system is subjected to a diagnosis only during execution of the control to speed an operation to warm up the catalyst 25 at a start of the engine 11. However, the emission control system can be subjected to a diagnosis also during execution of the control to speed an operation to warm up the catalyst 25 in the subsequent operation of the engine 11.

Ninth Embodiment

Next, a ninth embodiment of the present invention is explained. The configuration elements of the ninth embodiment identical with their respective counterparts employed in the preceding embodiments are denoted by the same reference numerals as the counterparts, and the explanation of the identical elements is not given.

FIG. 1 is a diagram showing the configuration of an emission control system implemented by the ninth embodiment. After the engine 11 is started from a cold state, the control to speed an operation to warm up the catalyst 25 is executed. In the control to speed an operation to warm up the catalyst 25, a controllable parameter is adjusted to increase the exhaust gas flow rate. For example, the ECU 30 delays the ignition timing to a timing lagging behind the normal idling ignition timing. As a result, the temperature of exhaust gas rises. In addition, the ECU 30 slightly increases the idle revolution speed in order to sustain the operating state of the engine 11 in a stable state. A delayed ignition timing may cause the rotation of the engine 11 to become instable but, by increasing the revolution speed of the engine 11, the rotation of the engine 11 can be maintained in a stable state.

The ECU 30 further makes a diagnosis of the emission control system. If the amount of heat dissipated by exhaust gas in this diagnosis does not reach an expected value, the emission control system is determined to be abnormal. The amount of heat dissipated by exhaust gas can be expressed by a product of a flow rate of the exhaust gas and a temperature of the exhaust gas. The flow rate of exhaust gas is dependent on the intake air volume. On the other hand, the temperature of exhaust gas varies in accordance with the air-fuel ratio A/F.

Figure 47:
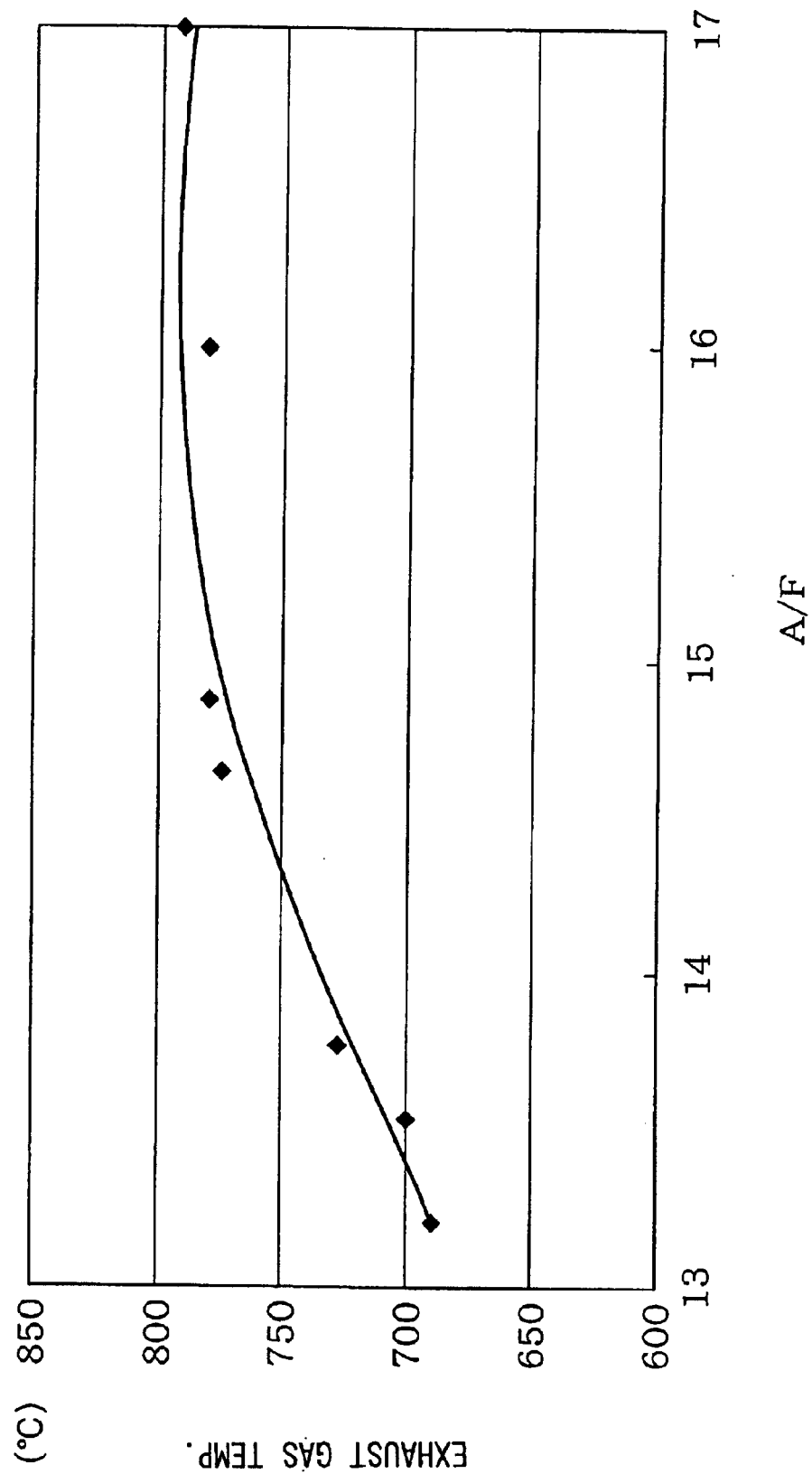
FIG. 47 is a diagram showing a relation between the temperature of exhaust gas and the air-fuel ratio in a ninth embodiment of the present invention.

FIG. 47 is a diagram showing how the temperature of exhaust gas varies in accordance with the air-fuel ratio A/F. An air-fuel ratio A/F can be detected by the air-fuel ratio sensor 26. Nevertheless, it takes time to activate the air-fuel ratio sensor 26. Since the air-fuel ratio A/F has a certain correlation with the fuel injection volume TAU, however, the air-fuel ratio A/F can be expressed in terms of the fuel injection volume TAU. By using this consideration as a base, in the case of this embodiment, it is possible to determine whether the emission control system is normal or abnormal on the basis of the intake air volume GA and the fuel injection volume TAU.

Figure 48:
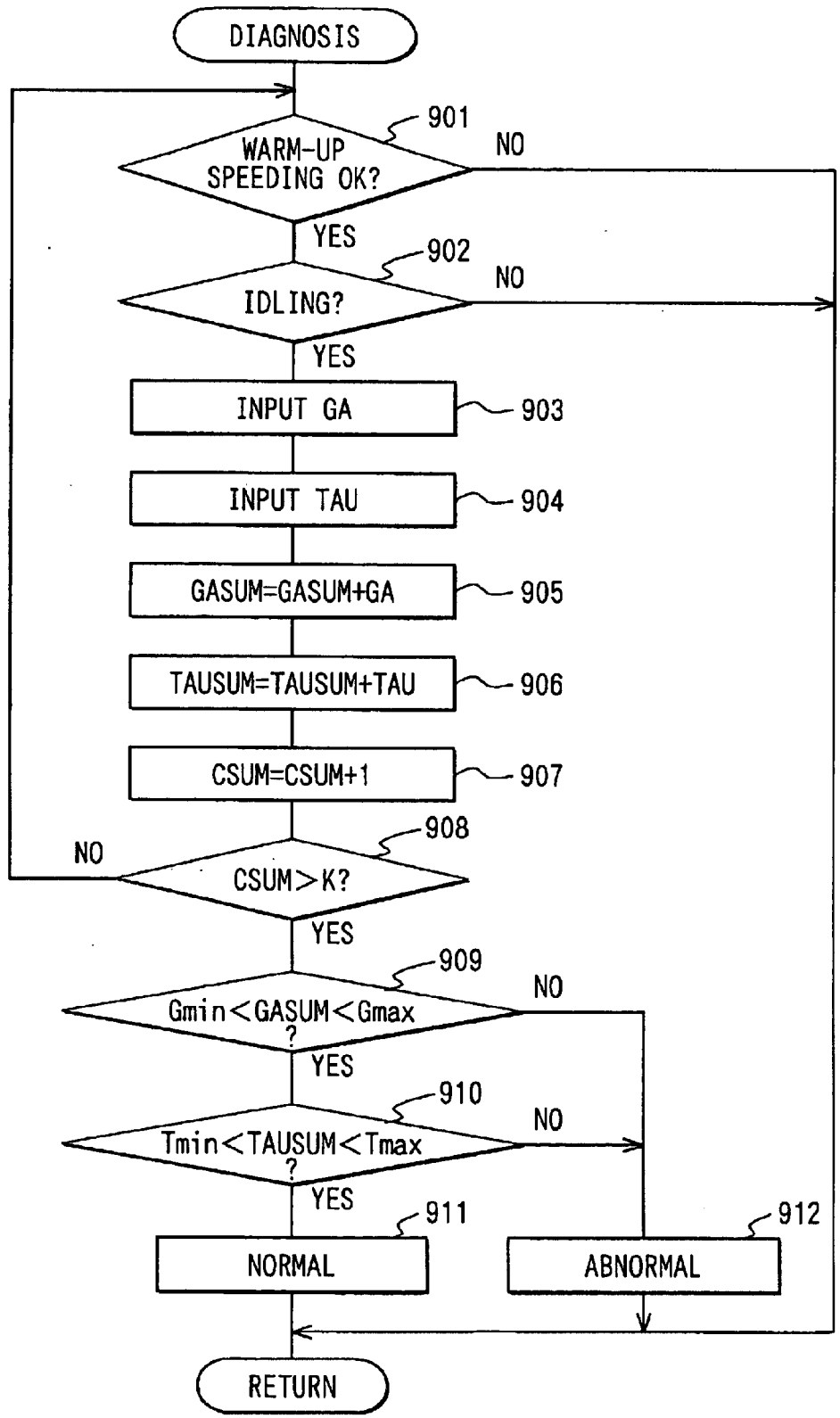
FIG. 48 shows a flowchart representing control executed by the emission control system implemented by the ninth embodiment of the present invention.

The following description explains a diagnosis routine executed by the ECU 30 in accordance with a flowchart shown in FIG. 48. This diagnosis routine is executed repeatedly at predetermined time intervals or predetermined crank-angle intervals. The flowchart begins with a step 901 to determine whether or not conditions for execution of the control to speed an operation to warm up the sensor 52 are satisfied for example by determining whether the temperature of the cooling water is lower or higher than a predetermined temperature. If the conditions for execution of the control to speed an operation to warm up the sensor 52 are not satisfied, the execution of this routine is ended.

If the conditions for execution of the control to speed an operation to warm up the sensor 52 are satisfied, on the other hand, the flow of the routine goes on to a step 902 to determine whether or not the engine 11 is not in an idle operating state. If the engine 11 is in an idle operating state, the execution of this routine is ended.

If the conditions for execution of the control to speed an operation to warm up the sensor 52 are satisfied, allowing the control to speed an operation to warm up the sensor 52 to be executed and the engine 11 is in an idle operating state, a diagnosis is made at the next step 903 and the subsequent steps as follows. First of all, at the step 903, an intake air volume GA is fetched. Then, the flow of the routine goes on to a step 904 to read in a fuel injection volume TAU computed by a fuel injection control routine.

Subsequently, at the next step 905, the current intake air volume GA fetched at the step 903 is added to an intake air volume cumulative value GASUM cumulated so far to produce an updated intake air volume cumulative value GASUM. Then, at the next step 906, the current fuel injection volume TAU fetched at the step 904 is added to a fuel injection volume cumulative value TAUSUM cumulated so far to produce an updated fuel injection volume cumulative value TAUSUM. Subsequently, at the next step 907, the count value of a counter CSUM is incremented by 1.

Then, at the next step 908, the count value of the counter CSUM is examined to determine whether or not the count value has exceeded a predetermined value K. If the count value of the counter CSUM has not exceeded the predetermined value K, the flow of the routine goes back to the step 901. Thus, the processing to find an intake air volume cumulative value GASUM and the processing to find a fuel injection volume cumulative value TAUSUM are carried out repeatedly till the count value of the counter CSUM exceeds the predetermined value K.

At a point of time the count value of the counter CSUM exceeds the predetermined value K, the flow of the routine goes back to a step 909. At the step 909, the intake air volume cumulative value GASUM is examined to determine whether or not the intake air volume cumulative value GASUM is within a predetermined normal range (Gmin<GASUM<Gmax). Then, at a step 910, the fuel injection volume cumulative value TAUSUM is examined to determine whether or not the fuel injection volume cumulative value TAUSUM is within a predetermined normal range (Tmin<TAUSUM<Tmax).

If the determination result obtained at the step 909 is YES indicating that the intake air volume cumulative value GASUM is within the predetermined normal range and the determination result obtained at the step 910 is also YES indicating that the fuel injection volume cumulative value TAUSUM is within the predetermined normal range, the amount of heat dissipated by exhaust gas is determined to be an adequate amount of heat required in the control to speed an operation to warm up the catalyst 25. In this case, the flow of the routine goes on to a step 911 at which the emission control system is determined to be normal before the execution of this routine is ended.

If the determination result obtained at the step 909 is NO or the determination result obtained at the step 910 is NO, on the other hand, the amount of heat dissipated by exhaust gas is determined to be an improper amount of heat required for the control to speed an operation to warm up the catalyst 25. Specifically, the amount of heat dissipated by exhaust gas is determined to be an inadequate or excessive amount of heat required for the control to speed an operation to warm up the catalyst 25. In this case, the flow of the routine goes on to a step 912 at which the emission control system is determined to be abnormal. Then, a warning lamp is turned on to give a warning to the driver and an abnormality code is stored in a backup RAM of the ECU 30 before the execution of this routine is ended.

In the case of the embodiment described above, the amount of exhaust gas heat cumulated during the control to speed an operation to warm up the catalyst 25 (that is, the total amount of heat supplied to the catalyst 25 since the start of the engine 11) is evaluated in a diagnosis of the emission control system in order to determine whether or not an abnormality exists in the emission control system with a high degree of precision.

In the case of this embodiment, the emission control system is subjected to a diagnosis using both the intake air volume GA and the fuel injection volume TAU. It is to be noted, however, that the emission control system can be subjected to a diagnosis using only either the intake air volume GA or the fuel injection volume TAU.

While the vehicle is running, the intake air volume GA and/or the fuel injection volume TAU may vary in accordance with a change in engine operating condition. Thus, not only do diagnosis parameters change to variations in intake air volume GA and/or fuel injection volume TAU, heat is also discharged by the catalyst 25 due to a running-resisting wind so that the progress of an operation to warm up the catalyst 25 is slow. As a result, if a change in operating condition and an effect of a running resistance wind, which exist while the vehicle is running, are not taken into consideration, it is difficult to make a diagnosis of the emission control system with a high degree of precision. The diagnosis parameters include the intake air volume and the air-fuel ratio.

In the case of this embodiment, however, the diagnosis is made only in an idle operation with relatively stable operating conditions of the engine 11, that is, a relatively stable intake air volume and a relatively stable fuel injection volume. Thus, effects of the diagnosis parameters and effects of the engine operating conditions can be reduced in number and/or in magnitude. In addition, there is no delay of an operation to warm up the catalyst 25 due to a running resistance wind. As a result, in accordance with this embodiment, it is possible to make a diagnosis of the emission control system with a high degree of precision without considering the effects of the diagnosis parameters and the effects of the engine operating conditions.

In the case of this embodiment, as an intake air volume parameter, an intake air volume GA detected by the air flow meter 14 is used. It is to be noted, however, that a throttle opening or an intake air pressure may also be taken as the intake air volume parameter. In addition, in the case of a control system in which the intake air volume is adjusted by changing the lift quantity of the intake valve by means of a mechanism for varying the quantity of the valve lift, the variable lift quantity of the intake valve may be used as the intake air volume parameter. As an alternative, an estimated intake air volume found by using quantities such as the throttle opening, the intake air pressure and the variable lift quantity of the intake valve can also be taken as the intake air volume parameter.

In addition, in the case of this embodiment, as an air-fuel ratio parameter, the fuel injection volume TAU is used. However, a combustion roughness value can also be taken as the air-fuel ratio parameter. As an alternative, an estimated air-fuel ratio found by using quantities such as the fuel injection volume and the combustion roughness value can also be taken as the air-fuel ratio parameter. It is to be noted that, in the case of a control system equipped with an air-fuel ratio sensor, an operation to warm up which can be speeded even in a cold start of the engine 11, an air-fuel ratio detected by such an air-fuel ratio sensor can also be taken as the air-fuel ratio parameter.

Figure 49:
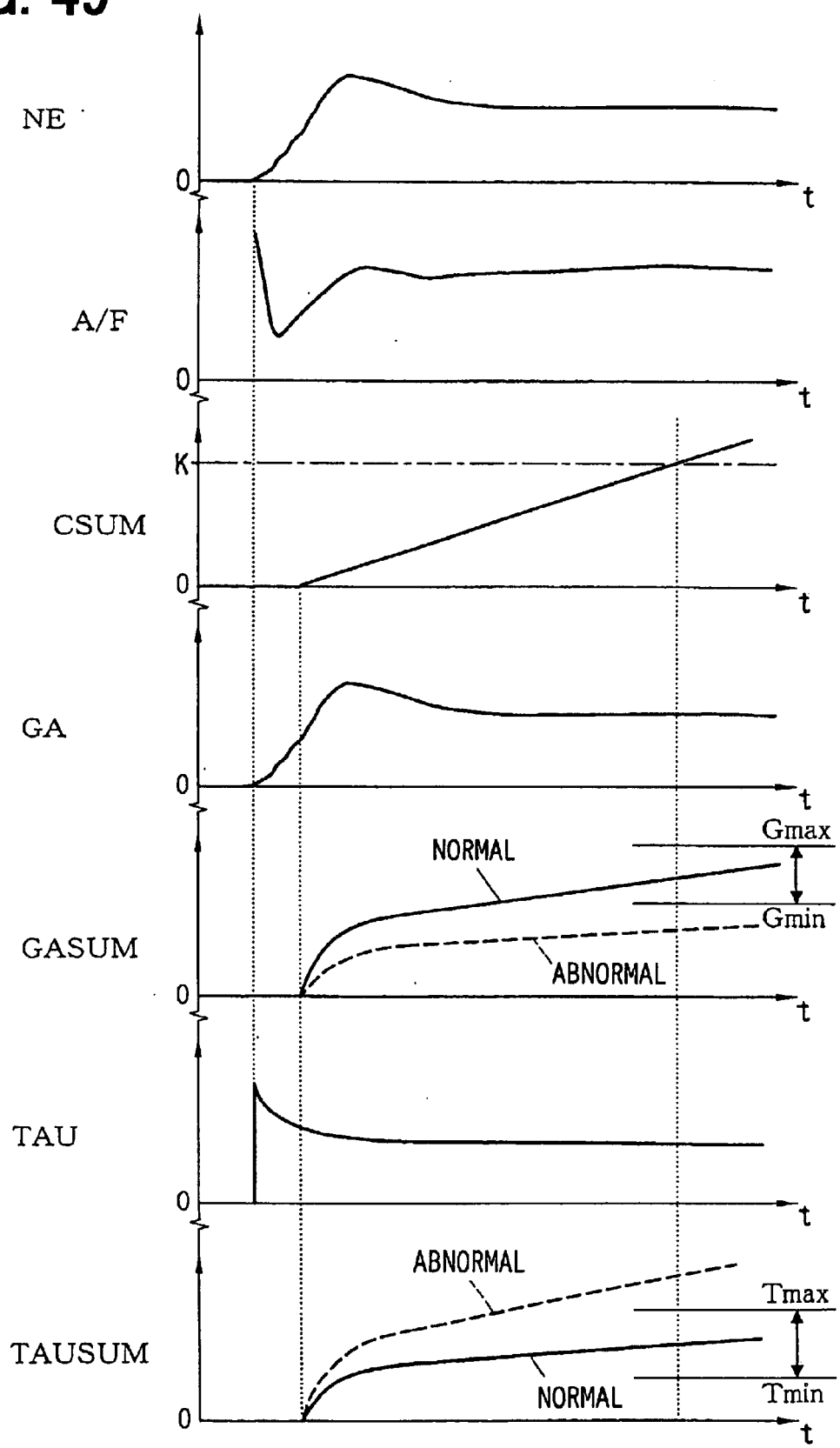
FIG. 49 shows time charts of operations taking place in the emission control system implemented by the ninth embodiment of the present invention.

FIG. 49 shows time charts of operations taking place in the ninth embodiment. When the engine 11 is started, the revolution speed NE of the engine 11 rises. If the execution conditions are satisfied, the count value of a counter CSUM also increases. As shown in the time charts of FIG. 49, the actual air-fuel ratio A/F, the intake air volume GA and the fuel injection volume TAU vary abruptly in both the positive and negative directions. On the other hand, the intake air volume cumulative value GASUM and the fuel injection volume cumulative value TAUSUM increase steadily. For this reason, a stable diagnosis can be made.

Figure 50:
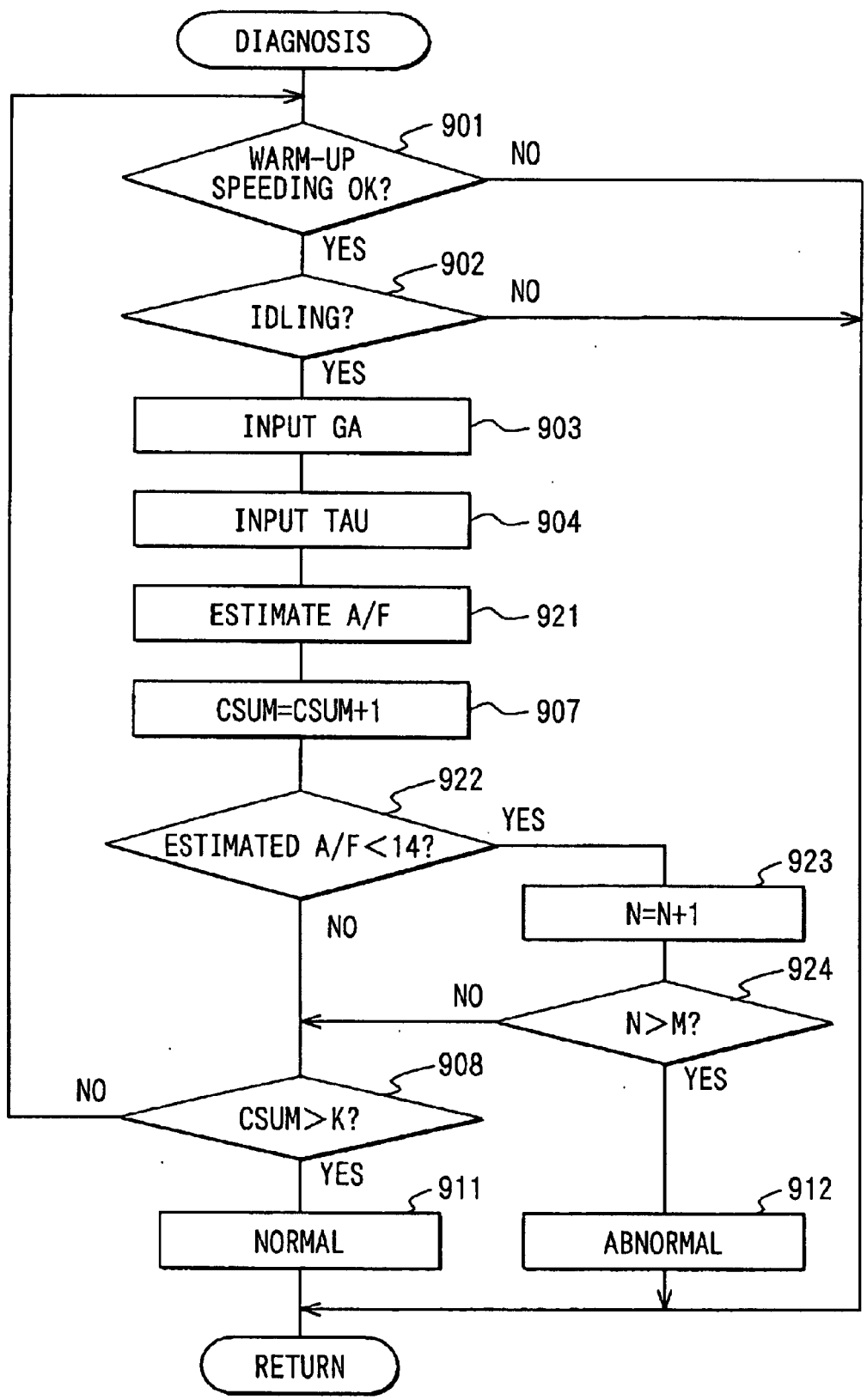
FIG. 50 shows a flowchart representing control executed by a modified version of the emission control system implemented by the ninth embodiment of the present invention.

A modified version of the ninth embodiment is explained as follow. The configuration elements of the modified embodiments identical with their respective counterparts employed in the preceding embodiments are denoted by the same reference numerals as the counterparts, and the explanation of the identical elements is not given. FIG. 50 shows a flowchart representing processing carried out by this modified version. In the case of this modified version, during the control to speed an operation to warm up the catalyst 25, an estimated A/F is found and the emission control system is subjected to a diagnosis on the basis of the behavior of the estimated A/F. The estimated A/F is the air-fuel ratio parameter.

At a step 921, an estimated A/F is found by using the following equation: A/F=GA/TAU. In the case of this embodiment, an estimated A/F is found if the conditions are found satisfied at the steps 901 and 902. The processing to find an estimated A/F can be started with a timing with which the air-fuel ratio starts to get stabilized after the engine 11 is started.

Then, at the next step 922, the estimated A/F is examined to determine whether or not the estimated A/F has a value on the rich side relative to a predetermined air-fuel ratio. At the step 922, a predetermined air-fuel ratio of 14.0 is used. If the estimated A/F has a value on the rich side relative to the predetermined air-fuel ratio of 14.0 , the flow of the routine goes on to a step 923. At the step 923, the number of times the estimated A/F had a value on the rich side relative to the predetermined air-fuel ratio of 14.0 is incremented. The number of times the estimated A/F had a value on the rich side relative to the predetermined air-fuel ratio of 14.0 is referred to as a count value N, which also represents the number of times the temperature of exhaust gas became abnormally low. At the next step 924, the count value N is examined to determine whether or not the count value N is greater than a predetermined value M (that is, N>M). If the count value N is found greater than the predetermined value M, the flow of the routine goes on to a step 912.

In accordance with this modified version, a temporary abnormality can be detected during the control to speed an operation to warm up the catalyst 25.

In the case of this embodiment, as an air-fuel ratio parameter, the estimated A/F is used. It is to be noted, however, that the fuel injection volume TAU or the combustion roughness value can also be taken as the air-fuel ratio parameter. In addition, in the case of a control system equipped with an air-fuel ratio sensor, an operation to warm up which can be speeded even in a cold start of the engine 11, an air-fuel ratio detected by such an air-fuel ratio sensor can also be taken as the air-fuel ratio parameter.

Furthermore, in the case of this embodiment, the emission control system is subjected to a diagnosis on the basis of the behavior of the air-fuel ratio parameter. However, the emission control system can also be subjected to a diagnosis on the basis of the behavior of the intake airflow rate parameter or the behaviors of both the air-fuel ratio parameter and the intake airflow rate parameter.

Figure 51:
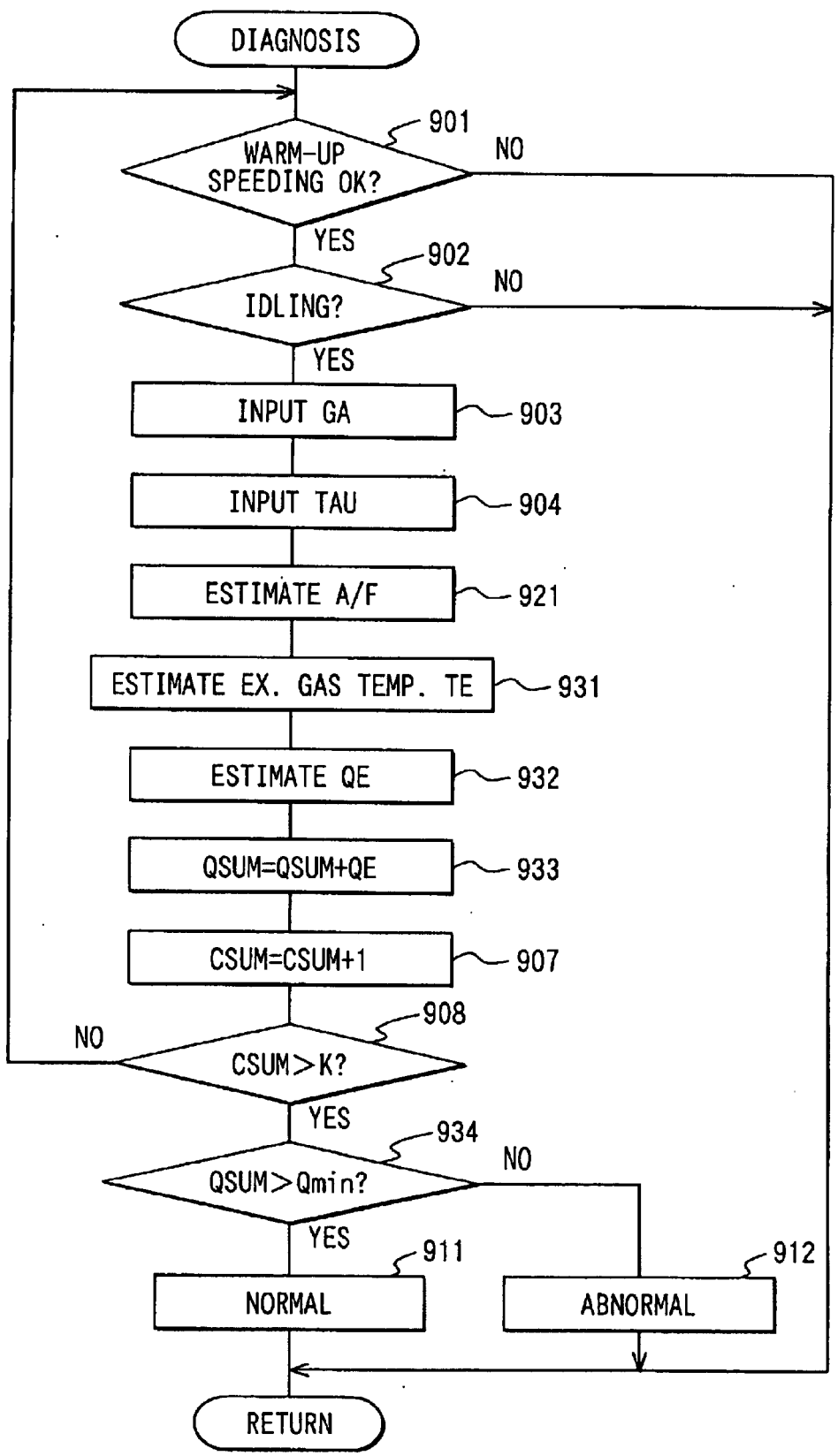
FIG. 51 shows a flowchart representing control executed by a modified version of the emission control system implemented by the ninth embodiment of the present invention.

Another modified version of the ninth embodiment is explained as follow. The configuration elements identical with their respective counterparts employed in the preceding embodiments are denoted by the same reference numerals as the counterparts, and the explanation of the identical elements is not given. FIG. 51 shows a flowchart representing processing carried out by this other modified version. In the case of this other modified version, during the control to speed an operation to warm up the catalyst 25, an estimated amount of heat dissipated by exhaust gas is found and the emission control system is subjected to a diagnosis on the basis of the behavior of this estimated amount. An estimated amount of heat dissipated by exhaust gas is found by using an air-fuel ratio parameter and an intake airflow rate parameter.

At a step 931, an estimated temperature TE of heat dissipated by exhaust gas is found. In detail, an estimated temperature TE is computed from an estimated A/F, an ignition-timing delay quantity $\Delta\theta$ and an engine revolution speed NE in accordance with typically the following equation:

$$TE=(A/F) \times K1 + \Delta\theta \times K2 + NE \times K3 + K4$$

where notations K1, K2, K3 and K4 each denote a constant.

Then, at the next step 932, an amount of heat dissipated by exhaust gas is estimated. In detail, an estimated heat amount QE is found in accordance with typically the following equation:

$$QE = TE \times GA \times e$$

where notation e denotes the specific heat of the exhaust gas. Subsequently, at the next step 933, a cumulative heat amount QSUM is found. The cumulative heat amount QSUM indirectly represents the amount of heat required for warming up the catalyst 25. Then, at the next step 934, the cumulative heat amount QSUM is examined to determine whether or not the cumulative heat amount QSUM is greater than a predetermined value Qmin. If the cumulative heat amount QSUM is found greater than the predetermined value Qmin, the flow of the routine goes on to the step 911 at which the emission control system is determined to be functioning normally. If the cumulative heat amount QSUM is found equal to or smaller than the predetermined value Qmin, on the other hand, the flow of the routine goes on to the step 912 at which the emission control system is determined to be not functioning normally as evidenced by the fact that the cumulative heat amount QSUM is equal to or smaller than the predetermined value Qmin.

Figure 52:
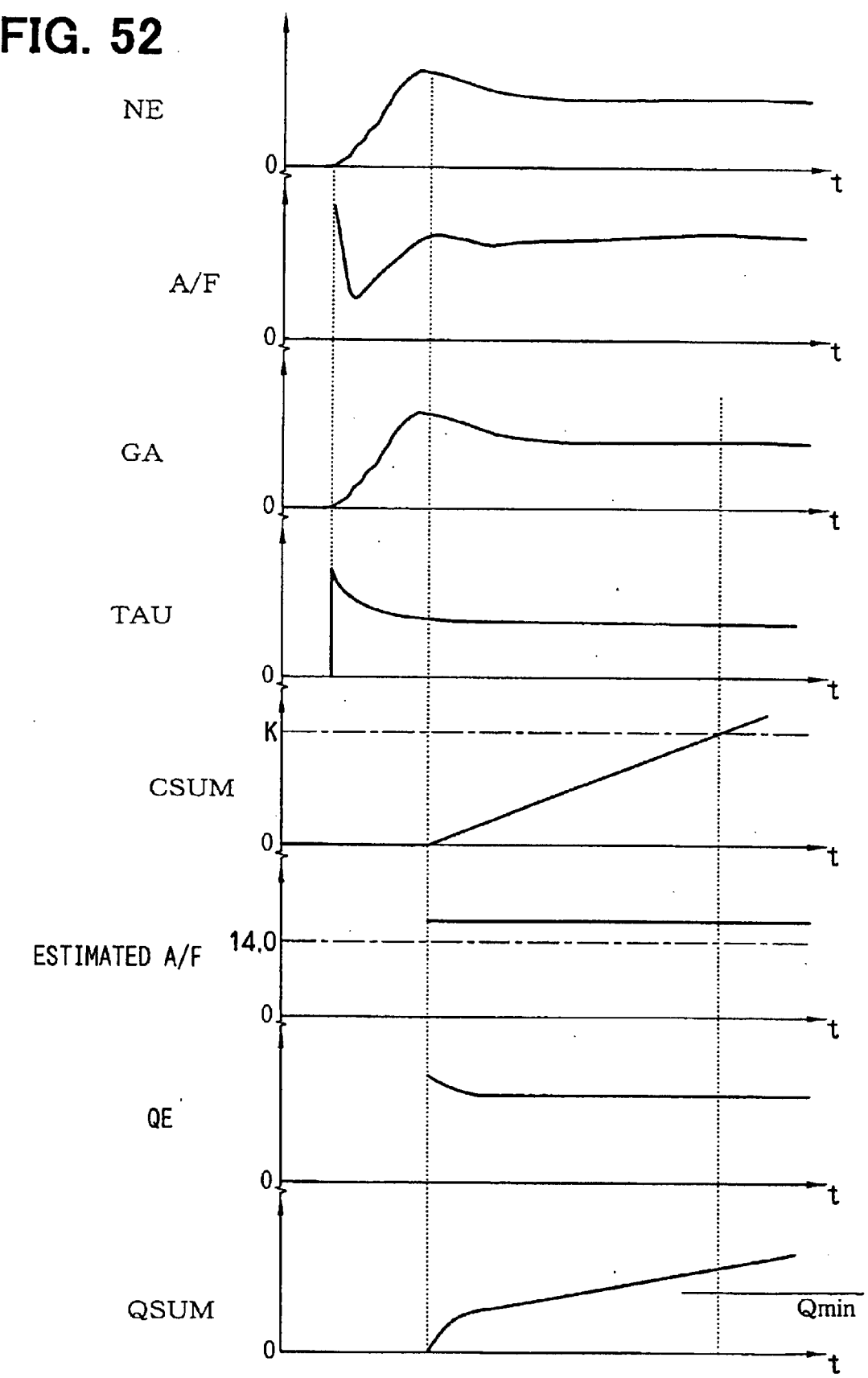
FIG. 52 shows time charts of operations taking place in a modified version of the emission control system implemented by the ninth embodiment of the present invention.

FIG. 52 shows time charts of operations taking place in this embodiment. When the engine 11 is started, the revolution speed NE of the engine 11 rises. If the conditions for execution of the control to speed an operation to warm up the catalyst 25 are satisfied, the processing represented by the flowchart shown in FIG. 51 is carried out. The count value of the counter CSUM is gradually increasing. An estimated A/F, an estimated heat amount QE and a cumulative heat amount QSUM are found in each loop iteration of the routine represented by the flowchart shown in FIG. 51 till the count value of the counter CSUM reaches a predetermined value K. If the emission control system is functioning normally, the cumulative heat amount QSUM will be found greater than a predetermined value Qmin after the count value of the counter CSUM reaches a predetermined value K.

In accordance with this modified version, an abnormality of the emission control system can be detected with a high degree of accuracy on the basis of a cumulative amount of heat used for warming up the catalyst 25.

In the case of this embodiment, attention is paid to the fact that the temperature of exhaust gas changes in dependence on the air-fuel ratio, the magnitude of the ignition timing delay and the revolution speed of the engine 11. Thus, in this embodiment, by considering the air-fuel ratio, the magnitude of the ignition timing delay and the revolution speed of the engine 11, a temperature of exhaust gas can be estimated with a high degree of precision. However, a temperature of exhaust gas can also be estimated by using only one or two of the parameters, namely, the air-fuel ratio, the magnitude of the ignition timing delay and the revolution speed of the engine 11.

In addition, in the case of this embodiment, the intake air volume GA is used as an intake air volume parameter. However, the throttle opening, the intake air pressure or the variable lift quantity of the intake valve can also be taken as the intake air volume parameter. As an alternative, as an intake air volume parameter, it is also possible to use the estimated intake air volume, which is found from quantities such as the throttle opening, the intake air pressure and the variable lift quantity of the intake valve In addition, in the case of this embodiment, the estimated air-fuel ratio A/F is used as an air-fuel ratio parameter. However, the fuel injection volume or the combustion roughness value can also be taken as the air-fuel ratio parameter. In addition, in the case of a control system equipped with an air-fuel ratio sensor, an operation to warm up which can be speeded even in a cold start of the engine 11, an air-fuel ratio detected by such an air-fuel ratio sensor can also be taken as the air-fuel ratio parameter.

Figure 53:
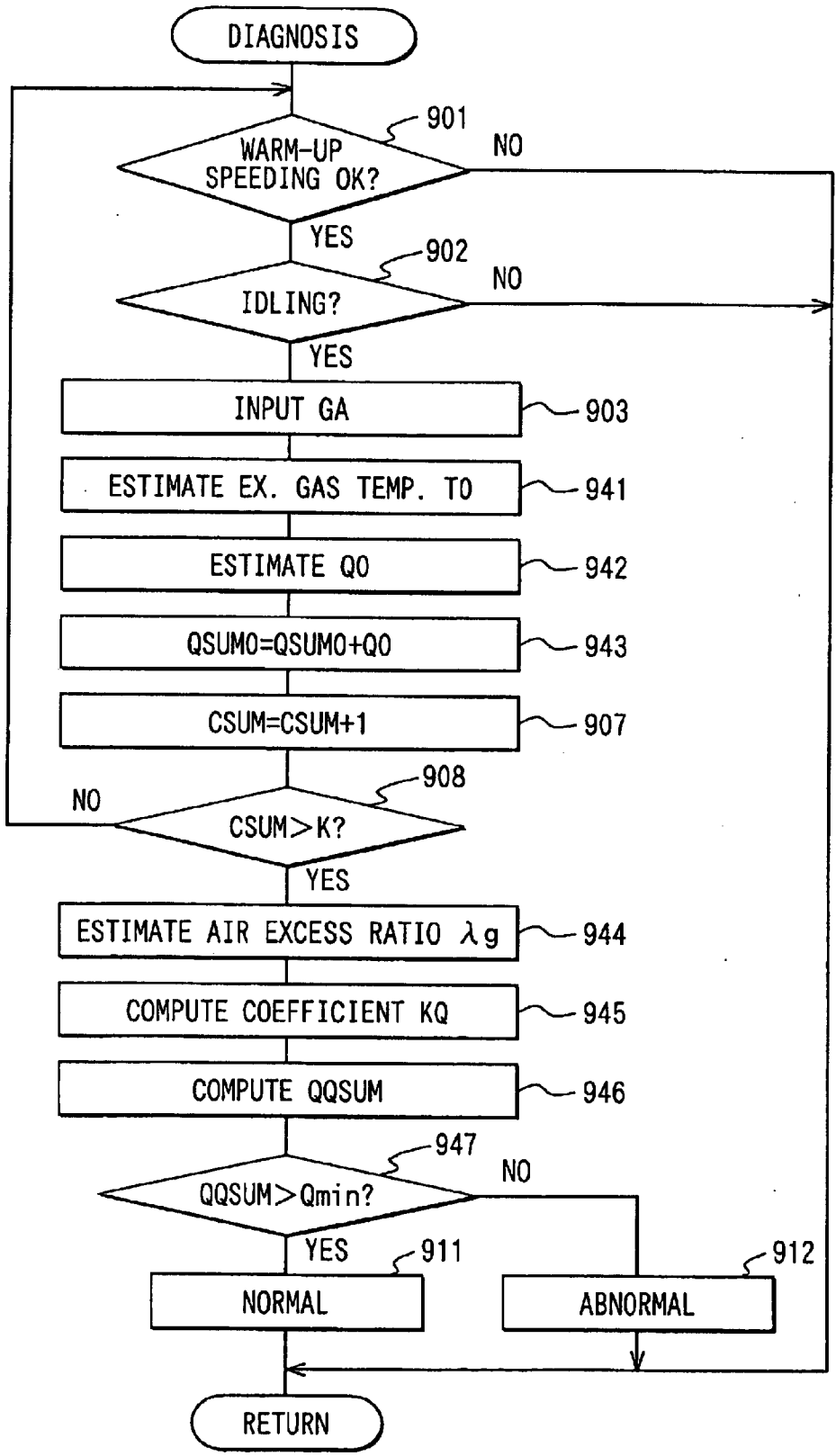
FIG. 53 shows a flowchart representing control executed by a modified version of the emission control system implemented by the ninth embodiment of the present invention.

A further modified version of the ninth embodiment is explained as follow. The configuration elements identical with their respective counterparts employed in the preceding embodiments are denoted by the same reference numerals as the counterparts, and the explanation of the identical elements is not given. FIG. 53 shows a flowchart representing processing carried out by this further modified version.

The amount of heat relevant to an operation to warm up the catalyst 25 comprises the amount of heat dissipated by exhaust gas discharged from the engine 11 and the amount of reaction heat generated by a chemical reaction of exhaust gas internal lean components such as oxygen and the exhaust gas internal rich components such as HC in the sensor 52. Since the amount of each lean component such as oxygen engaged in the chemical reaction taking place in the catalyst 25 changes in accordance with the air-fuel ratio in the control to speed an operation to warm up the catalyst 25, the amount of reaction heat generated internally in the catalyst 25 also varies as well. For this reason, the required amount of heat dissipated by exhaust gas to be used for warming up the catalyst 25 also varies in accordance with the air-fuel ratio in the control to speed an operation to warm up the catalyst 25.

In order to solve the above problem, in the case of this further modified version, an air-fuel ratio is estimated during the control to speed an operation to warm up the catalyst 25. Then, before a diagnosis of the emission control system is made on the basis of an amount of heat dissipated by exhaust gas, conditions for execution of the diagnosis are corrected on the basis of the air-fuel ratio estimated during the control to speed an operation to warm up the catalyst 25. It is to be noted that, in the case of this embodiment, an excess air factor λ is used as information on the air-fuel ratio.

Next, details of the processing carried out by this embodiment are explained.

At a step 941 of the flowchart shown in FIG. 53, an estimated temperature T0 of exhaust gas for a reference excess air factor λ is found from a magnitude Δθ of the ignition timing delay and a revolution speed NE of the engine 11 in accordance with the following equation:

$$T0 = K0 + \Delta\theta \times K2 + NE \times K3$$

where notations K0, K2 and K3 each denote a coefficient. Typically, an excess air factor λ of 1 is taken as the reference excess air factor λ.

At a step 942, an estimated amount Q0 of heat dissipated by exhaust gas is found from an estimated temperature T0 of the exhaust gas, an intake air volume GA and the specific heat e of the exhaust in accordance with the following equation:

$$Q0 = T0 \times GA \times e$$

At a step 943, the current estimated exhaust gas heat amount Q0 found at the step 942 is added to an estimated exhaust gas heat amount cumulative value QSUM0 cumulated so far to produce an updated estimated exhaust gas heat amount cumulative value QSUM0.

At a step 944, an estimated excess air factor λg for the control to speed an operation to warm up the catalyst 25 (or in the computation of an amount of heat dissipated by exhaust gas) is found from an excess air factor λs and a lean-side direction shifting correction coefficient Ls in accordance with the following equation:

$$\lambda g = \lambda s \times \{1 - (1 - Ls) \times KLMD\}$$

where notation KLMD denotes a coefficient for averaging effects of a correction of conversion into a lean side in the course of the control to speed an operation to warm up the catalyst 25. The coefficient KLMD has a typical value of 0.5. The excess air factor λs is an excess air factor detected by the air-fuel ratio sensor 26 at a point of time t1 the air-fuel ratio sensor 26 enters an activated state. The lean-side direction shifting correction coefficient Ls is a correction coefficient for correcting an air-fuel ratio in the lean-side direction within a range that does not cause variations in engine revolution speed to increase in the course of the control to speed an operation to warm up the catalyst 25.

Figure 54:
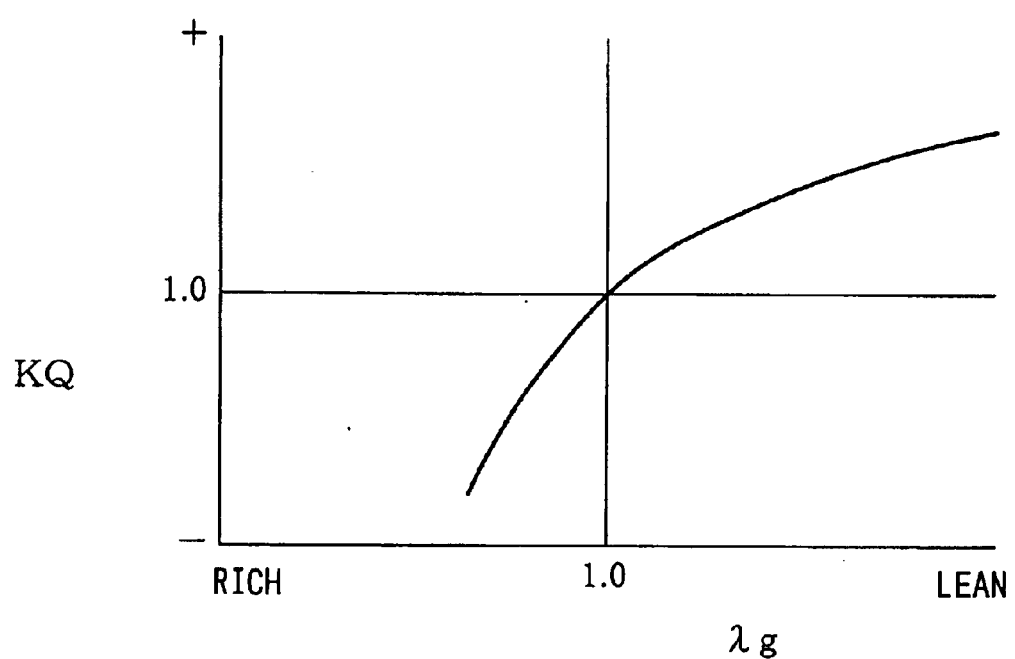
FIG. 54 is a diagram showing a relation between an estimated excess air factor and a compensation correction in a modified version of the emission control system implemented by the ninth embodiment of the present invention.

At a step 945 a map prepared for determining a diagnosis correction coefficient KQ as shown in FIG. 54 is searched for a specific diagnosis correction coefficient KQ suitable for an estimated excess air factor λg.

As is obvious from the map prepared for determining a diagnosis correction coefficient KQ as shown in FIG. 54, the larger the estimated excess air factor λg, that is, the leaner the estimated excess air factor λg, the larger the diagnosis correction coefficient KQ. In addition, for an estimated excess air factor λg equal to 1, the diagnosis correction coefficient KQ is set at 1, which means that the estimated exhaust gas heat amount cumulative value QSUM0 is not corrected.

At a step 946, the estimated exhaust gas heat amount cumulative value QSUM0 is multiplied by the specific diagnosis correction coefficient KQ to produce an exhaust gas heat amount cumulative value QQSUM as follows:

$$QQSUM = QSUM \times KQ$$

At a step 947, the exhaust gas heat amount cumulative value QQSUM is examined to determine whether or not the exhaust gas heat amount cumulative value QQSUM is greater than an abnormality criterion value Qmin. If the exhaust gas heat amount cumulative value QQSUM is found greater than the abnormality criterion value Qmin, the amount of heat dissipated by exhaust gas is determined to be an adequate amount of heat required for speeding an operation to warm up the catalyst 25. In this case, the flow of the routine goes on to a step 911.

If the determination result obtained at the step 947 indicates that the exhaust gas heat amount cumulative value QQSUM is not greater than the abnormality criterion value Qmin, on the other hand, the amount of heat dissipated by exhaust gas so far is determined to be inadequate, that is heat required for speeding an operation to warm up the catalyst 25 is determined to have not been supplied to the catalyst 25 sufficiently. In this case, the flow of the routine goes on to a step 912.

Variations in air-fuel ratio or variations in excess air factor, which occur during the control to speed an operation to warm up the catalyst 25, result in variations in amount of heat internally generated in the catalyst 25. In the case of the embodiment described above, however, in order to keep up with the variations in amount of heat internally generated in the catalyst 25, the cumulative value of the amount of heat dissipated by exhaust gas is corrected. Thus, it is possible to determine whether an amount of heat dissipated by exhaust gas during the control to speed an operation to warm up the catalyst 25 is an adequate or inadequate amount of heat required for speeding the operation to warm up the catalyst 25.

Figure 55:
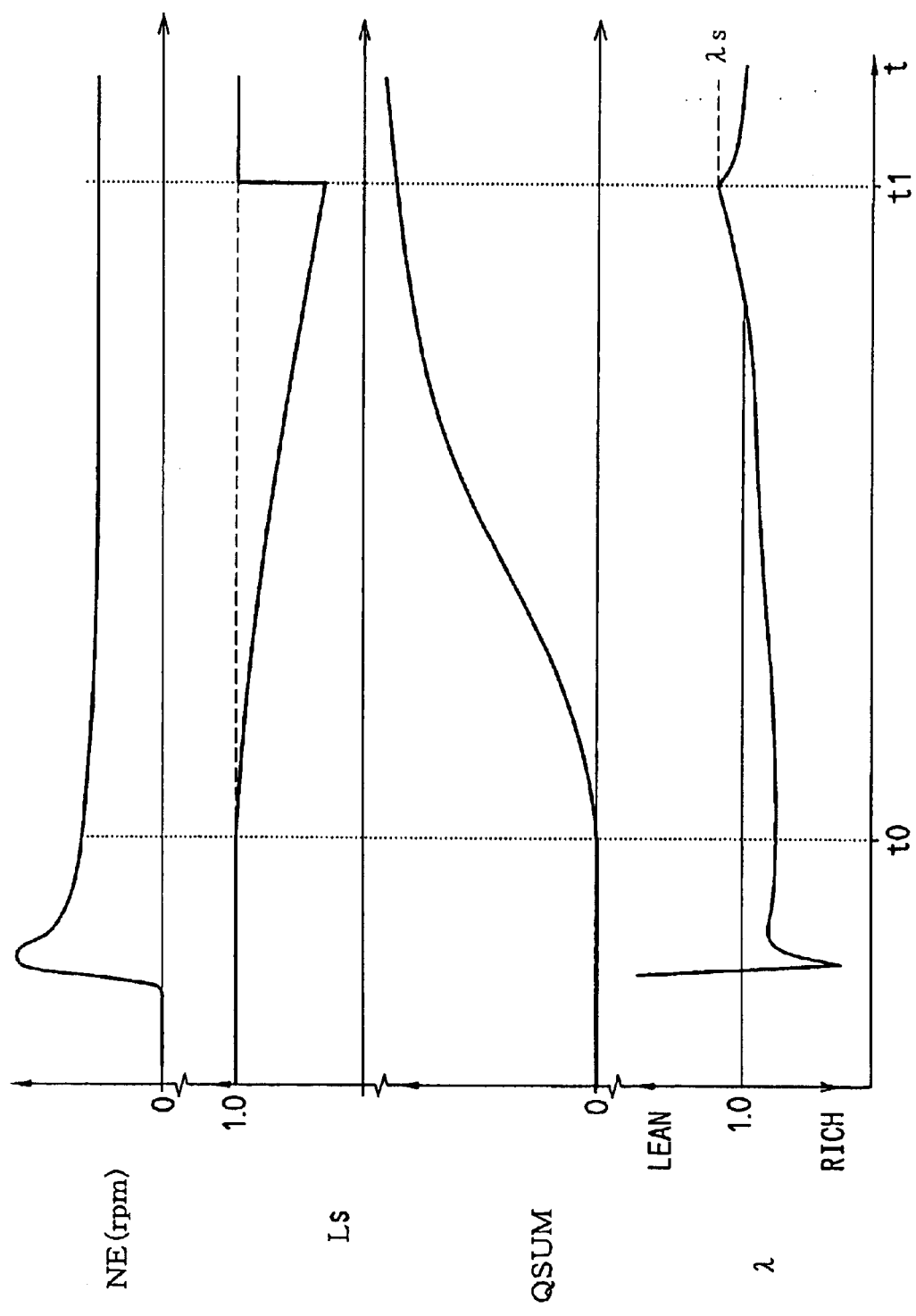
FIG. 55 shows time charts of operations taking place in a modified version of the emission control system implemented by the ninth embodiment of the present invention.

Some of fuel injected by the fuel-injection valve 20 is stuck on the wall of an intake port or the like. In general, in the course of the control to speed an operation to warm up the catalyst 25, the temperature of the engine 11 is low. Thus, the amount of stuck fuel is relatively large during the control to speed an operation to warm up the catalyst 25. The amount of stuck fuel is referred to as a wet quantity. As a result, an air-fuel ratio or an excess air factor cannot be determined with a high precision during the control to speed an operation to warm up the catalyst 25 from only a fuel injection volume TAU and an intake air volume GA. In addition, in the case of this embodiment, an excess air factor $\lambda g$ estimated for the control to speed an operation to warm up the catalyst 25 (or in the computation of an amount of heat dissipated by exhaust gas) is computed from a lean-side direction shifting correction coefficient Ls and an excess air factor $\lambda s$ detected by the air-fuel ratio sensor 26 at a point of time t1 the air-fuel ratio sensor 26 enters an activated state as shown in time charts of FIG. 55. The lean-side direction shifting correction coefficient Ls is a parameter representing a change in air-fuel ratio in the lean-side direction occurring during the control to speed an operation to warm up the catalyst 25. Thus, by using a lean-side direction shifting correction coefficient Ls and an excess air factor $\lambda s$ at a point of time t1 the air-fuel ratio sensor 26 enters an activated state for computing an estimated excess air factor $\lambda g$, the lean conversion correction is also taken into consideration in the control to speed an operation to warm up the catalyst 25 so that an excess air factor $\lambda g$ (or an air-fuel ratio) estimated for the control to speed an operation to warm up the catalyst 25 can be found with a high degree of precision.

It is to be noted that the abnormality criterion value Qmin can also be corrected on the basis of the estimated excess air factor $\lambda g$ to give the same effects.

Figure 56:
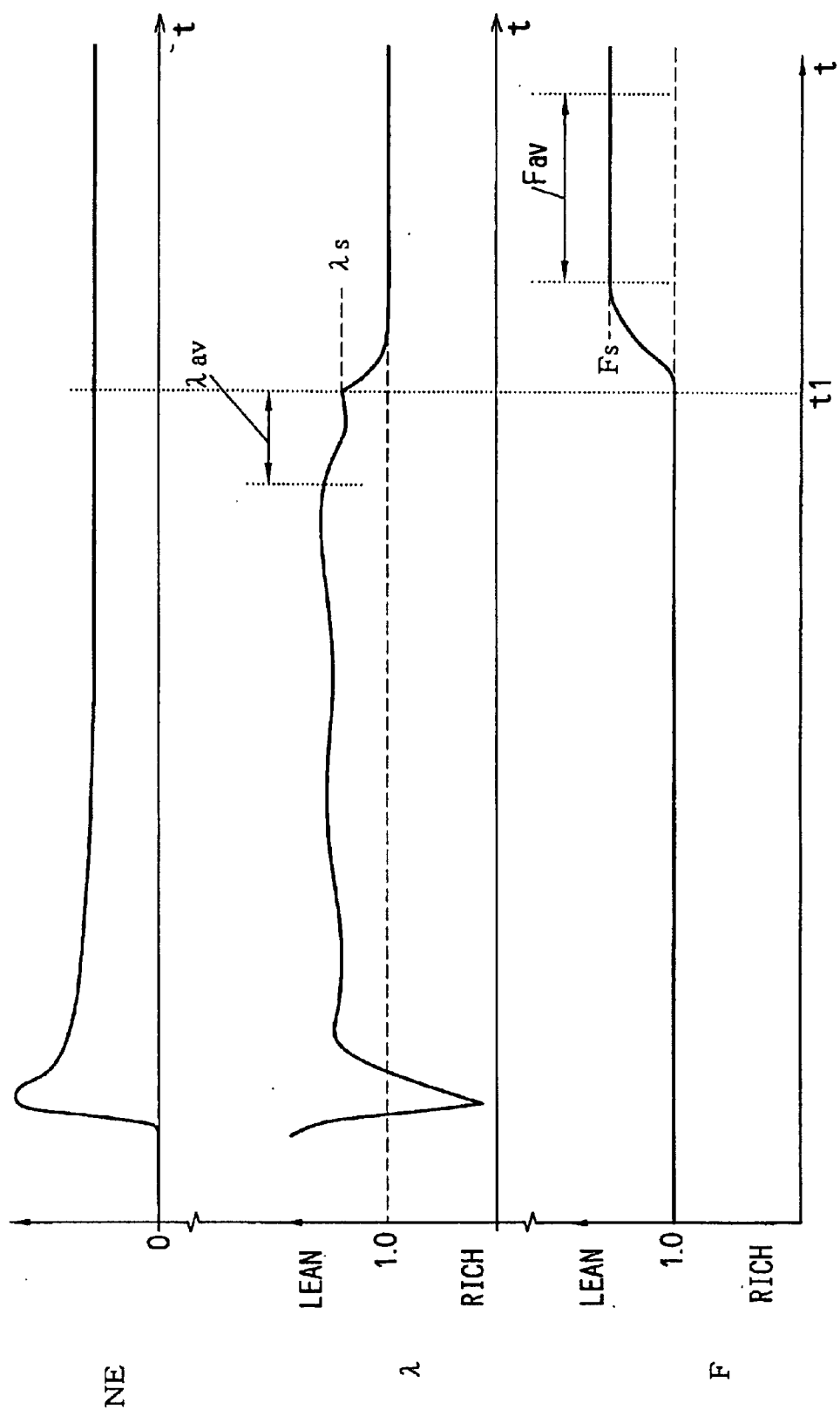
FIG. 56 shows time charts of operations taking place in a modified version of the emission control system implemented by the ninth embodiment of the present invention.

In addition, as an excess air factor $\lambda g$ (or an air-fuel ratio) estimated for the control to speed an operation to warm up the catalyst 25, it is also possible to use an excess air factor $\lambda s$ detected by the air-fuel ratio sensor 26 at a point of time t1 the air-fuel ratio sensor 26 enters an activated state or an average value $\lambda av$ of excess air factors $\lambda$ taken over the period in close proximity to the activation time t1 as shown in time charts of FIG. 56.

Furthermore, as shown in time charts of FIG. 56, when the air-fuel ratio sensor 26 gets activated, feedback control of the air-fuel ratio is started. For this feedback control, an air-fuel ratio feedback control coefficient F for correcting an air-duel ratio detected by the air-fuel ratio sensor 26 to a target air-fuel ratio. In this case, an estimated excess air factor $\lambda g$ (or an estimated air-fuel ratio) during the control to speed an operation to warm up the catalyst 25 can also be found on the basis of an air-fuel ratio feedback control coefficient Fs computed right after the activation of the air-fuel ratio sensor 26 or on the basis of an average value Fav computed with respect to air-fuel ratio feedback control coefficients F over the period in close proximity to the activation time t1 as shown in time charts of FIG. 56.

In addition, an excess air factor $\lambda g$ (or an air-fuel ratio) estimated for the control to speed an operation to warm up the catalyst 25 can also be found by using an air-fuel ratio feedback control coefficient Fs and a lean-side direction shifting correction coefficient Ls.

The scope of the present invention also includes any combination of the embodiments described above.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An emission control system, comprising:
   a catalyst provided on an exhaust passage of an internal combustion engine to be used as a means for purifying exhaust gas discharged by the internal combustion engine;
   a catalyst warming up speeding control means for speeding an operation to warm up the catalyst;
   a diagnosis means for making a diagnosis of the catalyst warming up speeding control means in order to determine whether the catalyst warming up speeding control means is functioning normally or abnormally; and
   an exhaust gas component detection means for detecting a component contained in exhaust gas on the downstream side of the catalyst,
   wherein the diagnosis means comprises:
   a first diagnosis means for preliminarily detecting an abnormality of the catalyst warming up speeding control means or an abnormality caused by a deteriorating state of the catalyst on the basis of an exhaust gas component detected by the exhaust gas component detection means in the course of control executed by the catalyst warming up speeding control means to speed an operation to warm up the catalyst; and
   a second diagnosis means for confirming the deteriorating state of the catalyst on the basis of an exhaust gas component detected by the exhaust gas component detection means after completion of the control to speed an operation to warm up the catalyst, and
   wherein the diagnosis means makes a diagnosis of the catalyst warming up speeding control means in order to determine whether or not an abnormality exists in the catalyst warming up speeding control means on the basis of a preliminary detection result output by the first control means and the second control means confirmation result indicating whether or not the deteriorating state of the catalyst is confirmed.

2. The emission control system according to claim 1, wherein the diagnosis means distinguishes an abnormality of the catalyst warming up speeding control means and a deteriorating state of the catalyst from each other on the basis of the first diagnosis means preliminary detection result indicating whether or not an abnormality exists in the catalyst warming up speeding control means or whether or not the catalyst is in the deteriorating state and on the basis of the second control means confirmation result indicating whether or not the deteriorating state of the catalyst is confirmed.

3. The emission control system according to claim 1, wherein when the first diagnosis means preliminarily detects an abnormality of the catalyst warming up speeding control means or an abnormality caused by a deteriorating state of the catalyst and the second diagnosis means confirms the deteriorating state of the catalyst, the diagnosis means finally diagnoses the preliminarily detected abnormality as the deteriorating state of the catalyst.

4. The emission control system according to claim 1, wherein when the first diagnosis means preliminarily detects an abnormality of the catalyst warming up speeding control means or an abnormality caused by a deteriorating state of the catalyst but the second diagnosis means does not confirm the deteriorating state of the catalyst, the diagnosis means finally diagnoses the preliminarily detected abnormality as an abnormality of the catalyst warming up speeding control means.

5. An emission control system comprising:
- a catalyst warming up speeding means for speeding an operation to warm up a catalyst for purifying exhaust gas discharged by an internal combustion engine;
- an exhaust gas sensor for detecting a concentration of a gas component such as oxygen contained in the exhaust gas and an air-fuel ratio of the exhaust gas as well as determining whether a detected air-fuel ratio is on a rich or lean side;
- a heater provided in the exhaust gas sensor to be used as a means for heating a sensor element of the exhaust gas sensor;
- a sensor activation determination means for determining whether or not a state of progress of an activation of the exhaust gas sensor is normal in a condition of no heat generation by the heater or in a condition of a reduced amount of heat generated by the heater in a diagnosis made during control to speed an operation to warm up the catalyst; and
- a diagnosis means for making a diagnosis of the catalyst warming up speeding means in order to determine whether or not an abnormality exists in the catalyst warming up speeding means by determining whether or not the activation of the exhaust gas sensor is abnormally late on the basis of a determination result produced by the sensor activation determination means;
- the emission control system having a plurality of the exhaust gas sensors provided on the upstream side of the catalyst and an air-fuel ratio control means, wherein:
- the sensor activation determination means determines whether or not a state of progress of activating any specific one of the exhaust gas sensors is normal in a condition of no heat generation by the heater employed in the specific exhaust gas sensor or in a condition of a reduced amount of heat generated by the heater employed in the specific exhaust gas sensor; and
- while the sensor activation determination means is determining whether or not a state of progress of activation of the specific exhaust gas sensor is normal, the air-fuel ratio control means controls an air-fuel ratio on the basis of signals output by the exhaust gas sensors other than the specific exhaust gas sensor in a condition of generation of heat by the heaters employed in the other exhaust gas sensors.

6. An emission control system comprising:
- a catalyst warming up speeding means for speeding an operation to warm up a catalyst for purifying exhaust gas discharged by an internal combustion engine;
- an exhaust gas sensor for detecting a concentration of a gas component such as oxygen contained in the exhaust gas and an air-fuel ratio of the exhaust gas as well as determining whether a detected air-fuel ratio is on a rich or lean side;
- a heater provided in the exhaust gas sensor to be used as a means for heating a sensor element of the exhaust gas sensor;
- a first sensor activation determination means for determining whether or not a state of progress of an activation of the exhaust gas sensor is normal during control to speed an operation to warm up the catalyst;
- a first diagnosis means for making a diagnosis of the emission control system in order to determine whether or not an abnormality exists in the emission control system by determining whether the activation of the exhaust gas sensor is normal or late on the basis of a determination result produced by the first sensor activation determination means;
- a second sensor activation determination means, which is used for determining whether or not a state of progress of an activation of the exhaust gas sensor is normal in a condition of no heat generation by the heater or a condition of a reduced amount of heat generated by the heater after a next start of the internal combustion engine in case a result of a diagnosis made by the first diagnosis means indicates that it is quite within the bounds of possibility that an abnormality exists; and
- a second diagnosis means for making a confirmatory diagnosis of the emission control system in order to determine whether or not an abnormality exists in the emission control system by determining whether the activation of the exhaust gas sensor is normal or late on the basis of a determination result produced by the second sensor activation determination means.

7. The emission control system according to claim 6, the emission control system having a plurality of the exhaust gas sensors provided on the upstream side of the catalyst and an air-fuel ratio control means, wherein:
- the sensor activation determination means determines whether or not a state of progress of activating any specific one of the exhaust gas sensors is normal in a condition of no heat generation by the heater employed in the specific exhaust gas sensor or in a condition of a reduced amount of heat generated by the heater employed in the specific exhaust gas sensor; and
- while the sensor activation determination means is determining whether or not a state of progress of activation of the specific exhaust gas sensor is normal, the air-fuel ratio control means controls an air-fuel ratio on the basis of signals output by the exhaust gas sensors other than the specific exhaust gas sensor in a condition of generation of heat by the heaters employed in the other exhaust gas sensors.

8. The emission control system comprising:
- a first control means for speeding an operation to warm up a catalyst for purifying exhaust gas discharged by an internal combustion engine at a start of the internal combustion engine;

a detection means for detecting a warmed-up state of the catalyst; and a second control means, which is used for controlling at least one of parameters relevant to the operation to warm up the catalyst in a direction to speed the operation to warm up the catalyst in case the catalyst actual warmed-up state detected by the detection means at a predetermined point of time in the course of a process carried out by the first control means to speed the operation to warm up the catalyst has not reached a predetermined target warmed-up state of the catalyst;

wherein the second control means controls valve timings of an intake valve and/or an exhaust valve in a direction to increase a temperature of the exhaust gas for the purpose of speeding the operation to warm up the catalyst.

9. The emission control system according to claim 8, wherein the second control means controls at least one of the parameters relevant to the operation to warm up the catalyst in a direction to speed the operation to warm up the catalyst in case the catalyst actual warmed-up state detected by the detection means becomes worse than the predetermined target warmed-up state of the catalyst even after the operation to warm up the catalyst in accordance with control executed at a start of the internal combustion engine to speed the operation to warm up the catalyst has been completed.

10. The emission control system according to claim 8, wherein the second control means sets control quantities of the parameters in accordance with a difference between the catalyst actual warmed-up state detected by the detection means and the predetermined target warmed-up state of the catalyst.

11. The emission control system according to claim 8, the emission control system further having an abnormality determination means, which is used for determining that an abnormality exists in the emission control system in case a predetermined effect of a process to speed the operation to warm up the catalyst is not obtained even after the second control means has controlled the parameters in a direction to speed the operation to warm up the catalyst.

12. The emission control system according to claim 8, wherein the detection means has a temperature sensor for detecting a temperature of the exhaust gas in an exhaust pipe on the upstream or downstream side of the catalyst or a temperature of the catalyst.

13. The emission control system according to claim 8, wherein the second control means controls a parameter of an intake system so as to increase a target revolution speed of the internal combustion engine for the purpose of speeding the operation to warm up the catalyst and, hence, raise an intake air volume in accordance with an increase in the target revolution speed.

14. The emission control system according to claim 8, wherein the second control means controls an ignition timing in a direction to delay the ignition timing for the purpose of speeding the operation to warm up the catalyst.

15. The emission control system according to claim 8, wherein the second control means shifts an air-fuel ratio to a lean side by correction to reduce a fuel injection volume for the purpose of speeding the operation to warm up the catalyst.

16. The emission control system according to claim 8, wherein the second control means controls an opening of a cylinder gas flow control valve in a direction to increase a temperature of the exhaust gas for the purpose of speeding the operation to warm up the catalyst.

17. The emission control system comprising:

a first control means for speeding an operation to warm up a catalyst for purifying exhaust gas discharged by an internal combustion engine at a start of the internal combustion engine;

a detection means for detecting a warmed-up state of the catalyst; and a second control means, which is used for controlling at least one of parameters relevant to the operation to warm up the catalyst in a direction to speed the operation to warm up the catalyst in case the catalyst actual warmed-up state detected by the detection means at a predetermined point of time in the course of a process carried out by the first control means to speed the operation to warm up the catalyst has not reached a predetermined target warmed-up state of the catalyst;

wherein the second control means increases a lift quantity of an intake valve for the purpose of speeding the operation to warm up the catalyst.

* * * * *